United States Patent
Araki et al.

(10) Patent No.: US 6,842,280 B2
(45) Date of Patent: Jan. 11, 2005

(54) OPTICAL ELEMENT AND OPTICAL APPARATUS

(75) Inventors: Keisuke Araki, Yokohama (JP); Tsunefumi Tanaka, Yokohama (JP); Makoto Sekita, Yokohama (JP); Kenichi Kimura, Kawasaki (JP); Takeshi Akiyama, Yokohama (JP); Toshihiro Sunaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/763,201

(22) Filed: Jan. 26, 2004

(65) Prior Publication Data

US 2004/0150879 A1 Aug. 5, 2004

Related U.S. Application Data

(62) Division of application No. 09/127,031, filed on Jul. 31, 1998, now abandoned.

(30) Foreign Application Priority Data

Aug. 4, 1997 (JP) .............................................. 9-221950
Jun. 11, 1998 (JP) ........................................... 10-179706

(51) Int. Cl.⁷ .......................... G02B 23/00; G02B 27/14
(52) U.S. Cl. ...................... 359/365; 359/362; 359/637; 359/729
(58) Field of Search ............................... 359/362–366, 359/627–631, 637–640, 729–732

(56) References Cited

U.S. PATENT DOCUMENTS

| | | | |
|---|---|---|---|
| 4,781,446 A | 11/1988 | Tanaka et al. | 359/680 |
| 5,453,877 A | 9/1995 | Gerbe et al. | 359/633 |
| 5,515,207 A | 5/1996 | Foo | 359/731 |
| 5,550,672 A | 8/1996 | Cook | 359/365 |
| 5,682,269 A | 10/1997 | Kimura et al. | 359/770 |
| 5,790,312 A | 8/1998 | Togino | 359/631 |
| 5,917,662 A | 6/1999 | Sekita | 359/729 |
| 5,973,858 A | 10/1999 | Sekita | 359/729 |
| 5,995,287 A | 11/1999 | Sekita | 359/599 |
| 5,999,311 A | 12/1999 | Nanba et al. | 359/365 |
| 6,021,004 A | 2/2000 | Sekita et al. | 359/676 |
| 6,097,550 A | 8/2000 | Kimura | 359/729 |
| 6,124,986 A | 9/2000 | Sekita et al. | 359/691 |
| 6,163,400 A | 12/2000 | Nanba | 359/365 |
| 6,166,866 A | 12/2000 | Kimura et al. | 359/729 |
| 6,268,963 B1 | 7/2001 | Akiyama | 359/631 |
| 6,301,064 B1 | 10/2001 | Araki et al. | 59/834 |
| 6,324,012 B1 * | 11/2001 | Aratani et al. | 359/627 |
| 6,331,916 B1 * | 12/2001 | Mukawa | 359/630 |
| 6,366,411 B1 * | 4/2002 | Kimura et al. | 359/729 |
| 6,522,475 B2 | 2/2003 | Akiyama et al. | 359/676 |
| 6,549,332 B2 | 4/2003 | Kimura | 359/366 |
| 6,636,360 B1 | 10/2003 | Tanaka et al. | 359/678 |
| 6,639,729 B2 | 10/2003 | Tanaka et al. | 359/676 |

FOREIGN PATENT DOCUMENTS

| | | |
|---|---|---|
| JP | 6-265814 | 9/1994 |
| JP | 8-292371 | 11/1996 |
| JP | 8-292372 | 11/1996 |
| JP | 9-5650 | 1/1997 |

* cited by examiner

*Primary Examiner*—Thong Q Nguyen
(74) *Attorney, Agent, or Firm*—Fitzpatrick, Cella, Harper & Scinto

(57) ABSTRACT

An optical element comprising an object-side imaging element for imaging an object on an intermediate image plane in an optical path before a final image plane and an image-side imaging element for reimaging an object image formed on the intermediate image plane, on the final image plane, wherein at least one of the object-side imaging element and the image-side imaging element comprises an off-axial curved surface, and wherein aberration is generated by both of the object-side imaging element and the image-side imaging element, thereby flattening (disturbance of) a light intensity distribution caused on the final image plane by a noise source at or near the intermediate image plane.

8 Claims, 26 Drawing Sheets

(−) DEFOCUS   INTERMEDIATE IMAGE PLANE 2   (+) DEFOCUS (−) DEFOCUS    INTERMEDIATE    (+) DEFOCUS
                   IMAGE PLANE 2

(LIGHT BEAMS IN MERIDIAN SECTION)

(RELATIONSHIP OF TORSION)

WIDE ANGLE END

INTERMEDIATE POSITION

TELEPHOTO END

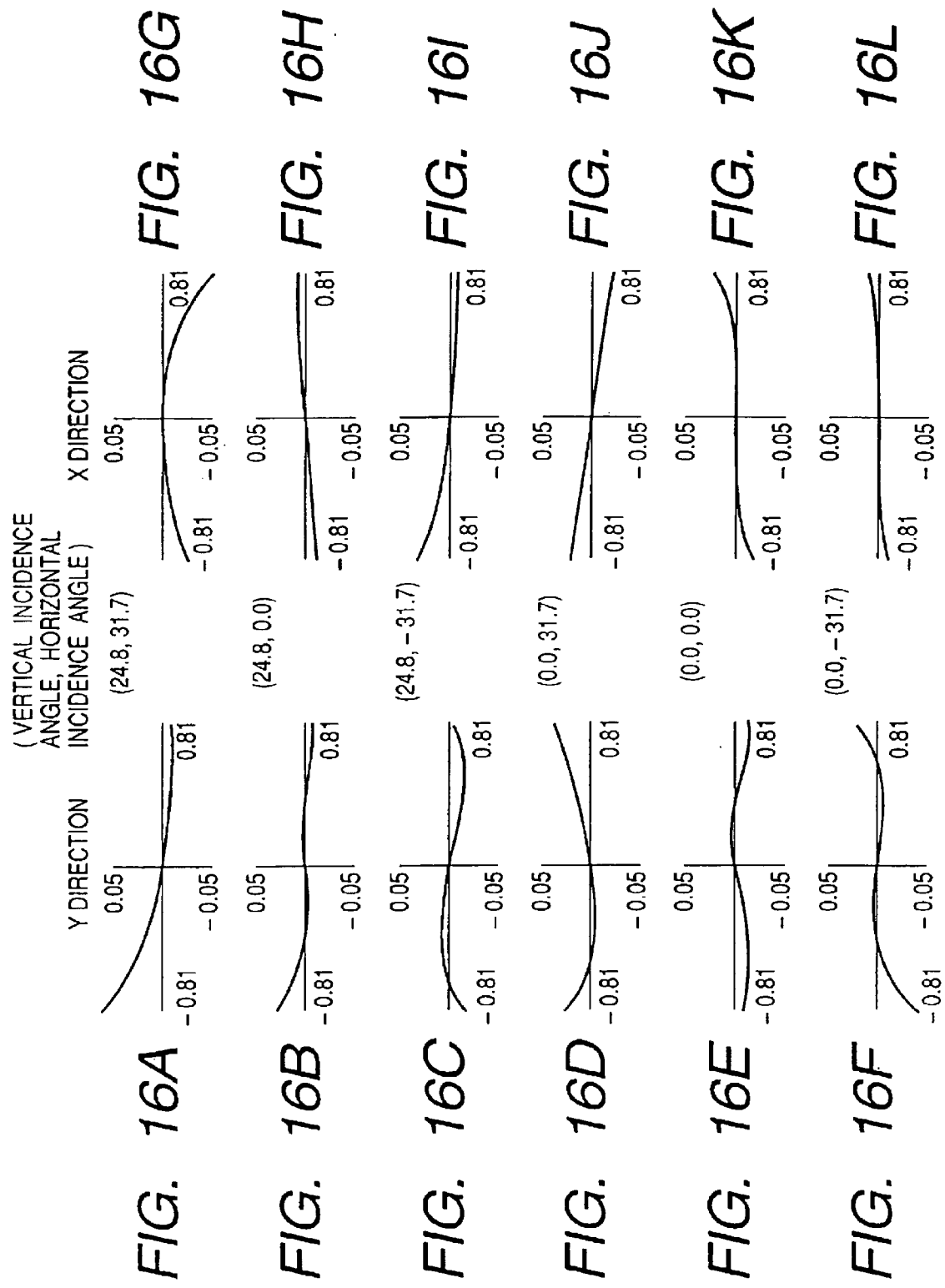

WIDE ANGLE END

INTERMEDIATE POSITION

TELEPHOTO END

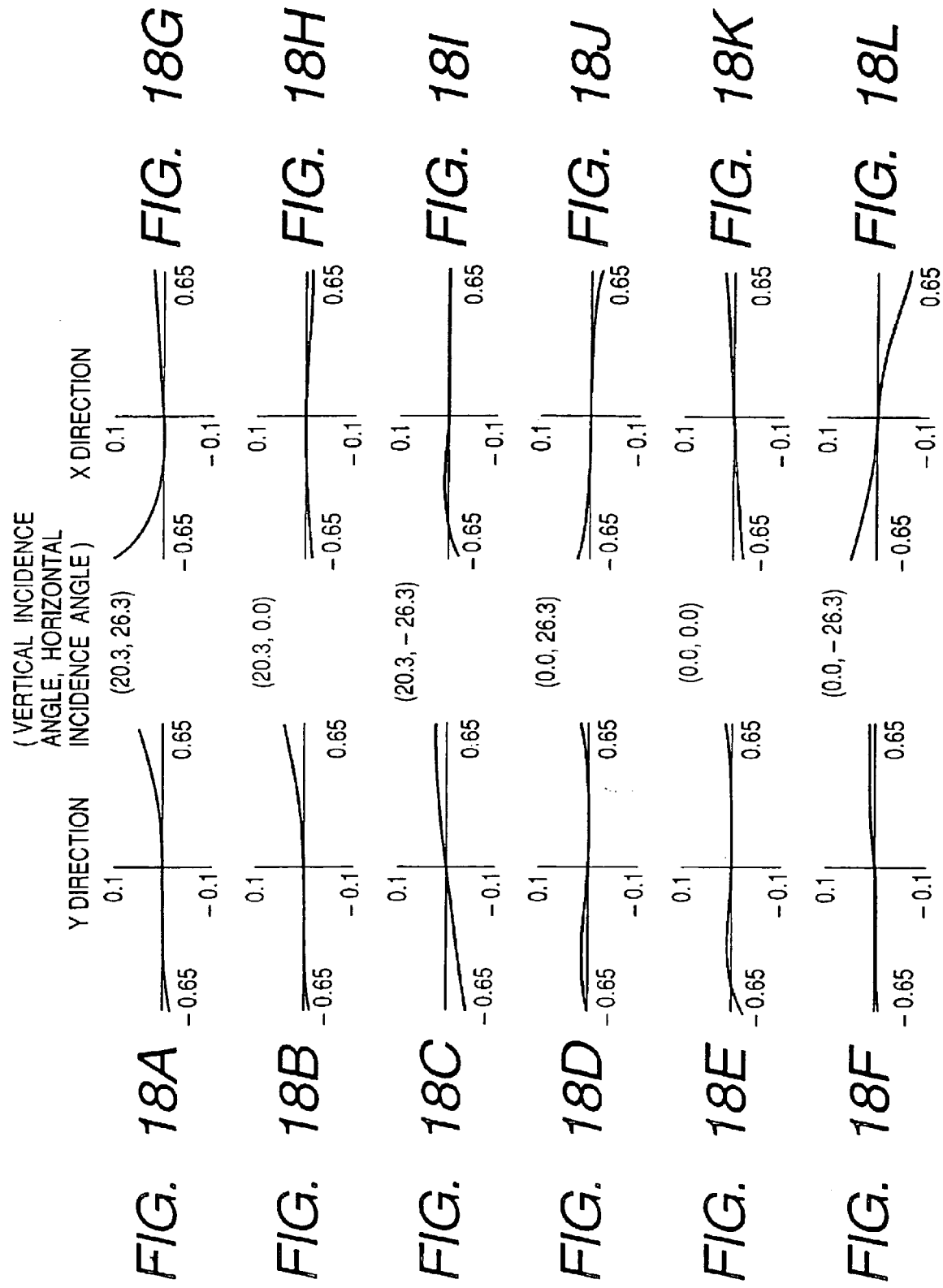

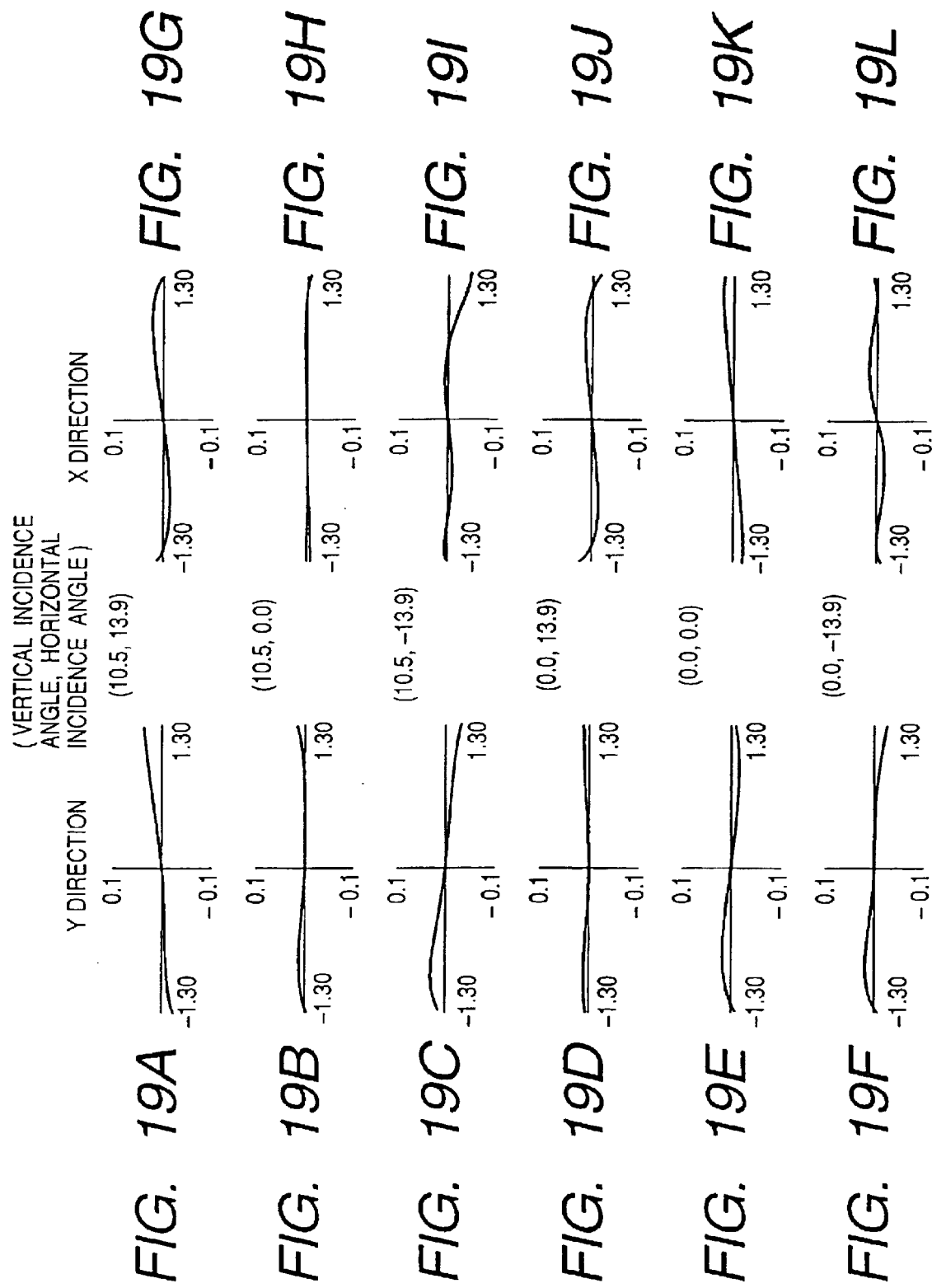

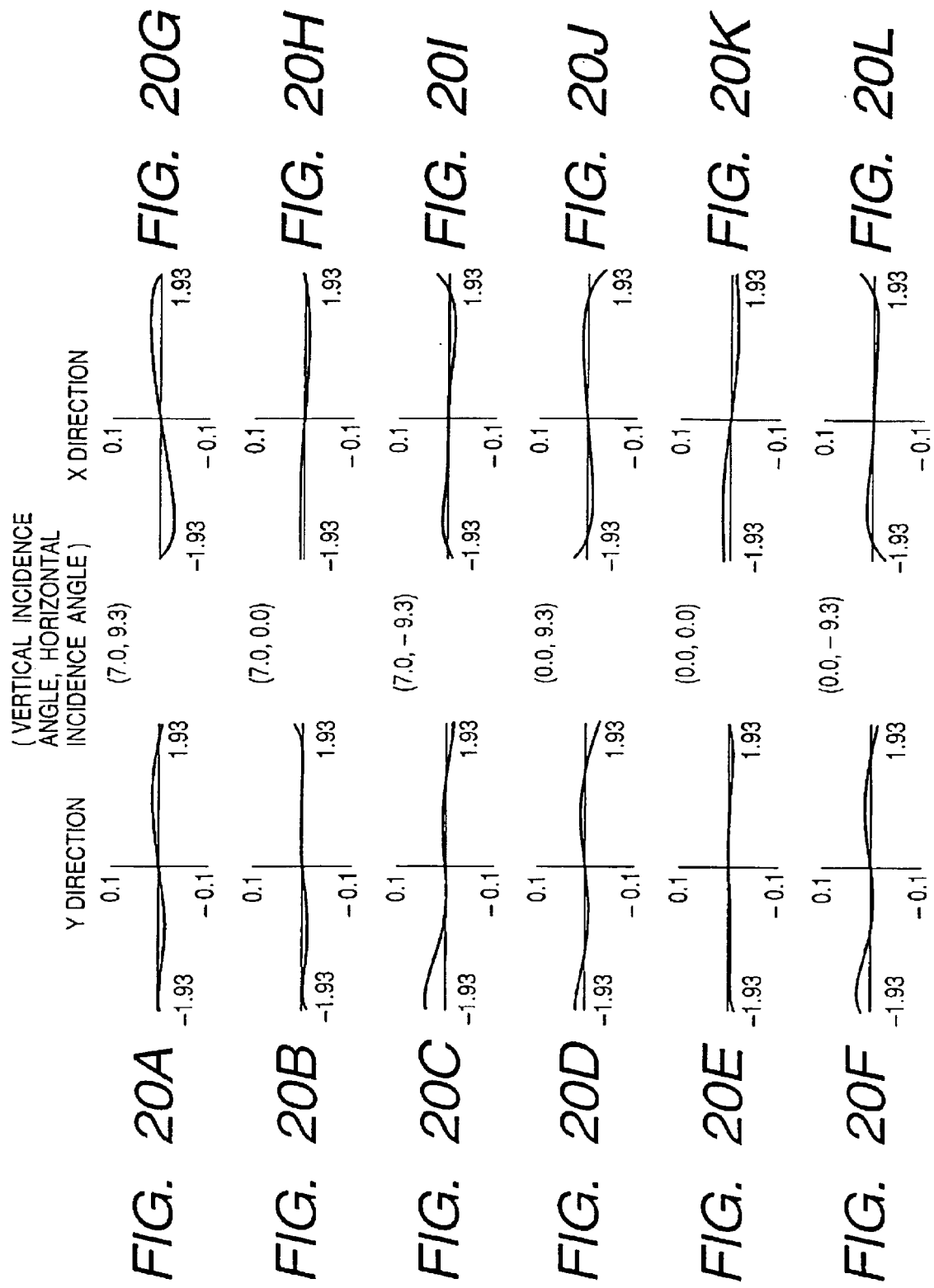

FIG. 24
(HORIZONTAL VIEW ANGLE, VERTICAL VIEW ANGLE)     SMALLEST SPOT
(0.0, 0.0) 
(24.84, 31.68) 
0.50000 MM
FIG. 25
(HORIZONTAL VIEW ANGLE, VERTICAL VIEW ANGLE)     SMALLEST SPOT
(0.0, 0.0) 
(24.84, 31.68) 
0.50000 MM

OPTICAL ELEMENT AND OPTICAL APPARATUS

This application is a division of Application No. 09/127,031 filed Jul. 31, 1998 now abandoned.

BACKGROUND OF THE INVENTION

1. Field of the Invention

The present invention relates to an optical element and optical apparatus and, more particularly, to an optical element and optical apparatus suitably applicable, for example, to video cameras, still video cameras, copiers, and so on.

2. Related Background Art

An inverted, real image system without intermediate image formation is principally used as an optical system in the conventional optical apparatus for forming an image of an object on the final image plane.

On the other hand, an optical system with intermediate image formation is used when a small cross section is desired for the optical system or when an erect image is demanded.

FIG. 6A to FIG. 6C are conceptual drawings of such optical systems. FIG. 6A and FIG. 6B are conceptual drawings where intermediate image formation is brought about in a coaxial system.

In FIG. 6A, reference numeral 1 designates the object plane and 5 an optical system, the system 5 being comprised of lens systems L1, L3, and L2. Numeral 2 denotes an intermediate image plane, the plane 2 being located inside the lens system L3. Numeral 3 represents the final image plane.

In the same figure, lights from the object 1 are condensed by the lens system L1 to be focused on the intermediate image plane 2 inside the lens system L3 and form an inverted object image (intermediate image) on the plane 2, and thereafter the lights are condensed by the lens system L2 to be focused on the final image plane 3 and form an erect object image thereon.

In this example, the lens system L1 is composed of an object-side imaging element for forming the image of the object 1 on the intermediate image plane 2 in the lens system L3, and the lens system L2 is composed of an image-side imaging element for reimaging the image on the intermediate image plane 2, on the final image plane 3.

Each of these imaging elements composes a part of the imaging optical system 5. The lens system L3 herein conceptually represents the optical system corresponding to a field lens, a prism block, or the like.

FIG. 6B is a major-part sectional view of an erect, real image forming system using a medium having a nonuniform index profile. In the same figure lights from the object 1 are condensed by a front portion 10 of the imaging optical system (optical system) 5 to form an image on the intermediate image plane and thereafter they are focused by a rear portion 11 of the imaging optical system 5 to form an object image on the final image plane 3. In this case, the front portion 10 composes the object-side imaging part element and the rear portion 11 the image-side imaging element. These together compose the imaging optical system 5. A lens array, in which lenses composed of such erect 1:1 imaging systems using the medium with the nonuniform index profile are arrayed, is used in the copiers and other equipment.

FIG. 6C is a major-part schematic diagram to show an optical apparatus having a non-coaxial, optical system and an intermediate image plane therein, as disclosed in Japanese Patent Application Laid-open No. 8-292371. In the same figure, lights from the object 1 pass through an aperture stop 4 and thereafter are incident to an entrance surface 10-1 of optical element 5 to be refracted into the element 5. They are then reflected by a concave, reflective surface 10-2 and thereafter focused on the intermediate image plane 2. The lights from the intermediate image plane 2 are thereafter reflected by reflective surfaces 11-1, 11-2, 11-3 to propagate inside the element 5 and emerge from an exit surface 11-4, then forming the object image on the final image plane 3.

In FIG. 6C, the concept of reference axis (8-1 to 8-5) is employed in correspondence to the optic axis of the coaxial system. This reference axis is defined as an optical path of a reference-wavelength ray traveling via the center of the object 1 and the center (of the aperture) of the stop 4.

This optical system is called an off-axial, optical system because the optical system includes a surface in which at an intersecting point between the reference axis corresponding to the optic axis and the component surface the reference axis does not agree with the normal to the surface but makes a finite angle other than 0 therewith (the definition of the off-axial, optical system). Surfaces of this type are called off-axial surfaces or off-axial curved surfaces. In this case, the imaging optical system 5 is also composed of a front element 10 (the surfaces 10-1, 10-2) composing the object-side imaging element and a rear element 11 (the surfaces 11-1, 11-2, 11-3, 11-4) composing the image-side imaging element, the elements 10, 11 being incorporated.

The non-coaxial, off-axial, optical system is described in detail in Japanese Patent Application Laid-open No. 9-5650, including the setting method of surface shapes and the calculating method of paraxial amounts together with properties of the off-axial, optical system.

Although FIGS. 6A, 6B, 6C show the examples where single intermediate imaging is achieved, for simplicity, there are known systems involving a plurality of (two or more) intermediate imaging procedures.

The optical systems involving the intermediate imaging often adopt a designing approach for retaining the imaging performance, including spherical aberration, on the intermediate image plane and maintaining this performance so as to keep the imaging performance on the final image plane. This approach is conceptually easy to understand and also easy to design, because the approach includes use of some normal designing techniques. In the case of design using the automatic designing approach, the design is sometimes conducted normally with no consideration on imaging characteristics on the intermediate image plane at all but with only consideration on the imaging characteristics on the final image plane.

Even in such cases, however, one can often reach a solution that retains some imaging characteristics, including spherical aberration, on the intermediate image plane.

In general, there exist foreign materials such as dust particles, and bubbles in the optical elements. Sizes of these are various, but the standards of Glass Industry Association include the standard of bubble for 30 $\mu$m and greater bubbles in the optical elements. In the case of special, visual type lenses, even a bubble or a particle as fine as 30 $\mu$m or less would pose a problem, so that special inspection is needed for such lenses.

The limit of detection of a bubble or a particle by naked eyes is about 5 $\mu$m, and those having the size of about 100 $\mu$m first become capable of visual detection. For the surface reflectors, a flaw, a deposit, or the like on the surface is also a cause of degrading the optical performance and inspection thereof is necessary. The sizes of the bubbles and particles in the optical elements and the widths of flaws or the sizes of the deposits or the like on the reflective surfaces, which could pose a problem, vary depending upon design specifications and manufacturing cost, but, with emphasis on the manufacturing cost, a product is determined to be defective if there are many 100 μm- and greater bubbles or particles, or flaws, deposits or the like on the reflective surface, which can be detected visually. With emphasis on the optical performance, because the bubbles, particles, deposits, and flaws having the sizes or widths of 10 μm or less are considered not to affect the optical performance, it seems valid to make the determination of defective if there are many bubbles, particles, deposits, flaws, etc. having the sizes of 10 μm and above. As described above, the sizes of the bubbles, particles, deposits, etc. to be criteria of inspection are approximately 10 to 100 μm.

The sizes of the bubbles, particles, deposits, etc. posing the problem will be described from the aspect of specifications of product. In general, the sizes of the bubbles, particles, deposits, etc. posing the problem on an image pickup device vary depending upon types of products, types of images, or individuals, but an eyesore often starts when the size of an image of the bubble, particle, deposit, etc. on a photoreceptive surface of the image pickup device in an in-focus state exceeds approximately five times (5b) the length of the minimum resolution (b) given by the size of pixels of the image pickup device or the like. This numeral of 5 is one figured out by experiments with plural types of images against plural subjects and corresponds to the fact that a drop of one pixel or so is not offensive to the eye, but about five times one pixel often becomes offensive.

Accordingly, in FIGS. 6A to 6C, when the intermediate image plane 2 is imaged on the final image plane 3 where the image pickup device is located and when β11 represents the image magnification of the lens system 11 of the image-side imaging element, the size of a noise source posing the problem near the intermediate image plane 2 is not less than approximately the following:

$$5b/|\uparrow 11| \quad \text{(Eq 1).}$$

In this equation, |β11| indicates an absolute value of the image magnification β11 of the lens system 11 being the image-side imaging element. For example, supposing the pixel size of CCD being the image pickup device is 5 μm square and β11 is 1, the size of the noise source posing the problem near the intermediate image plane is not less than 25 μm.

Particularly, in the optical systems arranged to form the intermediate image plane in the lens system, in the optical block, or the like, if there exists a noise source, such as a dust particle, a bubble, or a flaw, irrelevant to an image (object image) desired to be transmitted to near the intermediate image position, the noise source will be a cause of heavily degrading the optical performance.

If the noise from such a noise source overlies an image (signal) on the photoreceptive surface of the image pickup device being the final image plane, there will arise a problem that the image becomes harder to see. Specific examples of the dust, bubble, or flaw irrelevant to the desired-to-transmit image include the dust particles or bubbles (indicated by NO in the drawing) in the internally solid optical member near the intermediate image plane 2, as shown in the system (coaxial system) of FIG. 7A and in the system (non-coaxial system) of FIG. 7B, and the flaws (indicated by NO in the drawing) on a component surface of the optical system near the intermediate image plane 2, as shown in the system (coaxial system) of FIG. 7C and in the system (non-coaxial, off-axial, optical system) of FIG. 7D.

Another special noise source is a streak pattern C of steps of a Fresnel lens or diffraction type lens where the Fresnel lens or diffraction type lens is used as a field lens 12 as shown in FIG. 7E.

In general, a popular method for making such a noise source as the dust, bubble, or flaw inoffensive was a method for designing the intermediate image plane to be located in air and thereby keeping the noise source, existing in the optical medium, on the surface thereof, or on the reflective surface, in a defocus state, as described, for example, in Japanese Patent Application Laid-open No. 6-265814.

However, the problem was that this method for making the noise source inoffensive by defocus was not applicable to optical systems downsized by integrally forming the optical medium and forming the intermediate image therein as described in Japanese Patent Application Laid-open No. 8-292371, because there was no air layer inside.

Japanese Patent Application Laid-open No. 6-265814 also describes an example in which aberration such as spherical aberration is intentionally brought about on the intermediate image plane, so as to make the streaks of the Fresnel lens as a field lens inoffensive. This method for generating aberration, however, generates the aberration by use of a rotationally symmetric system, so that the aberration is the third or higher order aberration. This method thus had the problem that the effect appeared weaker in a dark optical system, particularly in an optical system stopped down or the like, than in the method by defocus which worked in the first order.

In the case where the intermediate image moves depending upon zoom positions as described in Japanese Patent Application Laid-open No. 8-292372, even if the intermediate image at a certain zoom position is in air, the intermediate image plane at another zoom position could be near the surface of the component surface or in the optical medium. In that case there arose the problem that the noise source was unable to be made inoffensive at the zoom position.

In the case where the focal length is constant but the object distance varies, the final image plane can be kept aligned by focusing, but the position of the intermediate image plane also varies on that occasion. Therefore, even if at a certain object distance the intermediate image is in air by defocus, the intermediate image plane at another object distance could be near the surface of the component surface or in the medium. In that case there arose the problem that the noise source was unable to be made inoffensive at that object distance.

SUMMARY OF THE INVENTION

An object of the present invention is to provide an optical element and optical apparatus capable of obtaining a good image on the final image plane even if a noise source exists at and/or near the intermediate image position.

An optical element of the present invention is:

(1-1) an optical element comprising an object-side imaging element for imaging an object on an intermediate image plane in an optical path and an image-side imaging element for reimaging an object image formed on the intermediate image plane, on a final image plane, wherein at least one of said object-side imaging element and said image-side imaging element comprises an off-axial curved surface, and wherein aberration is generated by both of the object-side imaging element and the image-side imaging element, so as to flatten (disturbance of) a light intensity distribution on the final image plane, caused by a noise source at or near the intermediate image plane;

(1-2) an optical element in which an object image is formed on an intermediate image plane by reflecting a light incident from an object through an entrance plane by at least one reflective surface of a plurality of reflective surfaces and in which a light from the object image is reflected by the remaining reflective surface or surfaces out of said plurality of reflective surfaces to be made emergent from an exit plane and to be directed onto a predetermined plane, wherein at least one of an object-side imaging element ranging from the entrance plane to the intermediate image plane and an image-side imaging element ranging from the intermediate image plane to the exit plane comprises an off-axial curved surface and wherein aberration is generated by both of said object-side imaging element and said image-side imaging element, so as to flatten a light intensity distribution produced on the predetermined plane by a noise source at or near the intermediate image plane; or (1-3) an optical element in which an object image is formed on an intermediate image plane by reflecting a light incident from an object through an entrance surface provided in a surface of a transparent body by at least one reflective surface of a plurality of reflective surfaces provided in the surface of the transparent body and in which a light from the object image is reflected by the remaining reflective surface or surfaces out of said plurality of reflective surfaces to be made emergent from an exit surface provided in the surface of the transparent body and to be directed onto a predetermined plane, wherein at least one of an object-side imaging element present from the entrance surface to the intermediate image plane and an image-side imaging element present from the intermediate image plane to the exit surface comprises an off-axial curved surface and wherein aberration is generated by both of said object-side imaging element and said image-side imaging element, so as to flatten a light intensity distribution produced on the predetermined plane by a noise source at or near the intermediate image plane.

Particularly, in the compositions (1-1) to (1-3), the optical element is characterized in that:

(1-3-1) said aberration is generated so as to degrade imaging performance of said object-side imaging element and so as to correct the imaging performance thus degraded, by said image-side imaging element;

(1-3-2) said off-axial curved surface is provided in at least one reflective surface out of said plurality of reflective surfaces;

(1-3-3) said optical element has a stop, and the following relation is satisfied:

$$V/|\beta 11|<U$$

where $\beta 11$ is an image magnification of said image-side imaging element, V a spot size on the final image plane at a fixed aperture diameter of said stop, and U a spot size on said intermediate image plane;

(1-3-4) said optical element has a stop, and the following relation is satisfied:

$$3 \cdot V/|\beta 11|<U$$

where $\beta 11$ is an image magnification of said image-side imaging element, V a spot size on the final image plane at a fixed aperture diameter of said stop, and U a spot size on said intermediate image plane;

(1-3-5) said optical element has a stop, and the following relation is satisfied:

$$5 \cdot V/|\beta 11|<U$$

where $\beta 11$ is an image magnification of said image-side imaging element, V a spot size on the final image plane at a fixed aperture diameter of said stop, and U a spot size on said intermediate image plane;

(1-3-6) degradation of the imaging performance of said object-side imaging element is achieved by generating specific aberration independent of a field angle from on the axis to off the axis;

(1-3-7) said specific aberration is on-axis astigmatism;

(1-3-8) degradation of the imaging performance of said object-side imaging element is achieved by such aberration of torsion that rays in a meridional section jump out of the meridional section, which is generated independent of the field angle from on the axis to off the axis;

(1-3-9) a diameter of a spot near said intermediate image plane is two or more times a minimum diameter of said noise source posing a problem even when the system is at a minimum aperture value;

(1-3-10) a diameter of a spot near said intermediate image plane is three or more times a minimum diameter of said noise source posing a problem even when the system is at a minimum aperture value;

(1-3-11) a diameter of a spot near said intermediate image plane is three or more times a minimum diameter of said noise source posing a problem when the system is at a full aperture;

(1-3-12) a diameter of a spot near said intermediate image plane is five or more times a minimum diameter of said noise source posing a problem when the system is at a full aperture;

(1-3-13) said optical element is constructed in a structure in which a focal length thereof is invariant;

(1-3-14) at least one of said object-side imaging element and image-side imaging element has a surface having anamorphic powers, wherein $$P=1/f$$

P: power, f: focal length;

(1-3-15) at least one of said object-side imaging element and image-side imaging element is comprised of an optical system having no common symmetry plane;

(1-3-16) at least one of said object-side imaging element and image-side imaging element comprises a surface with no symmetry at all; and so on.

An optical apparatus of the present invention is characterized in that:

(2-1) the object is imaged on a photoreceptive surface of an image pickup device by use of the optical element of either one of the compositions (1-1) to (1-3); or (2-2) the apparatus comprises at least two optical elements of the compositions (1-1) to (1-3), relative positions are changed between said at least two optical elements, whereby the object is imaged at different magnifications on an image pickup device.

Particularly, in the composition (2-1) or (2-2), the optical apparatus is characterized in that:

(2-2-1) a stop is provided near the entrance surface of said optical element and the following relation is satisfied:

$$10 \cdot b/|\beta 11| < SD$$

where SD is a spot diameter on said intermediate image plane, b a length of a minimum resolution given by a size of a pixel of said image pickup device when said stop is at a minimum aperture value, and β11 an image magnification of said image-side imaging element;

(2-2-2) a stop is provided near the entrance surface of said optical element and the relation set forth in Equation 3 below is satisfied;

(2-2-3) a stop is provided near the entrance surface of said optical element and the relation set forth in Equation 4 below is satisfied;

(2-2-4) a stop is provided near the entrance surface of said optical element and the relation set forth in Equation 5 below is satisfied;

(2-2-5) change of the relative positions between said at least two optical elements is achieved by displacing at least one of said optical elements in a direction of a reference axis; and so on.

An optical system of the present invention is:

(3-1) an optical system comprising an object-side imaging element for once imaging an object on an intermediate image plane in an optical path and an image-side imaging element for reimaging an object image formed on the intermediate image plane, on a final image plane, wherein at least one of said object-side imaging element and said image-side imaging element comprises an off-axial curved surface, and wherein aberration is generated by both of the object-side imaging element and the image-side imaging element, so as to flatten (disturbance of) a light intensity distribution on the final image plane, caused by a noise source at or near the intermediate image plane.

Particularly, the optical system is characterized in that:

(3-1-1) said off-axial curved surface is comprised of a reflective surface;

(3-1-2) said aberration is generated so as to degrade imaging performance of said object-side imaging element and so as to correct the imaging performance thus degraded, by said image-side imaging element;

(3-1-3) said optical system has a stop, and the following relation is satisfied:

$$V/|\beta 11| < U$$

where β11 is an image magnification of said image-side imaging element, V a spot size on the final image plane at a fixed aperture diameter of said stop, and U a spot size on said intermediate image plane;

(3-1-4) said optical system has a stop, and the following relation is satisfied:

$$3 \cdot V/|\beta 11| < U$$

where β11 is an image magnification of said image-side imaging element, V a spot size on the final image plane at a fixed aperture diameter of said stop, and U a spot size on said intermediate image plane;

(3-1-5) said optical system has a stop, and the following relation is satisfied:

$$5 \cdot V/|\beta 11| < U$$

where β11 is an image magnification of said image-side imaging element, V a spot size on the final image plane at a fixed aperture diameter of said stop, and U a spot size on said intermediate image plane;

(3-1-6) degradation of the imaging performance of said object-side imaging element is achieved by generating specific aberration independent of a field angle from on the axis to off the axis;

(3-1-7) said specific aberration is on-axis astigmatism;

(3-1-8) degradation of the imaging performance of said object-side imaging element is achieved by such aberration of torsion that rays in a meridional section jump out of the meridional section, which is generated independent of the field angle from on the axis to off the axis;

(3-1-9) a diameter of a spot near said intermediate image plane is two or more times a minimum diameter of said noise source posing a problem even when the system is at a minimum aperture value;

(3-1-10) a diameter of a spot near said intermediate image plane is three or more times a minimum diameter of said noise source posing a problem even when the system is at a minimum aperture value;

(3-1-11) a diameter of a spot near said intermediate image plane is three or more times a minimum diameter of said noise source posing a problem when the system is at a full aperture;

(3-1-12) a diameter of a spot near said intermediate image plane is five or more times a minimum diameter of said noise source posing a problem when the system is at a full aperture;

(3-1-13) said optical system is a unifocal system in which a focal length thereof is invariant;

(3-1-14) at least one of said object-side imaging element and image-side imaging element has a surface having anamorphic powers;

(3-1-15) at least one of said object-side imaging element and image-side imaging element is comprised of an optical system having no common symmetry plane;

(3-1-16) at least one of said object-side imaging element and image-side imaging element comprises a surface with no symmetry at all; and so on.

An optical apparatus of the present invention is characterized in that:

(4-1) the object is imaged on a photoreceptive surface of an image pickup device by use of the optical system of the composition (3-1); or (4-2) the optical apparatus comprises at least one optical system of the composition (3-1), and at least one of a focal length, an image magnification, and a focus on the final image plane is variable.

Particularly, in the composition (4-1) or (4-2), the optical apparatus is characterized in that:

(4-2-1) a stop is provided near the entrance surface of said optical system and the following relation is satisfied:

$$10 \cdot b/|\beta 11| < SD$$

where SD is a spot diameter on said intermediate image plane, b a length of a minimum resolution given by a size of a pixel of said image pickup device when said stop is at a minimum aperture value, and β11 an image magnification of said image-side imaging element;

(4-2-2) a stop is provided near the entrance surface of said optical system and the relation set forth in Equation 3 below is satisfied;

(4-2-3) a stop is provided near the entrance surface of said optical system and the relation set forth in Equation 4 below is satisfied;

(4-2-4) a stop is provided near the entrance surface of said optical system and the relation set forth in Equation 5 below is satisfied;

(4-2-5) change of relative positions between said at least two optical systems or between the optical system and the image plane is achieved by displacing at least one of said optical system and the image plane in a direction of a reference axis;

(4-2-6) change of at least one of said focal length, image magnification, and focus on the final image plane, of said optical system, is achieved by changing a distance of a certain portion of the optical system relative to the final image plane along a reference axis; and so on.

An optical element of the present invention is characterized in that:

(5-1) said optical system of the composition (3-1) is a reflecting optical system wherein the light from the object is made incident through an entrance surface formed in a surface of a transparent body thereinto, light propagating inside said transparent body is reflected by one or more reflective surfaces comprised of curved surfaces provided in said transparent body, and the light is made emergent from an exit surface of the transparent body to form an image, or a reflecting optical system wherein the light from the object is reflected by a plurality of reflective surfaces comprised of reflective mirrors and thereafter the light is emergent therefrom;

(5-2) said optical system of the composition (5-1) is an optical element integrally formed; or (5-3) said optical system of the composition (5-1) comprises a plurality of optical elements integrally formed.

Particularly, in the compositions (5-1) to (5-3), the optical system is characterized in that:

(5-3-1) the following condition is satisfied:

$$\left|\frac{D \cdot f1}{S \cdot AR1}\right| < 0.1 \tag{1a}$$

where D is a size of a bubble, a dust particle, or the like posing a problem in terms of optical performance and existing inside said optical element or a width of a flaw or a size of a deposit or the like posing a problem in terms of optical performance and existing on a reflective surface near the intermediate image position, f1 is a maximum synthetic focal length out of those dependent upon azimuths, of a region from the entrance surface located nearest to the object to an optical surface before the intermediate image position, an azimuth at that time being defined as ξ, S is an on-axis astigmatic difference at the intermediate image position, and AR1 is a diameter of an exit pupil from the entrance surface nearest to the object to the optical surface before said intermediate image position in correspondence to said azimuth ξ and at a full aperture of the stop;

(5-3-2) the optical system has a function to adjust an aperture diameter of the stop, and the following condition is satisfied:

$$\left|\frac{D \cdot f1}{S \cdot AR2}\right| < 0.3 \tag{2a}$$

where D is a size of a bubble, a dust particle, or the like posing a problem in terms of optical performance and existing inside said optical element or a width of a flaw or a size of a deposit or the like posing a problem in terms of optical performance and existing on a reflective surface near the intermediate image position, f1 is a maximum synthetic focal length out of those dependent upon azimuths, of a region from the entrance surface located nearest to the object to an optical surface before the intermediate image position, an azimuth at that time being defined as ξ, S is an on-axis astigmatic difference at the intermediate image position, and AR2 is a diameter of an exit pupil from the entrance surface nearest to the object to the optical surface before said intermediate image position in correspondence to said azimuth ξ and at a small aperture of the stop;

(5-3-3) the following condition is satisfied:

$$\left|\frac{5b \cdot f1}{|\beta| \cdot S \cdot AR1}\right| < 0.1 \tag{3a}$$

where f1 is a maximum synthetic focal length out of those dependent on azimuths, of a region from the entrance surface of said optical system nearest to the object to an optical surface before the intermediate image position, an azimuth at that time being defined as ξ, S is an on-axis astigmatic difference at the intermediate image position, b is a length of a minimum resolution given by a size of a pixel of an image pickup device or the like, β is an image magnification when the intermediate image plane is imaged on the final image plane, in a direction normal to the azimuth ξ in the optical system of from the intermediate image position to the final image position on which the image pickup device is located, and AR1 is a diameter of an exit pupil of the region from the entrance surface nearest to the object to the optical surface before the intermediate image position in correspondence to said azimuth ξ and at a full aperture of the stop;

(5-3-4) said optical system having a function to adjust an aperture diameter, wherein the following condition is satisfied:

$$\left|\frac{5b \cdot f1}{|\beta| \cdot S \cdot AR2}\right| < 0.3 \tag{4a}$$

where f1 is a maximum synthetic focal length out of those dependent on azimuths, of a region from the entrance surface of said optical system nearest to the object to an optical surface before the intermediate image position, an azimuth at that time being defined as ξ, S is an on-axis astigmatic difference at the intermediate image position, b is a length of a minimum resolution given by a size of a pixel of an image pickup device or the like, β is an image magnification when the intermediate image plane is imaged on the final image plane, in a direction normal to the azimuth ξ in the optical system of from the intermediate image position to the final image position on which the image pickup device is located, and AR2 is a diameter of an exit pupil of the region from the entrance surface nearest to the object to the optical surface before the intermediate image position in correspondence to said azimuth ξ and at a small aperture of the stop.

(5-4) In the compositions (5-1) to (5-3-4), the entrance surface of the optical element being said transparent body is a rotationally symmetric surface.

(5-5) In the compositions (5-1) to (5-3-4), the entrance surface of the optical element being said transparent body is a rotationally asymmetric surface.

(5-6) In the compositions (5-1) to (5-5), the stop is disposed near the entrance surface nearest to the object in said optical system.

(5-7) In the compositions (5-1) to (5-6), the reflective surface of a curved surface, which is the first surface when counted from the object side of said optical system, has converging action.

(5-8) In the compositions (5-1) to (5-7), the exit surface of the optical element being said transparent body has a rotationally symmetric shape with respect to a reference axis.

(5-9) In the compositions (5-1) to (5-7), the exit surface of the optical element being said transparent body has a rotationally asymmetric shape with respect to a reference axis.

(5-10) In the compositions (5-1) to (5-9), the optical element is arranged to move in parallel to a direction of a reference axis emerging therefrom, thereby achieving focusing.

(5-11) In the compositions (5-3) to (5-10), the optical system is a reflection type zoom optical system wherein the object is imaged through a plurality of optical elements and zooming is achieved by changing relative positions of at least two optical elements out of said plurality of optical elements.

(5-12) An image pickup apparatus has the reflecting optical system of the composition (5-1) to (5-11) and the object is imaged on an image pickup surface thereof.

(5-13) An observation apparatus is arranged to observe the object by the optical system of the composition (5-1) to (5-11).

BRIEF DESCRIPTION OF THE DRAWINGS

FIGS. 16A, 16B, 16C, 16D, 16E, 16F, 16G, 16H, 16I, 16J, 16K and 16L are lateral aberration diagrams of Embodiment 7;

FIGS. 18A, 18B, 18C, 18D, 18E, 18F, 18G, 18H, 18I, 18J, 18K and 18L are lateral aberration diagrams (at the wide-angle extreme) of Embodiment 8;

FIGS. 19A, 19B, 19C, 19D, 19E, 19F, 19G, 19H, 19I, 19J, 19K and 19L are lateral aberration diagrams (at a middle position) of Embodiment 8;

FIGS. 20A, 20B, 20C, 20D, 20E, 20F, 20G, 20H, 20I, 20J, 20K and 20L are lateral aberration diagrams (at the telephoto extreme) of Embodiment 8;

FIG. 24 is a diagram of smallest spots at the intermediate image position in the conventional example;

FIG. 25 is a diagram of smallest spots at the intermediate image position in Embodiment 4;

DETAILED DESCRIPTION OF THE PREFERRED EMBODIMENTS

In each of the embodiments described below, there is described an example wherein means for flattening (disturbance of) light intensity distribution due to the noise source in the optical apparatus is optical means for flattening the disturbance of light intensity distribution on the final image plane due to the noise source by degrading the imaging performance at the intermediate image position with respect to the imaging performance on the final image plane.

Specifically speaking, degrading the imaging performance on the intermediate image plane with respect to that on the final image plane is, for example, "that when β11 represents the image magnification of the image-side imaging (part) element 11 where the intermediate image plane 2 is imaged on the final image plane 3 on which the image pickup device is located and when V represents a spot size on the final image plane where the aperture diameter is fixed, data of the components of the imaging optical system 5 (surface shapes, surface separations, a refractive index, and angles between the surfaces and the reference axis) is designed so that the spot size U on the intermediate image plane is deliberately larger than V/|β11|, preferably larger than 3V/|β11|, more preferably larger than 5V/|β11|."

Here, the number of 3 times is a numeral corresponding to the case where the effect of the noise source is controlled to about 11%, and the number of 5 times is a numeral corresponding to the case where the effect of the noise source is controlled to about 4%; these numerals are empirically obtained numerals respectively corresponding to a level where the effect can be recognized first with attention and to a level where the effect is little recognized even with attention.

Let us here define the term "spot size" used in the present invention. In the present invention, the "spot size" is defined as follows: "when 90% of lights from one object point (90% of light intensity) is included in a circle of a radius $A_0/2$ drawn about the position of the center of gravity of a spot diagram, this $A_0$ is called the spot size."

Figure 1A:
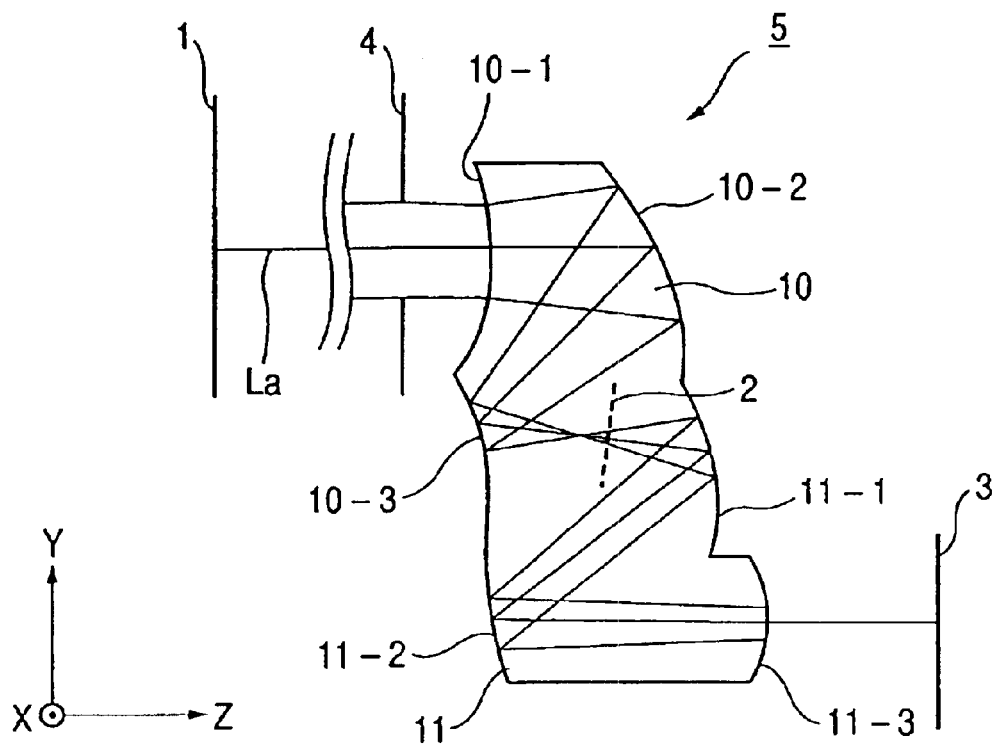
FIG. 1A and FIG. 1B are schematic diagrams of major part of Embodiment 1 according to the present invention.
Figure 1B:
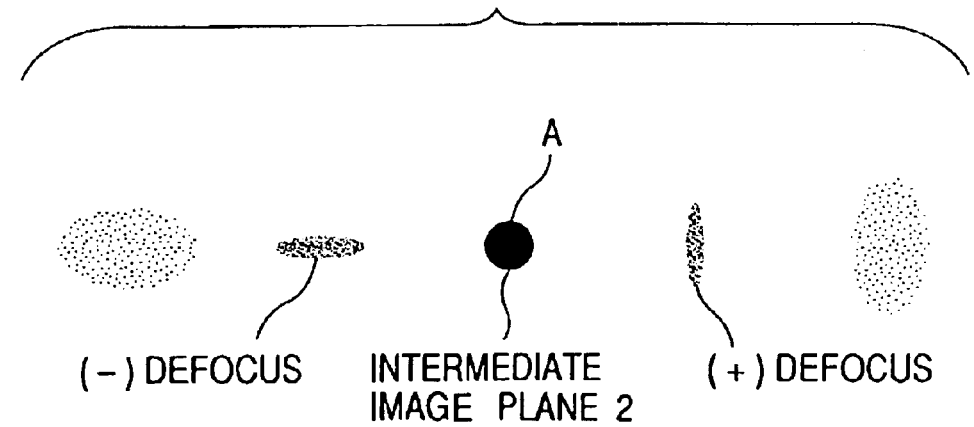

FIG. 1A is a sectional view of major part of an embodiment of an optical system according to the present invention, also illustrating optical paths. FIG. 1B are spot diagrams in the optical paths of FIG. 1A. Numeral 1 designates the object plane. Numeral 5 represents an optical element in which a plurality of reflective surfaces having respective curvatures (curved surfaces) are integrally formed, which composes an element of the imaging optical system. The optical element 5 has an entrance refractive surface 10-1, four reflective surfaces including mirror 10-2, mirror 10-3, mirror 11-1, and mirror 11-2, and an exit refractive surface 11-3 formed in order along the reference-axis ray from the object side in the surface of a transparent body (optical material), thus forming a non-coaxial, off-axial, optical system.

Numeral 2 denotes an intermediate image plane, which is located in the internally solid optical material. Refractive powers of the respective entrance surface 10-1, exit surface 11-3, and reflective surfaces 10-2, 10-3, 11-1, 11-2 forming the optical element 5 may be either positive or negative. In the following description these will also be called simply "surfaces."

The surfaces 10-1, 10-2, 10-3 compose the object-side imaging element (front element) 10, while the surfaces 11-1, 11-2, 11-3 compose the image-side imaging element (rear element) 11.

Numeral 3 denotes the final image plane, on which the image pickup surface of the image pickup device such as CCD is located. Numeral 4 indicates an aperture stop located on the object side of the optical element 5, and La represents the reference axis of the optical system.

Next described is the imaging action in the present embodiment. Light from the object 1 (hereinafter referred to as "object light") is regulated in an amount of incident light by the stop 4 and thereafter the object light is incident to the entrance refractive surface 10-1 of the optical element 5 to be refracted thereby, then propagate inside the element 5, and reach the concave mirror 10-2. The concave mirror 10-2 reflects the object light toward the convex mirror 10-3 and the object (image) is primarily imaged on the intermediate image plane 2 by the power of the concave mirror 10-2.

By forming the object image in the optical element 5 in the early stage in this way, increase is restricted in ray-effective diameters of the surfaces positioned on the image side of the stop 4.

The object light primarily focused on the intermediate image plane 2 is then reflected by the concave mirror 11-1 and by the concave mirror 11-2 in order to be affected by the powers of the respective reflective mirrors, and the object light then reaches the exit refractive surface 11-3 to be refracted thereby, then going out of the optical element 5. Then the object light is focused on the final image plane 3.

As described above, the optical element 5 allows the object light to propagate inside with repetitively being reflected by the plural reflective mirrors (reflective surfaces) having the respective curvatures and functions as a very thin lens unit in the X-direction and in the Z-direction while having desired optical performance and the imaging action as a whole.

In the present optical system, focusing is achieved by moving the optical element 5 in the direction parallel to the entrance reference axis thereof.

FIGS. 1A and 1B show an example of the optical system of the present invention, and the present invention also involves other optical systems, including an optical system in which there are a plurality of optical elements wherein a plurality of reflective surfaces having respective curvatures are integrally formed, a variable-power optical system with a plurality of optical elements for changing the power (zooming) by moving the optical elements, and so on.

The present optical system can be used as being incorporated in the video camera, the still video camera, the copier, or the like.

Each of the elements of the present embodiment will be described in detail. In the non-coaxial, off-axial, optical systems, as also described in Japanese Patent Application Laid-open No. 9-5650, the reference axis La does not agree with the normal to a component surface in general, so that the optical power in the plane P (YZ plane) including the reference axis La and the normal to surface is different from that in the plane Q (XY plane) including the normal to surface and being vertical to the plane P, even if curvatures of the surface are equal.

Accordingly, the component surfaces in the off-axial, optical system are normally anamorphic surfaces. When a component surface is anamorphic, it becomes possible to bring about astigmatism (on-axis astigmatism) independent of the field angle at all field angles, though no astigmatism appeared because of symmetry in the coaxial, rotationally symmetric systems.

Since this on-axis astigmatism is aberration that does not appear in the conventional, rotationally symmetric systems, it has little intensively been discussed heretofore in literatures and the like about the aberration theory. It will thus be discussed below. This on-axis astigmatism is aberration appearing independent of the field angle, and is aberration of a kind appearing in only systems lacking rotational symmetry.

This aberration is first-order aberration dependent on the first order of the pupil diameter but independent of the field angle. It is readily confirmed by optical tracing that this aberration is of the first order, and it is also possible to consider that the optical powers differ depending upon azimuths in the case of the on-axis astigmatism. From the evaluation aspect for average power, it can also be intuitively understood that aberration appearing in the same order as defocus, i.e., aberration of the first order takes place at most azimuths.

Such on-axis astigmatism can be generated when the object-side imaging element and the image-side imaging element are anamorphic and have rotationally asymmetric powers. Since the off-axial, optical system has different powers even with the same curvature in two directions perpendicular to each other, such aberration is easy to generate.

Therefore, when this on-axis astigmatism appears in some quantity, degradation of the image (for example, the image on the intermediate image plane) is greater than by the rotationally symmetric, spherical aberration appearing in the third order of the pupil diameter in the conventional systems, and the effect equivalent to defocus can be achieved because the effect is of the first order.

Figure 8:
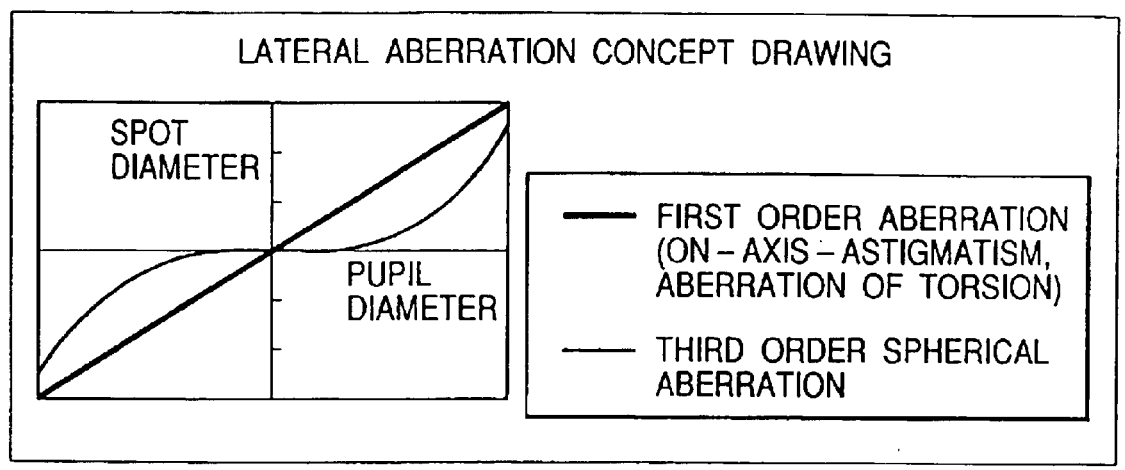
FIG. 8 is a conceptual drawing of lateral aberration according to the present invention.

This can readily be understood by description with the schematic diagram of lateral aberration on the intermediate image plane as shown in FIG. 8. Particularly, in dark optical systems the third-order aberration is slow to degrade the performance of intermediate imaging, whereas the first-order aberration is more effective in achieving degradation than the third-order aberration, because the first-order aberration is of a slant, straight line, as indicated in this figure.

In the ordinary designing of optical system the system is designed so as to minimize (or reduce) aberration, whereas the present invention employs the reverse conception of generating as much aberration on the intermediate image plane 2 as possible.

Specifically, in the optical system of FIGS. 1A and 1B in the present embodiment the surfaces 10-1, 10-2, 10-3 forming the object-side imaging element 10 are designed so as to have astigmatism (on-axis astigmatism) independent of the field angle on the intermediate image plane 2 (the intermediate image plane 2 in the case of presence of the on-axis astigmatism being defined by a middle position between two defocus positions where the spot is of a line shape, for convenience' sake), as shown in the conceptual drawing of the spot diagram in FIG. 1B.

Then the surfaces 11-1, 11-2, 11-3 forming the image-side imaging element 11 are designed so as to cancel the on-axis astigmatism. Namely, each of the object-side imaging element 10 and the image-side imaging element 11 has the on-axis astigmatism singly, but the imaging optical system 5, which is the overall system comprised of the object-side imaging element 10 and the image-side imaging element 11, is an optical system corrected for aberration.

When the object-side imaging element 10 and the image-side imaging element 11 each include the astigmatism independent of the field angle (the on-axis astigmatism) as described above, even if there is a noise source such as the dust, bubble, or flaw near the intermediate image plane 2 (at or near the plane 2), the on-axis astigmatism prevents the noise source from eclipsing all image information from the object points on the object plane 1; and the noise source is not imaged as a point on the final image plane 3 but is blurred by the on-axis astigmatism, thus flattening the (disturbance of) light intensity distribution on the image plane due to the noise source.

In general the size of the spot near the intermediate image plane 2 due to the on-axis astigmatism deliberately generated on the intermediate image plane 2 differs depending upon tolerance specifications of noise caused by the noise source, but it is two or more times, preferably three or more times, the size of the noise source posing the problem even at the minimum aperture value (which relates to the resolution of the image pickup device and which is given approximately by (Eq 1) described previously); in that case, since it is roughly estimated that an amount of light eclipsed by the noise source is proportional to approximately the square of a ratio of diameters, the amount of eclipsed light is not more than 25% (which is a closely permissible level though the effect is recognized, from the empirical aspect), desirably not more than 11% (which is a level in which the effect can be recognized first with attention, from the empirical aspect), thereby achieving the effect of flattening the disturbance of light intensity distribution on the image plane due to the noise source at all aperture values. This means that for the minimum resolution b given by the size of the pixels of the image pickup device or the like, when β11 represents the image magnification of the image-side imaging element 11 in the case where the intermediate image plane 2 is imaged on the final image plane 3 on which the image pickup device is located, the size of the spot, which is two or more times, desirably three or more times, ((Eq 1) described previously), is defined to be not less than the following:

$$10 \cdot b/|\beta 11| \qquad (Eq\ 2);$$

desirably, not less than the following:

$$15 \cdot b/|\beta 11| \qquad (Eq\ 3);$$

whereby the effect of flattening the disturbance of light intensity distribution on the image plane due to the noise source can be achieved at all aperture values.

Here, $|\beta 11|$ indicates the absolute value of the image magnification $\beta 11$ of the image-side imaging element 11.

In the case of a specification based on a completely different aspect, where the noise source becomes inoffensive at the full aperture of the stop, if the size of the spot near the intermediate image plane due to the on-axis astigmatism deliberately generated at the full aperture is three or more times, desirably five or more times, the size of the noise source posing the problem (which relates to the resolution of the image pickup device and which is given approximately by (Eq 1) described previously), the disturbance of light quantity due to the noise source can be controlled to about 11% (which is a level in which the effect can be recognized first with attention, from the empirical aspect), desirably to approximately 4% (which is a level in which the effect is little recognized even with attention, from the empirical aspect) with the stop being of the full aperture.

This means that for the minimum resolution b given by the size of the pixels of the image pickup device or the like, when β11 represents the image magnification of the image-side imaging element 11 where the intermediate image plane 2 is imaged on the final image plane 3 on which the image pickup device is located, the size of the spot, which is determined to be three or more times, desirably five or more times, ((Eq 1) described previously), is not less than the following:

$$15 \cdot b/|\beta 11| \qquad (Eq\ 4);$$

desirably, not less than the following:

$$25 \cdot b/|\beta 11| \qquad (Eq\ 5);$$

whereby the disturbance of light quantity due to the noise source can be controlled to about 11% (which is a level in which the effect can be recognized first with attention, from the empirical aspect), desirably to about 4% (which is a level in which the effect is little recognized even with attention, from the empirical aspect), with the stop being of the full aperture.

Here, $|\beta11|$ indicates the absolute value of the image magnification $\beta11$ of the image-side imaging element 11.

Figure 7A:
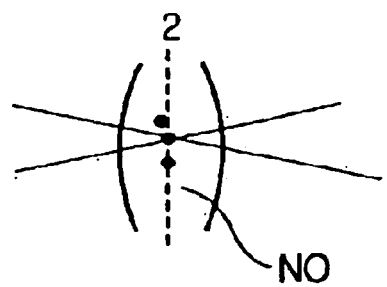
FIG. 7A, FIG. 7B, FIG. 7C, FIG. 7D, and FIG. 7E are conceptual drawings for explaining the noise sources present at the intermediate image position in the conventional systems.
Figure 7B:
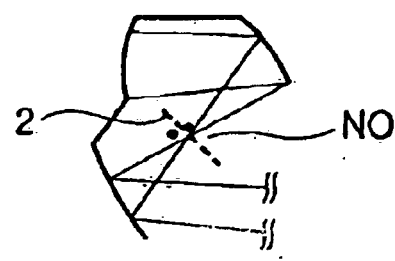
Figure 7C:
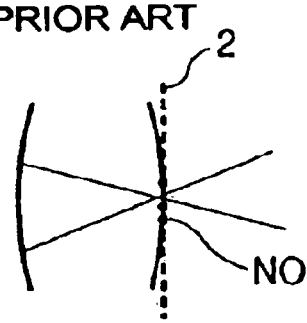
Figure 7D:
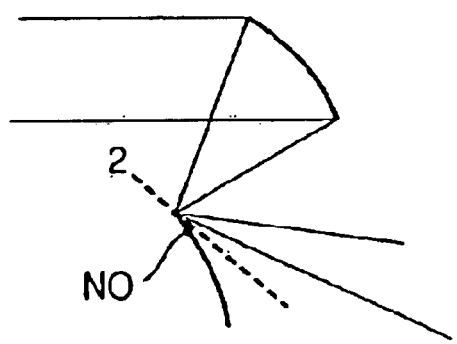
Figure 7E:
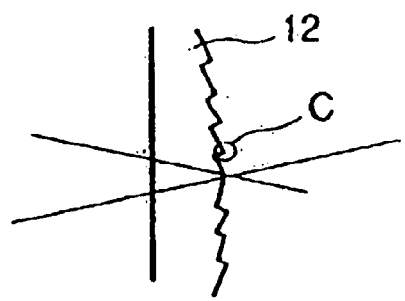

In this embodiment the description was focused on the noise source of the type of FIG. 7B, but the same can also be applied to the type of FIG. 7D (also including the hollow type as well as the internally solid type) and to the type of FIG. 7E.

The above discussion was given with the example where the generated aberration was generated uniformly at the all field angles, independent of the field angles, for simplicity. In general, the important point is that such a component is included as a bias component, however. Therefore, the present invention also involves systems in which an aberration component dependent on the field angle is overlaid, as long as the component uniformly generated at the all field angles without depending upon the field angle is included as a bias component and the above conditions for the size of spot are substantially satisfied at the all field angles.

Figure 2A:
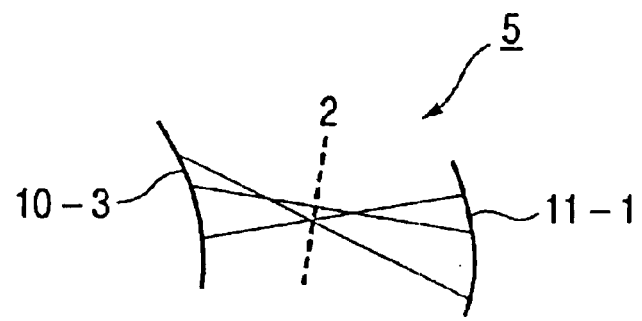
FIG. 2A and FIG. 2B are schematic diagrams of major part of Embodiment 2 according to the present invention.
Figure 2B:
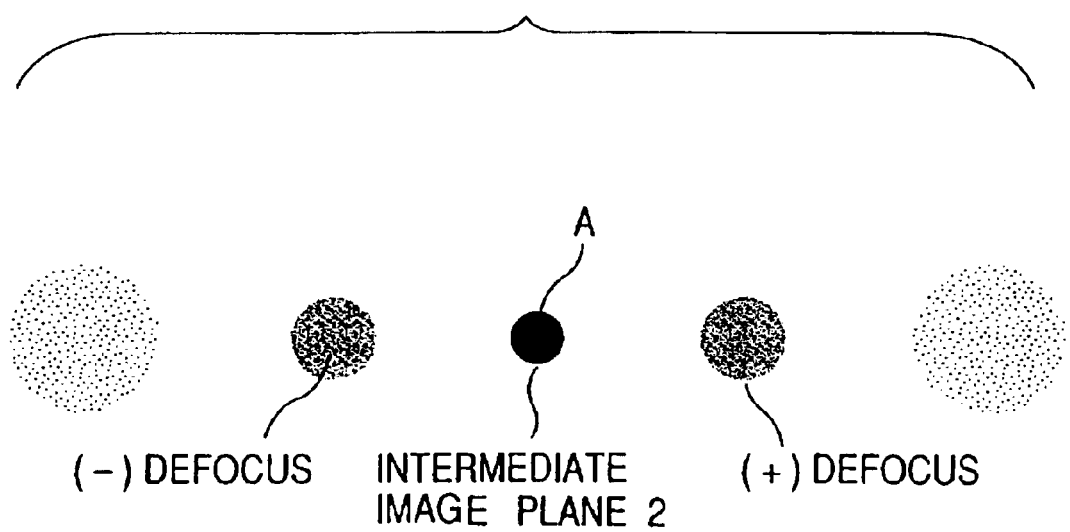

FIG. 2A is a conceptual drawing to show a part of Embodiment 2 of the optical system according to the present invention. FIG. 2A illustrates a part of a cross section of an optical path diagram. FIG. 2B is an explanatory drawing to illustrate defocus characteristics of spot diagrams near the internal image plane 2.

In FIG. 2A the imaging optical system 5 is a non-coaxial, off-axial, optical system, and FIG. 2A illustrates only the vicinity of the intermediate image plane 2, because the optical path diagram is almost the same as FIG. 1A. As in FIG. 1A, the surfaces 10-1, 10-2, 10-3, forming the object-side imaging element 10, and the surfaces 11-1, 11-2, 11-3, forming the image-side imaging element 11, are integrally formed and the intermediate image plane 2 is located in the internally solid optical material.

The present embodiment is different from Embodiment 1 in the type of aberration deliberately generated at the intermediate image plane 2. In the non-coaxial, off-axial, optical systems there generally exists aberration that appears independent of the field angle from on the axis to off the axis and by which rays in the meridional section jump out of the meridional section, called "aberration of torsion," in addition to the on-axis astigmatism.

In the present embodiment the imaging performance on the intermediate image plane 2 is degraded by generating this "aberration of torsion." This "aberration of torsion" does not appear in the conventional, rotationally symmetric systems, and will be described below in detail.

Figure 3A:
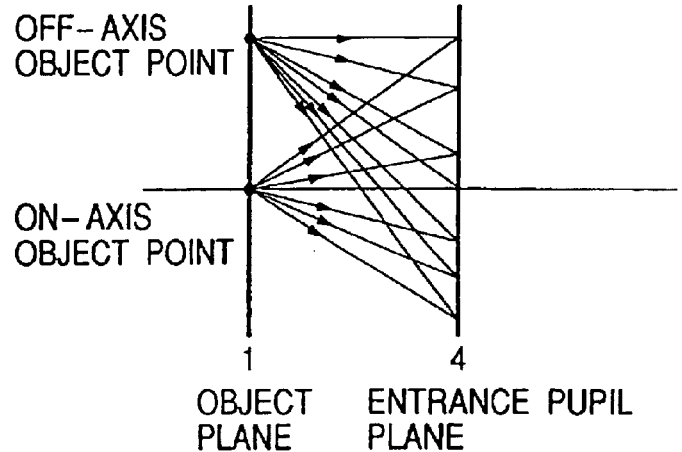
FIG. 3A, FIG. 3B, and FIG. 3C are conceptual drawings for explaining "aberration of torsion" according to the present invention.
Figure 3B:
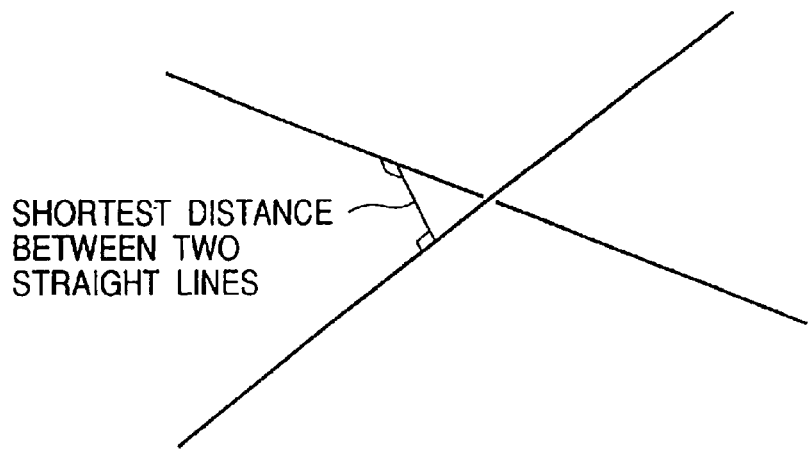

For example, if at least one of the component surfaces 10-1, 10-2, 10-3, 11-1, 11-2, 11-3 in FIG. 2A (thus in FIG. 1A) does not have symmetry with respect to the vertical direction in the plane of the drawing, even a group of rays having an equal azimuth on the surface of the entrance pupil 4 to an azimuth at the object point (they are called a ray group in the meridional section, which corresponds to a ray group included in the plane of FIG. 3A), after having passed the surface without symmetry, will not remain in the plane of meridional section and will change to those having "relation of torsion" as shown in FIG. 3B, in the three-dimensional space.

Figure 3C:
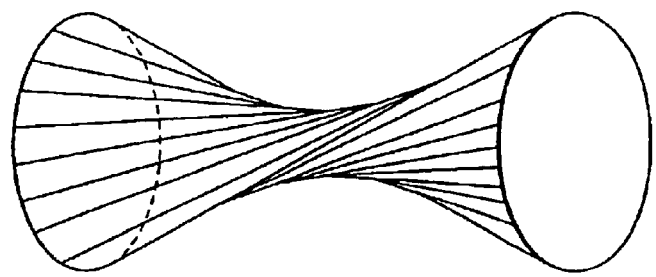

Therefore, the ray group in the mutual relation of torsion will not converge at a point. A group of conical rays emerging from the same object point but passing different-azimuth portions of the pupil in the same pupil diameter also have the mutual relation of torsion in the three-dimensional space after having passed through the surface without symmetry, so that the envelope composes a hyperboloid of one sheet as shown in FIG. 3C. FIG. 2B is a conceptual drawing of spot diagrams of such a ray group.

In general, this torsion is caused by a lack of symmetry of the system and the smallest order of amounts of the torsion is the first order as it is readily checked by ray tracing. Accordingly, this "aberration of torsion" is also aberration of the first order dependent on the first order of the pupil diameter. This aberration thus brings about greater degradation of intermediate imaging than the rotationally symmetric, spherical aberration occurring in the third order of the pupil diameter in the conventional systems, as shown in the schematic diagram of lateral aberration in FIG. 8 and as was the case with the on-axis astigmatism. Since the effect of this aberration of torsion is of the first order, the effect is equivalent to that of defocus.

Specifically, this aberration can be generated by absence of a common symmetry plane in the object-side imaging element and the image-side imaging element; that is, it can be produced when the elements have a surface including the component of $C_{11}$ in an equation representing the surface. It is apparent from inclusion of this $C_{11}$ that the aberration is of the first order.

The component $C_{11}$ is described in (Formula 1) in the specification of Japanese Patent Application Laid-open No. 9-5650. Specifically, in an optical system including a curved surface (off-axial curved surface), which is not a flat plane, wherein the normal to the surface does not agree with the reference axis at an intersecting point between the curved surface and an optical path (the reference axis) of the reference-wavelength light traveling from the object plane to the image plane, the shape of the off-axial curved surface is defined by the following formula starting from the second-order term in the coordinate system in which the origin is at the aforementioned intersecting point and the z-axis is taken along the normal to the surface.

$$z(x, y) = C_{20}x^2 + 2C_{11}xy + C_{02}y^2 + D_{30}x^3 + \\ 3D_{21}x^2y + 3D_{12}xy^2 + D_{03}y^3 + E_{40}x^4 + \\ 4E_{31}x^3y + 6E_{22}x^2y^2 + 4E_{13}xy^3 + E_{04}y^4 + \ldots \quad \text{(Formula 1)}$$

It is natural that the intermediate image plane 2 in the system having such aberration should take such defocus that the diameter of the spot is the smallest. Employing this, the same argument can be made as in Embodiment 1. (The "aberration of torsion" is independent of the field angle. This aberration is, however, aberration of the kind not appearing in the rotationally symmetric systems.) In the normal designing of optical system the system is designed so as to eliminate as much aberration as possible, whereas this embodiment also adopts the reverse conception of generating as much aberration on the intermediate image plane 2 as possible.

Namely, in the optical system of FIGS. 2A and 2B in the present embodiment, as shown in the conceptual drawing of the spot diagrams of FIG. 2B, the surfaces 10-1, 10-2, 10-3 forming the object-side imaging element 10 are designed so as to have the "aberration of torsion" appearing independent of the field angle on the intermediate image plane 2 and having such a property that the spot size is proportional to the pupil diameter.

Then the surfaces 11-1, 11-2, 11-3 forming the image-side imaging element 11 are designed so as to cancel the "aberration of torsion." Namely, each of the object-side imaging element 10 and the image-side imaging element 11 has the "aberration of torsion" singly, but the imaging optical system 5, which is the overall system comprised of the object-side imaging element 10 and the image-side imaging element 11, is an optical system corrected for aberration.

When the object-side imaging element 10 and the image-side imaging element 11 each include the "aberration of torsion" independent of the field angle as described above, even if there is a noise source such as the dust, bubble, or flaw near the intermediate image plane 2, the "aberration of torsion" prevents the noise source from eclipsing the all image information from the object points on the object plane 1; and the noise source is not imaged as a point on the final image plane 3 but is blurred by the "aberration of torsion," thus flattening the (disturbance of) light intensity distribution on the image plane due to the noise source.

In general the size of the spot near the intermediate image plane due to the "aberration of torsion" deliberately generated on the intermediate image plane differs depending upon tolerance specifications of noise caused by the noise source; however, if the spot size is two or more times, preferably three or more times, the size of the noise source posing the problem at the minimum aperture value (which relates to the resolution of the image pickup device and which is given approximately by (Eq 1) described previously), it is roughly estimated that the amount of light eclipsed by the noise source is not more than 25% (which is a closely permissible level though the effect is recognized, from the empirical aspect), desirably not more than 11% (which is a level in which the effect can be recognized first with attention, from the empirical aspect), as in Embodiment 1, thereby achieving the effect of flattening the disturbance of light intensity distribution on the image plane due to the noise source at all aperture values.

This means that for the minimum resolution b given by the size of the pixels of the image pickup device or the like, when β11 represents the image magnification of the image-side imaging element 11 in the case where the intermediate image plane 2 is imaged on the final image plane 3 on which the image pickup device is located, the size of the spot, which is two or more times, desirably three or more times, ((Eq 1) described previously), is defined to be not less than the following:

$$10 \cdot b / |\beta 11| \quad \text{(Eq 2)};$$

desirably, not less than the following:

$$15 \cdot b / |\beta 11| \quad \text{(Eq 3)};$$

whereby the effect of flattening the disturbance of light intensity distribution on the image plane due to the noise source can be achieved at all aperture values.

Here, |β11| indicates the absolute value of the image magnification β11 of the image-side imaging element 11. In the case of a specification based on a completely different aspect, where the noise source becomes inoffensive at the full aperture of the stop, if the size of the spot near the intermediate image plane due to the "aberration of torsion" deliberately generated at the full aperture is three or more times, desirably five or more times, the size of the noise source posing the problem (which relates to the resolution of the image pickup device and which is given approximately by (Eq 1) described previously), the disturbance of light quantity due to the noise source can be controlled to about 11% (which is a level in which the effect can be recognized first with attention, from the empirical aspect), desirably to approximately 4% (which is a level in which the effect is little recognized even with attention, from the empirical aspect) with the stop being of the full aperture.

This means that for the minimum resolution b given by the size of the pixels of the image pickup device or the like, when β11 represents the image magnification of the image-side imaging element 11 where the intermediate image plane 2 is imaged on the final image plane 3 on which the image pickup device is located, the size of the spot, which is determined to be three or more times, desirably five or more times, ((Eq 1) described previously), is not less than the following:

$$15 \cdot b / |\beta 11| \quad \text{(Eq 4)};$$

desirably, not less than the following:

$$25 \cdot b / |\beta 11| \quad \text{(Eq 5)};$$

whereby the disturbance of light quantity due to the noise source can be controlled to about 11% (which is a level in which the effect can be recognized first with attention, from the empirical aspect), desirably to about 4% (which is a level in which the effect is little recognized even with attention, from the empirical aspect), with the stop being of the full aperture. Here, |β11| indicates the absolute value of the image magnification β11 of the image-side imaging element 11.

In this embodiment the description was focused on the noise source of the type of FIG. 7B, but the same can also be applied to the type of FIG. 7D (also including the hollow type as well as the internally solid type) and to the type of FIG. 7E.

As one of higher-order aberration (which is the second order, higher in the order of dependence on the pupil diameter than the order of the "aberration of torsion") having the optical path diagram as shown in FIG. 2A, depending only on the pupil diameter but independent of the field angle, and not appearing in the rotationally symmetric systems, there is on-axis coma (also called decentration coma), and this aberration has a weaker effect of defocus than the "aberration of torsion" by the difference of the higher order. However, the effect is greater than the spherical aberration of the third order, which is the smallest order in the rotationally symmetric systems. This aberration also has the effect of defocusing the intermediate image similarly in the sense that the aberration is asymmetric aberration appearing independent of the field angle. Therefore, the effect of this aberration is the same as in Embodiment 2.

Also in this embodiment, the above discussion was given with the example where the generated aberration was generated uniformly at the all field angles, independent of the field angles, for simplicity. In general, the important point is that such a component is included as a bias component, however. Therefore, the present invention also involves systems in which an aberration component dependent on the field angle is overlaid, as long as the component uniformly generated at the all field angles without depending upon the field angle is included as a bias component and the above conditions for the size of spot are substantially satisfied at the all field angles.

Figure 4A:
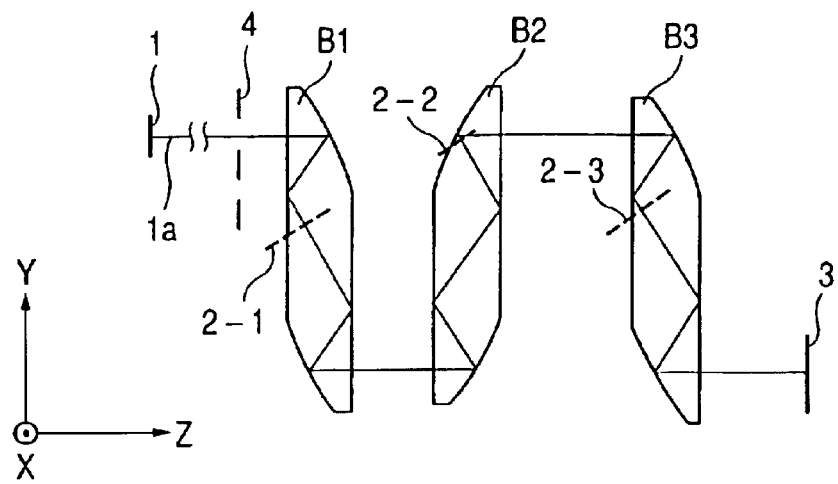
FIG. 4A, FIG. 4B, and FIG. 4C are schematic diagrams of major part of Embodiment 3 according to the present invention.
Figure 4B:
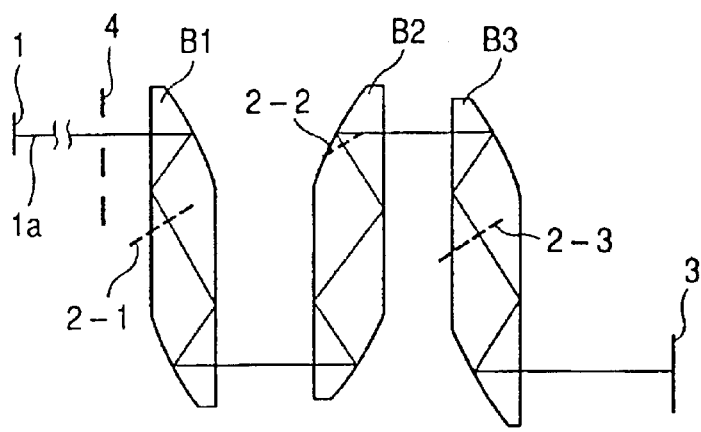
Figure 4C:
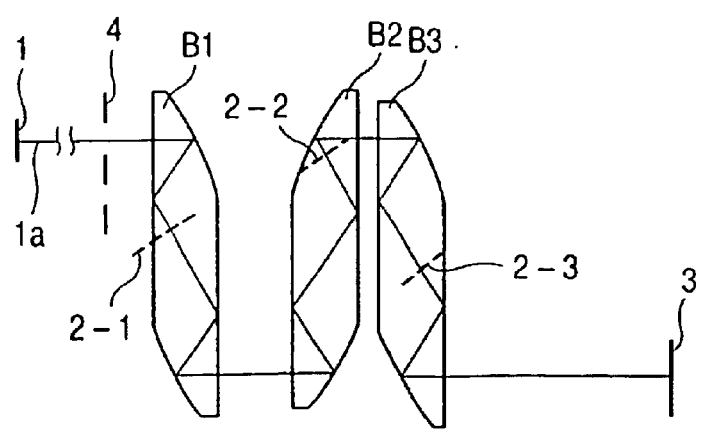

FIGS. 4A, 4B, and 4C are conceptual drawings of a major part of Embodiment 3 of the optical system according to the present invention. In this embodiment, the optical system involving the intermediate imaging is not a single lens but a zoom optical system. The zoom optical system as an off-axial, optical system corresponding to this embodiment is disclosed in Japanese Patent Application Laid-open No. 8-292372, wherein the image on the object plane 1 is formed by intermediate imaging and the intermediate image is imaged on the final image plane.

FIGS. 4A, 4B, and 4C show sections of optical path diagram in Embodiment 3. The present embodiment is expansion of the idea described in Embodiments 1 and 2 above to the zoom optical system and FIGS. 4A, 4B, and 4C show an example of a three-unit zoom system in which the focal length, magnification, and focus of the final image plane are varied by relative movement of three blocks indicated by the optical elements B1 to B3 in the direction of the reference axis La.

The present embodiment is the example in the structure wherein on the occasion of zooming from the wide-angle extreme to the telephoto extreme, the optical element B1 is fixed, the optical element B2 moves back and forth along a convex locus in the positive direction of the Z-axis, the optical element B3 moves in the negative direction of the Z-axis, and the final image plane 3 is fixed. These diagrams do not show defocus characteristics of spot diagrams near the three internal image planes 2-1, 2-2, 2-3 in the respective zoom states, but the characteristics are the same as in Embodiment 1 or in Embodiment 2.

In general, change in the focal length or change in the image magnification will result in changing the position of the intermediate image plane therewith. Under such circumstances, unless the imaging characteristics on the intermediate image plane are deliberately degraded, the noise source such as the dust, bubble, or flaw happens to be absent on the intermediate image plane at a certain focal length and at a certain image magnification and is thus inoffensive by chance in some cases, while the noise source often appears at another focal length and at another image magnification because of movement of the intermediate image plane in other cases.

The present embodiment thus employs the structure in which the imaging characteristics on the intermediate image planes are deliberately degraded in the all zoom states by utilizing freedom of asymmetry in the surface shapes of the off-axial, optical system and in which aberration is suppressed on the final image plane 3.

Generally speaking, this designing is possible because the off-axial, optical systems can use many coefficients expressing asymmetry, though values of the coefficients were 0 in the rotationally symmetric systems in terms of expression of surface. In general the size of the spot near the intermediate image plane due to the aberration independent of the field angle, deliberately generated on the intermediate image plane, differs depending upon tolerance specifications of noise caused by the noise source; however, if the spot size is two or more times, preferably three or more times, the size of the noise source posing the problem at the minimum aperture value (which relates to the resolution of the image pickup device and which is given approximately by (Eq 1) described previously), it is roughly estimated that the amount of light eclipsed by the noise source is not more than 25% (which is a closely permissible level though the effect is recognized, from the empirical aspect), desirably not more than 11% (which is a level in which the effect can be recognized first with attention, from the empirical aspect), as in Embodiment 1, thereby achieving the effect of flattening the disturbance of light intensity distribution on the image plane due to the noise source at the all aperture values.

This means that for the minimum resolution b given by the size of the pixels of the image pickup device or the like, when $\beta 11$ represents the image magnification of the image-side imaging element 11 in the case where the intermediate image plane 2 is imaged on the final image plane 3 on which the image pickup device is located, the size of the spot, which is two or more times, desirably three or more times, ((Eq 1) described previously), is defined to be not less than the following:

$$10 \cdot b/|\beta 11| \qquad (\text{Eq 2});$$

desirably, not less than the following:

$$15 \cdot b/|\beta 11| \qquad (\text{Eq 3});$$

whereby the effect of flattening the disturbance of light intensity distribution on the image plane due to the noise source can be achieved at the all aperture values.

Here, $|\beta 11|$ indicates the absolute value of the image magnification $\beta 11$ of the image-side imaging element 11. In the case of a specification based on a completely different aspect, where the noise source becomes inoffensive at the full aperture of the stop, if the size of the spot near the intermediate image plane due to the aberration independent of the field angle, deliberately generated at the full aperture is three or more times, desirably five or more times, the size of the noise source posing the problem (which relates to the resolution of the image pickup device and which is given approximately by (Eq 1) described previously), the disturbance of light quantity due to the noise source can be controlled to about 11% (which is a level in which the effect can be recognized first with attention, from the empirical aspect), desirably to approximately 4% (which is a level in which the effect is little recognized even with attention, from the empirical aspect), with the stop being of the full aperture.

This means that for the minimum resolution b given by the size of the pixels of the image pickup device or the like, when $\beta 11$ represents the image magnification of the image-side imaging element 11 where the intermediate image plane 2 is imaged on the final image plane 3 on which the photoreceptive surface of the image pickup device is located, the size of the spot, which is determined to be three or more times, desirably five or more times, ((Eq 1) described previously), is not less than the following:

$$15 \cdot b/|\beta 11| \qquad (\text{Eq 4});$$

desirably, not less than the following:

$$25 \cdot b/|\beta 11| \qquad (\text{Eq 5});$$

whereby the disturbance of light quantity due to the noise source can be controlled to about 11% (which is a level in which the effect can be recognized first with attention, from the empirical aspect), desirably to about 4% (which is a level in which the effect is little recognized even with attention, from the empirical aspect), with the stop being of the full aperture.

Here, $|\beta 11|$ indicates the absolute value of the image magnification $\beta 11$ of the image-side imaging element 11. Also in this embodiment, the above discussion was given with the example where the generated aberration was generated uniformly at the all field angles, independent of the field angles, for simplicity. In general, the important point is that such a component is included as a bias component, however.

Therefore, the present invention also involves systems in which an aberration component dependent on the field angle is also overlaid, as long as a component uniformly generated at the all field angles without depending upon the field angle is included as a bias component and the above conditions for the size of spot are substantially satisfied at the all field angles.

In the description of the four embodiments so far, the discussion was mainly focused on the size of the noise source posing the problem in the range of about (Eq 1). This is because attention is given to the largest number of noise sources showing the influence, based on the fact that the number of noise sources such as dust particles present in the optical systems produced in controlled processes increases with decreasing diameter but quickly decreases with increasing diameter in general (see the schematic graph of FIG. 5).

In general, there are, however, noise sources sizes of which, posing the problem, are not less than (Eq 1). Generally, when a light reaches the final image plane without being eclipsed even in part, information is transmitted to the final image plane, aside from the issue of light quantity; when the spot diameter on the intermediate image plane is equal to the size of the noise source present at that position, the light from the object plane is completely eclipsed, so that the information from the object plane is completely lost in that portion. It is hard to restore this completely lost information even by some process such as image processing. Taking this point into account, let us explain the meaning of that the diameter of the spot on the intermediate image plane is "two or more times, desirably three or more times, at the minimum aperture" or "three or more times, desirably five or more times, at the full aperture" larger than the diameter r0 of the minimum noise source posing the problem, as described in the embodiments.

Figure 5:
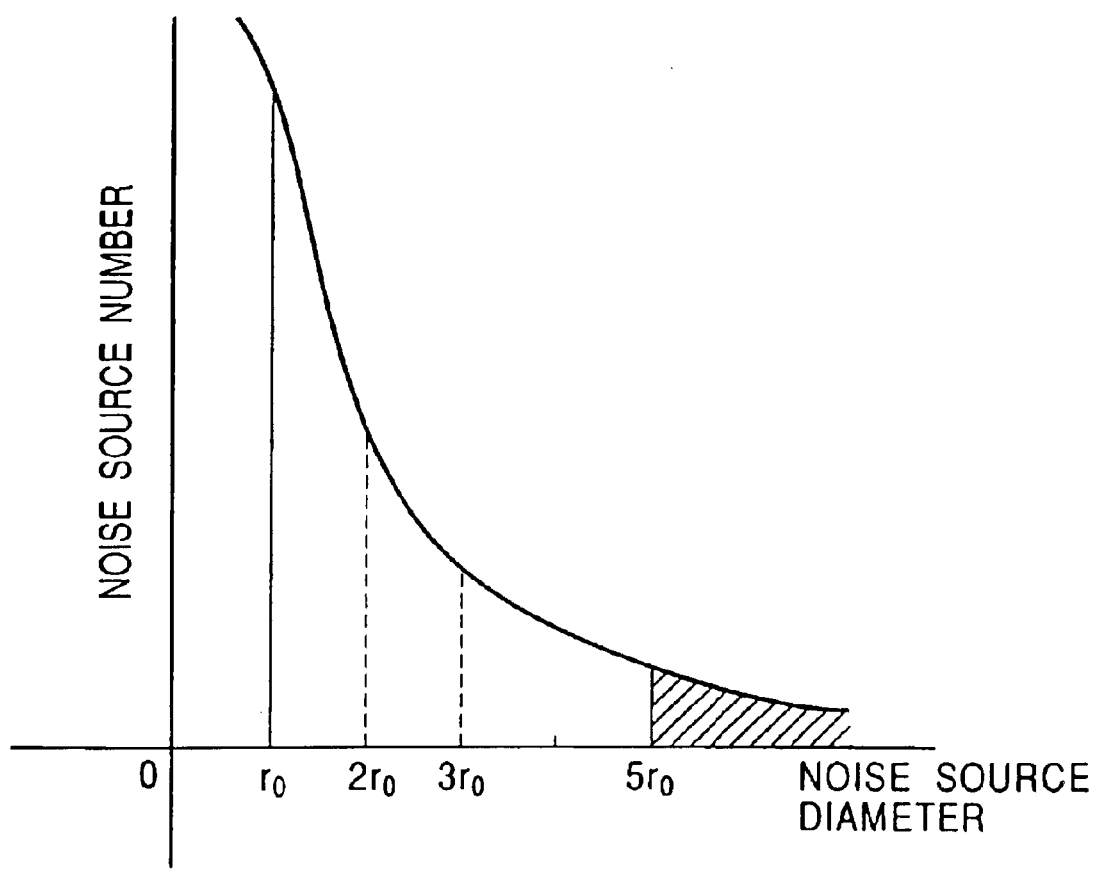
FIG. 5 is a schematic diagram to show the relation between diameter of noise source and number (density) of noise source.

In general, increase in the spot diameter on the intermediate image plane means increase therewith in the size of the noise source causing the complete loss of information. Taking account of the fact that the number of such noise sources as the dust particles existing in the optical systems produced in the controlled processes increases with decreasing size but quickly decreases with increasing size as schematically shown in the graph of FIG. 5, the above means that the number of noise sources causing complete loss of information quickly decreases with increasing spot size on the intermediate image plane. (The hatched porion in FIG. 5 corresponds to the number of noise sources causing complete loss of information where the spot size on the intermediate image plane is five times r0, and the number is quickly decreased when compared with the case where the spot diameter is r0.) This is equivalent to that the defective rate due to the noise sources of the imaging optical system is quickly decreased with increasing spot size on the intermediate image plane.

Figure 23:
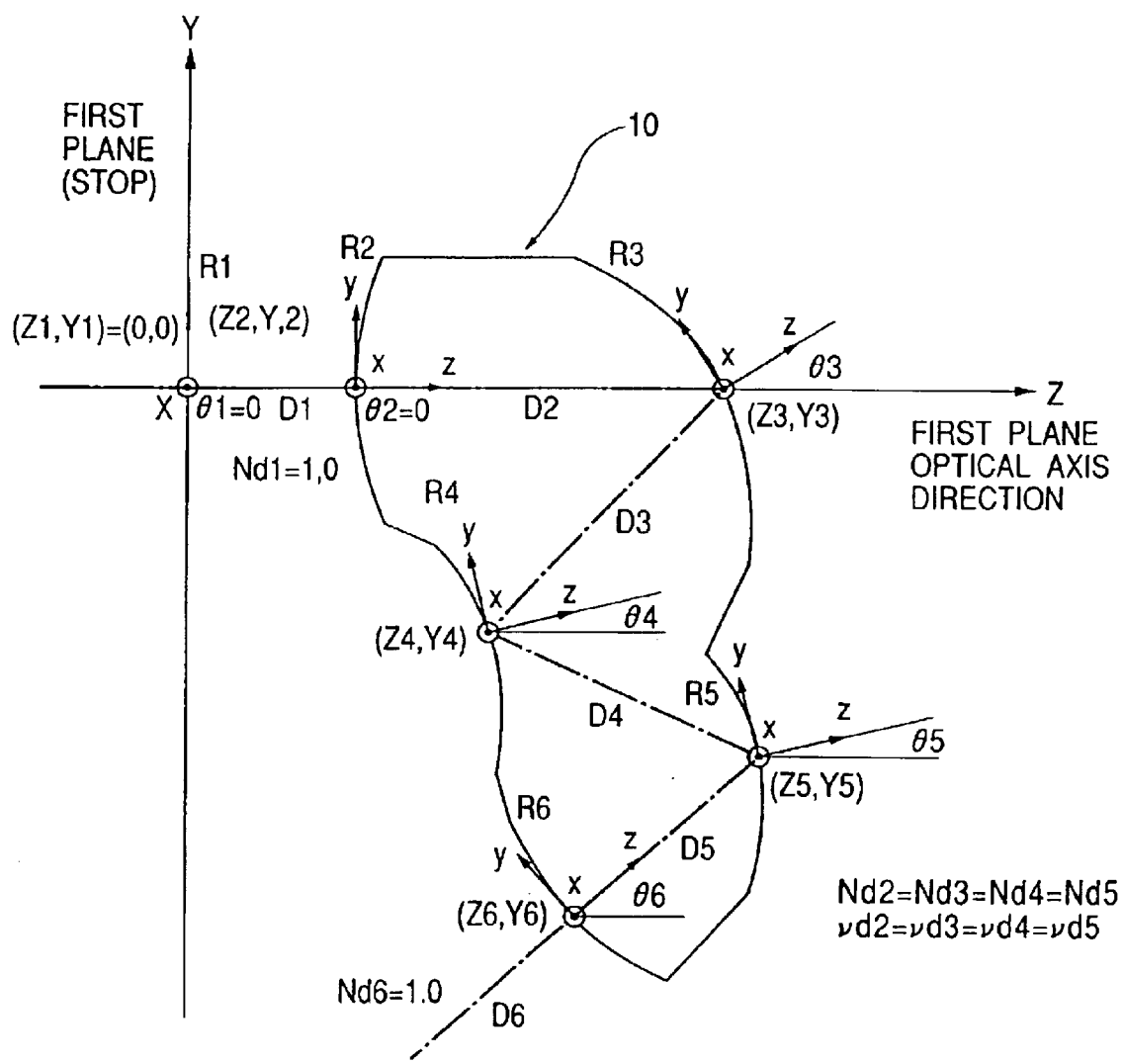
FIG. 23 is an explanatory drawing of a coordinate system in the embodiments of the present invention.

Before explaining embodiments 4 to 9 of the present invention, let us next explain the way of expressing the component specifications of the optical elements (also called optical systems) according to the present invention, and common items to the embodiments. FIG. 23 is an explanatory drawing for explaining the coordinate system for defining component data of the optical elements of the present invention. In the optical elements of the present invention a surface at the i-th place along a ray traveling from the object side to the image plane (which is indicated by the chain line in FIG. 23 and which is called the reference-axis ray) is defined as the i-th surface. In FIG. 23 the first surface R1 is the stop, the second surface R2 is a refractive surface coaxial with the first surface, the third surface R3 is a reflective surface tilted relative to the second surface R2, the fourth surface R4 and the fifth surface R5 are reflective surfaces each shifted and tilted relative to their preceding surface, and the sixth surface R6 is a refractive surface shifted and tilted relative to the fifth surface R5. The surfaces of the second surface R2 to the sixth surface R6 are formed on one optical element made of a medium such as glass or plastic material, which is the optical element 10 in FIG. 23.

In the structure of FIG. 23 the medium between the object plane not illustrated and the second surface R2 is air, the region between the second surface R2 and the sixth surface R6 is made of a common medium, and the medium from the sixth surface R6 to the seventh surface R7 not illustrated is air.

Since the optical elements of the present invention compose the off-axial, optical systems, the surfaces forming each of the optical elements share no common optic axis. Therefore, first set in the embodiments of the present invention is an absolute coordinate system having the origin at the center of the ray-effective diameter of the first surface.

In the embodiments of the present invention, the origin is defined at the center point of the ray-effective diameter of the first surface and a path of a ray passing the origin and the center of the final image plane (the reference-axis ray) is defined as the reference axis of the optical system. Further, the reference axis in the embodiments has the direction (orientation). The direction is one in which the reference-axis ray travels for imaging.

Although the reference axis as the reference of optical elements was set as described above in the embodiments of the present invention, the axis for the reference of the optical system can also be determined to be any convenient axis in terms of optical design, handling of aberration, or expression of each surface shape forming the optical system. However, the reference axis for the reference of the optical system is normally set along a path of a ray passing the center of the image plane and either one of the stop, the entrance pupil, the exit pupil, the center of the first surface of the optical system, and the center of the final surface thereof.

Namely, in the embodiments of the present invention, the reference axis is set along the path in which the ray passing the center point of the ray-effective diameter of the first surface or the stop surface and reaching the center of the final image plane (the reference-axis ray) is refracted and reflected by the refractive surfaces and reflective surfaces. The order of the surfaces is set according to the order of refraction and reflection of the reference-axis ray. Accordingly, the reference axis changes its direction according to the law of refraction or reflection along the order of the surfaces thus set, to reach the center of the image plane at last.

The tilt surfaces forming the optical element of each embodiment of the present invention are basically tilted all in the same plane. The axes of the absolute coordinate system are thus defined as follows.

Z-axis: the reference axis passing the origin and directed to the second surface R2

Y-axis: straight line passing the origin and making 90° counterclockwise with respect to the Z-axis in the tilt plane (in the plane of FIG. 23)

X-axis: straight line passing the origin and being perpendicular to each axis of Z and Y (straight line normal to the plane of FIG. 23)

For expressing a surface shape of the i-th surface forming the optical element, recognition of shape becomes easier with a way of setting a local coordinate system with the origin at an intersecting point between the reference axis and the i-th surface and expressing the surface shape of the surface by the local coordinate system, rather than the way of expressing the surface shape by the absolute coordinate system. Therefore, the surface shape of the i-th surface will be expressed by the local coordinate system in the embodiments described with component data of the present invention.

An angle of tilt of the i-th surface in the YZ plane is expressed by angle $\theta_i$ (in units of °), which is positive in the counterclockwise direction with respect to the Z-axis of the absolute coordinate system. Therefore, the origin of the local coordinate system of each surface is placed on the YZ plane in FIG. 23 in the embodiments of the present invention. There is no decentration of the surfaces in the XZ plane and in the XY plane. Further, the y-axis and z-axis of the local coordinate system (x,y,z) of the i-th surface are inclined at the angle θi in the YZ plane with respect to the absolute coordinate system (X,Y,Z), and the axes are set specifically as follows.

- z-axis: straight line passing the origin of the local coordinate system and making the angle θi counterclockwise in the YZ plane with respect to the Z-direction of the absolute coordinate system
- y-axis: straight line passing the origin of the local coordinate system and making 90° counterclockwise in the YZ plane with respect to the z-direction
- x-axis: straight line passing the origin of the local coordinate system and being perpendicular to the YZ plane Further, Di represents a scalar quantity indicating a distance between the origins of the local coordinate systems for the i-th surface and for the (i+1)th surface, and Ndi and vdi the refractive index and Abbe's number of a medium between the i-th surface and the (i+1)th surface.

Each of the embodiments of the present invention will be described with a sectional view of the optical element and the numerical data. For the optical system of Embodiment 8 of the preset invention described hereinafter, the overall focal length will be varied by movement of plural optical elements (i.e., the power is changed). In Embodiment 8 there are sectional views of the optical system at the three positions, the wide-angle extreme (W), the telephoto extreme (T), and a middle position (M) between them, and numerical data given.

In the optical element of FIG. 23, with movement of the optical element in the YZ plane the origins (Yi,Zi) of the local coordinate systems for expressing the positions of the respective surfaces vary so as to have different values at respective zoom positions. Since in Embodiment 8 accompanied by the numerical data the optical elements moving for zooming are those moving only in the Z-direction, the coordinate values Zi will be expressed by Zi(W), Zi(M), and Zi(T) in the order of the states at the wide-angle extreme, at the middle position, and at the telephoto extreme of the optical system.

Coordinate values of each surface will be indicated by those at the wide-angle extreme, and values at the middle point and at the telephoto extreme are described by differences from those at the wide-angle extreme. Specifically, when a and b represent movement amounts at the middle position (M) and at the telephoto extreme (T), respectively, from the wide-angle extreme (W), the coordinate values Zi thereat are expressed as follows.

$Zi(M)=Zi(W)+a$ $Zi(T)=Zi(W)+b$

Signs for a and b are determined to be positive for movement of each surface in the positive Z-direction but negative for movement in the negative Z-direction. A surface separation Di varying with this movement is a variable and values at the respective zoom positions will be indicated together in another table.

The embodiments of the present invention has spherical surfaces and rotationally asymmetric, aspherical surfaces. For each spherical part among them, a radius of curvature Ri thereof will be given to express the spherical shape. The signs for the radius of curvature Ri are defined as follows; the sign is negative when the center of curvature is located on the first surface side along the reference axis directed from the first surface to the image plane (the chain line in FIG. 23); the sign is positive when the center of curvature is located on the image plane side.

Each spherical surface has the shape expressed by the following equation:

$z=[(x^2+y^2)/Ri]/[1+\{1-(x^2+y^2)/Ri^2\}^{1/2}]$.

Each optical element of the present invention has at least one rotationally asymmetric, aspherical surface, and the shape thereof is expressed by the following equation:

$z=A/B+C02y^2+C20x^2+C03y^3+C21x^2y+C04y^4+C22x^2y^2+C40x^4$, where $A=(a+b)\cdot(y^2\cdot\cos^2 t+x^2)$, $B = 2a\cdot b\cdot\cos t[1 + \{(b-a)\cdot y\cdot\sin t/(2a\cdot b)\} + < 1 +$ $\{(b-a)\cdot y\cdot\sin t/(a\cdot b)\} - \{y^2/(a\cdot b)\} -$ $\{4a\cdot b\cdot\cos^2 t + (a+b)^2\sin^2 t\}x^2/(4a^2 b^2\cos^2 t) >^{1/2}]$.

Since the above equation for curved surface includes only the terms of even powers with respect to x, curved surfaces defined by the above equation for curved surface have the shape of plane symmetry with respect to the symmetry plane of the yz plane. If the following conditions are further satisfied, a curved surface has a shape symmetric with respect to the xz plane.

$C03=C21=0$ and $t=0$

If the following conditions are further satisfied, a curved surface has a rotationally symmetric shape.

$C02=C20$ and $C04=C40=C22/2$

If the above conditions are not met, a curved surface has a rotationally asymmetric shape.

In each embodiment of the present invention the first surface is the aperture stop, as shown in FIG. 23. A horizontal field angle uY is a maximum field angle of a light incident to the stop R1 in the YZ plane of FIG. 23 and a vertical field angle uX a maximum field angle of a light incident to the stop R1 in the XZ plane. The diameter of the stop R1 being the first surface will be indicated as an aperture diameter. This relates to brightness of the optical system. Since the entrance pupil is located at the first surface, the above aperture diameter is equal to the diameter of the entrance pupil.

A range of an effective image on the image plane will be indicated by an image size. The image size will be represented by a rectangular region having a horizontal length defined by a size in the y-direction of the local coordinate system and a vertical length defined by a size in the x-direction.

Lateral aberration diagrams will be given for each embodiment provided with component data. The lateral aberration diagrams show lateral aberrations of light at angles of incidence to the stop R1, (uX,uY), (uX,0), (uX,-uY), (0,uY), (0,0), (0,-uY) as a combination of vertical incidence angle and horizontal incidence angle, for each embodiment.

For Embodiment 8, lateral aberrations will be indicated in the states at the wide-angle extreme (W), at the middle position (M), and at the telephoto extreme (T). In the lateral aberration diagrams the abscissa represents a height of incidence to the pupil and the ordinate an amount of aberration. Since in each embodiment each surface is basically of a plane-symmetry shape with respect to the symmetry plane of the yz plane, the lateral aberration diagrams in the positive direction of the vertical field angle are the same as those in the negative direction, and thus the lateral aberration diagrams in the negative direction are omitted for simplicity of illustration.

The sizes of bubbles and particles posing the problem in terms of the optical performance, existing inside the optical element, or the widths of flaws or the sizes D of deposits etc. on the reflective surfaces, are approximately 10 to 100 μm. Let us keep on the description, assuming that the size D is 35 μm. The size D can be deemed as an inspection criterion mainly for determination of defective. Further, the description will be carried on assuming that the pixel size of CCD being the image pickup device is 6 μm square, i.e., that the resolution b is 6 μm.

If the width of the smallest spot is wider than the size of the bubble, particle, deposit, or the like, a decrease in light quantity due to the bubble, particle, deposit, or the like is determined by the area of the smallest spot and the area of the bubble, particle, deposit, or the like; if the width of the smallest spot is narrower than the size of the bubble, particle, deposit, or the like, the decrease in light quantity is determined by the length of the smallest spot and the size of the bubble, particle, deposit, or the like.

Let us next explain meanings of Conditions (1a), (2a), (3a), (4a) described previously. The synthetic focal lengths were computed by reference to Japanese Patent Application Laid-open No. 9-5650. When the astigmatism independent of the field angle is generated, values of the focal length of the optical system vary depending upon azimuths.

Let $f_{max}$ be the maximum focal length out of those of the optical system in which the astigmatism independent of the field angle is generated, S be on-axis astigmatic difference, and R be the diameter of the exit pupil against the focal length $f_{max}$. When the light spot of on-axis rays first becomes linear, the length of the light spot can be expressed by the following.

$$\left| \frac{R \cdot S}{f_{max}} \right|$$

Namely, the left side of Conditions (1a), (3a) represents a ratio of the size of the bubble, particle, or the like posing the problem, present in the optical element, or the width of flaw or the size of the deposit or the like on the reflective surface (D, or 5b/|β|) to the length of the linear light spot at the intermediate image position and at the full aperture. When the astigmatism independent of the field angle is generated, the effect of the bubble, particle, deposit, or the like becomes maximum when the light spot is linear. Therefore, the smaller the left side of Conditions (1a), (3a), the smaller the decrease in light quantity due to the bubble, particle, deposit, or the like. Too small values of the left side of Conditions (1a), (3a) are not preferred in terms of aberration correction, however.

With astigmatism the light spot becomes linear twice, and the length of the light spot at occurrence of the first linear shape becomes shorter. Therefore, we must focus attention on the light spot at occurrence of the first linear shape. Conditions (2a), (4a) are those taking account of the cases of small apertures.

The level of the decrease in light quantity due to the bubble, particle, deposit, or the like varies depending upon the photosensitive material, the light receiving device, and so on, but the decrease in light quantity can be controlled to not more than 10% at the full aperture when Conditions (1a), (2a) are satisfied; as long as the decrease in light quantity is about 10%, the effect of the bubble, particle, deposit, or the like is inoffensive on the image. If Conditions (3a), (4a) are satisfied, the decrease in light quantity can be controlled to not more than 30% at small apertures of the stop. As the diameter of small aperture becomes smaller and smaller, it becomes more difficult to decrease the left side of Conditions (3a), (4a), as at the full aperture, and it is not preferred in terms of aberration correction. However, the decrease in light quantity of about 30% can be corrected for on an electrical basis, and the combination with the electrical correction enables the effect of the bubble, particle, deposit, or the like on the image to be reduced as at the full aperture of the stop.

Figure 9:
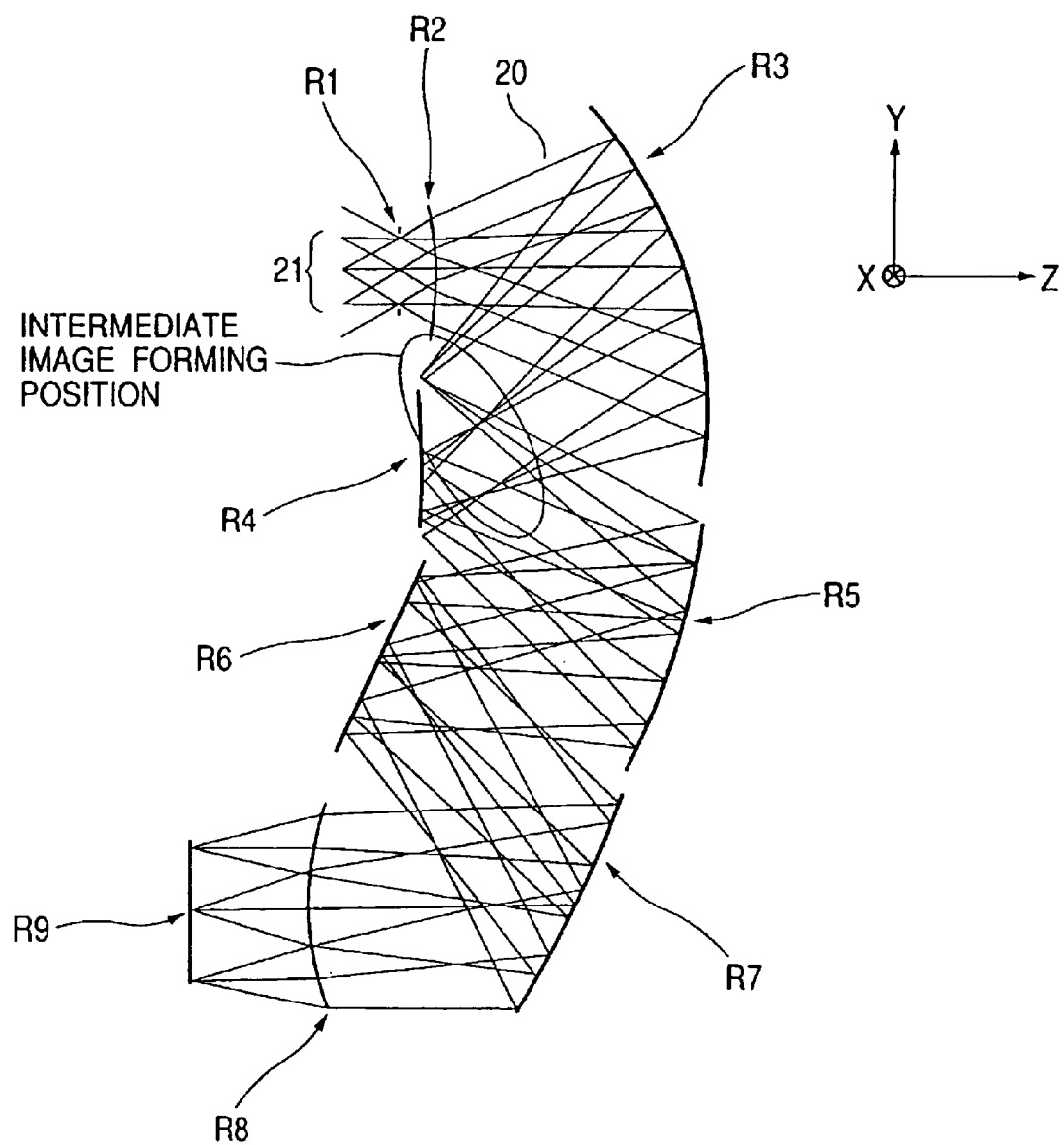
FIG. 9 is an optical, sectional view in the YZ plane of Embodiment 4 of the present invention.
Figure 10:
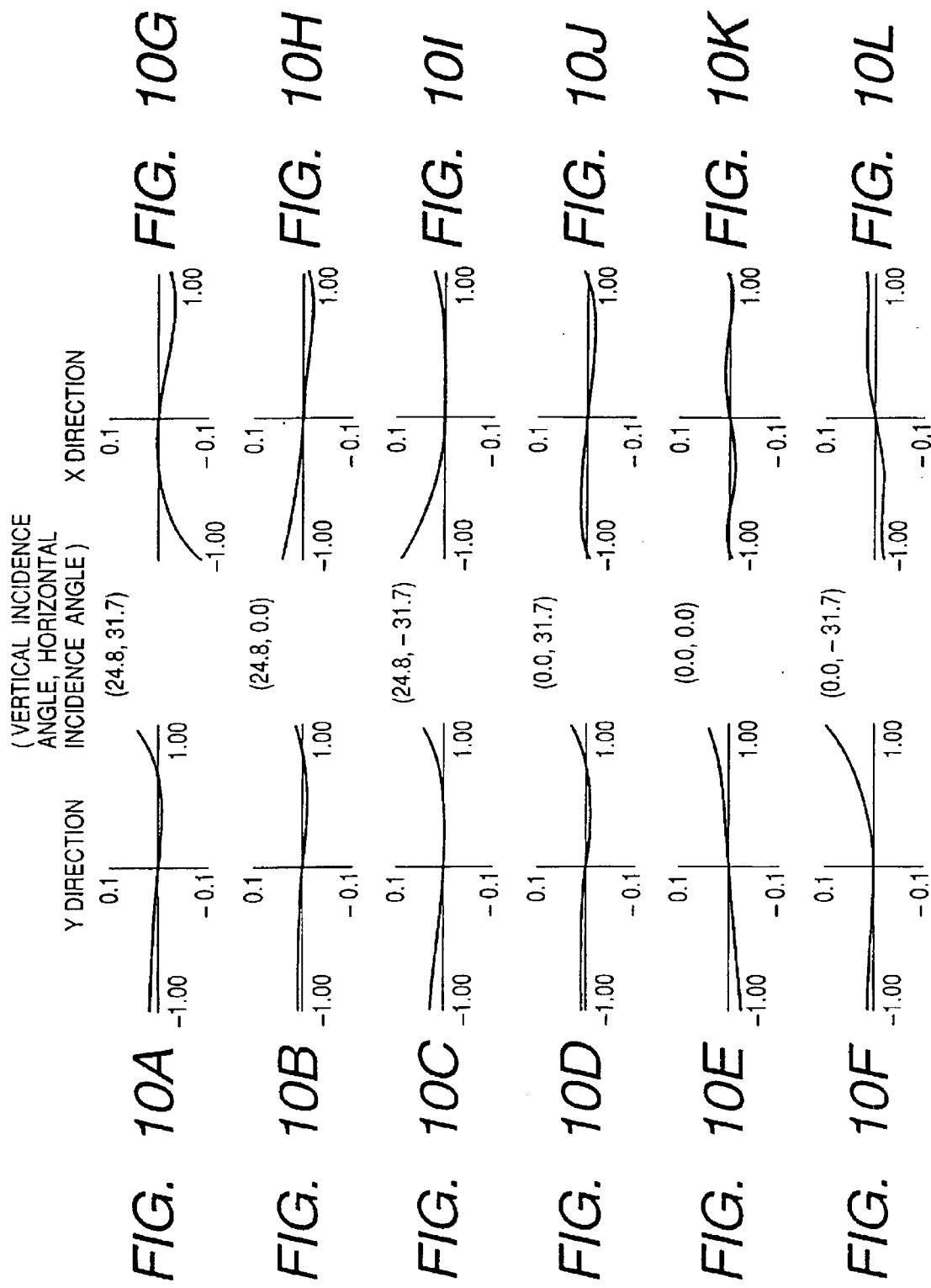
FIGS. 10A, 10B, 10C, 10D, 10E, 10F, 10G, 10H, 10I, 10J, 10K and 10L are lateral aberration diagrams of Embodiment 4.

FIG. 9 is a sectional view in the YZ plane of the optical system of Embodiment 4 of the present invention. The present embodiment is a photographing optical system having the horizontal view angle of 63.4° and the vertical view angle of 49.6°. FIG. 9 also illustrates optical paths.

In the present embodiment the astigmatism independent of the field angle is generated at the intermediate image position and valves of Conditions (1a), (3a) are calculated as follows.

$$\left| \frac{D \cdot f1}{S \cdot AR1} \right| = \frac{0.035 \times 3.86}{0.79 \times 2} = 0.086 < 0.1$$

$$\left| \frac{5b \cdot f1}{|\beta| \cdot S \cdot AR1} \right| = \frac{0.030 \times 3.86}{0.98 \times 0.79 \times 2} = 0.075 < 0.1$$

The present embodiment thus satisfies Conditions (1a), (3a).

The component data of the present embodiment is as follows.

| | | Half horizontal field angle | | | 31.7 | | |
|---|---|---|---|---|---|---|---|
| | | Half vertical field angle | | | 24.8 | | |
| | | Aperture diameter | | | 2.00 | | |
| | | Image size | | | 4 mm horizontal × 3 mm vertical | | |
| i | Yi | Zi | θi | Di | Ndi | νdi | |
| 1 | 0.00 | 0.00 | 0.00 | 1.12 | 1 | | aperture stop |
| 2 | 0.00 | 1.12 | 0.00 | 7.49 | 1.58310 | 30.20 | refractive surface |

-continued

| | | | | | | | |
|---|---|---|---|---|---|---|---|
| 3 | 0.00 | 8.61 | 18.49 | 9.86 | 1.58310 | 30.20 | reflective surface |
| 4 | −5.93 | 0.73 | 0.58 | 9.30 | 1.58310 | 30.20 | reflective surface |
| 5 | −11.38 | 8.28 | −16.00 | 8.90 | 1.58310 | 30.20 | reflective surface |
| 6 | −11.97 | −0.61 | −24.51 | 9.39 | 1.58310 | 30.20 | reflective surface |
| 7 | −19.45 | 5.06 | −26.42 | 8.02 | 1.58310 | 30.20 | reflective surface |
| 8 | −19.45 | −2.96 | 0.00 | 3.68 | 1 | | refractive surface |
| 9 | −19.45 | −6.64 | −0.00 | | 1 | | image plane |

Spherical shapes

R2 surface r2 = −9.921
R8 surface r8 = 9.764

Aspherical shapes

| | | | |
|---|---|---|---|
| R3 surface | a = −1.11675e+01 | b = −1.26065e+01 | t = 2.80750e+01 |
| | C03 = 3.54262e−04 | C21 = −1.11331e−05 | |
| | C04 = 3.48452e−05 | C22 = 1.63301e−04 | C40 = 1.67279e−04 |
| R4 surface | a = −2.52460e+00 | b = 4.41616e+00 | t = −3.55268e+01 |
| | C03 = −4.00282e−03 | C21 = −5.33693e−03 | |
| | C04 = 1.64937e−03 | C22 = 1.34006e−03 | C40 = −5.90675e−04 |
| R5 surface | a = −6.17120e+00 | b = 1.69072e+01 | t = −2.95634e+01 |
| | C03 = −6.52258e−04 | C21 = −1.37521e−03 | |
| | C04 = 2.48644e−05 | C22 = −1.37172e−04 | C40 = −1.48694e−04 |
| R6 surface | a = −9.06348e+02 | b = −9.17518e+02 | t = 8.32864e+01 |
| | C03 = 9.11828e−04 | C21 = −2.36281e−05 | |
| | C04 = −7.11253e−05 | C22 = −4.01035e−04 | C40 = −4.11690e−04 |
| R7 surface | a = −1.95290e+01 | b = −2.20227e+02 | t = −1.50576e−01 |
| | C03 = 2.80664e−04 | C21 = −6.98915e−04 | |
| | C04 = 5.82181e−07 | C22 = −7.51310e−05 | C40 = −1.54783e−04 |

In FIG. 9 reference numeral 20 designates an optical element having a plurality of curved, reflective surfaces, which is made of a transparent body such as glass. In the surface of the optical element 20 there are a concave, refractive surface (entrance surface) R2 having a negative refractive power, five reflective surfaces of concave mirror R3, convex mirror R4, concave mirror R5, reflective surface R6, and concave mirror R7, and a convex, refractive surface (exit surface) R8 having a positive refractive power, formed in the order of passage of rays from the object. R1 represents the stop located on the object side of the optical element 20 and R9 the final image plane, on which the image pickup surface of the image pickup device such as CCD is located. The two refractive surfaces are rotationally symmetric, spherical surfaces, and all reflective surfaces are surfaces symmetric only with respect to the YZ plane.

The object-side imaging element is defined by the region from the entrance surface R2 to the surface (R3) on the object side of the intermediate image plane, while the image-side imaging element by the region from the surface R4 to the final surface (R8) on the image side of the intermediate image plane. The same is also applicable to each of the embodiments described below.

The imaging action in the present embodiment will be described below. The light 21 from the object is regulated in the quantity of incident light by the stop (entrance pupil) R1 and thereafter it is incident to the entrance surface R2 of the optical element 20. Then the light is reflected by the surface R3 and thereafter is once focused between the surfaces R3 and R4. Then the light is reflected in order at the surfaces R4, R5, R6, R7 to emerge from the exit surface R8 and be again focused on the final image plane R9.

As described, the optical element 20 functions as a lens unit having desired optical performance and having a positive refractive power as a whole by the refractive powers of the entrance and exit surfaces and the refractive powers of the plurality of curved, reflective mirrors therein.

In the present embodiment, focusing to a near object is achieved by moving the whole of the optical element 20 relative to the image pickup surface R9 of the image pickup device. Particularly, since the present embodiment is arranged so that the direction of the reference axis at the entrance of the optical element 20 is parallel to the direction of the reference axis at the exit of the optical element 20, the focusing operation can be performed by moving the whole optical element in parallel to the direction of the reference axis at the exit thereof (i.e., in the direction of the Z-axis), in the same manner as in the conventional lens systems. The lateral aberration diagrams of the optical element of the present embodiment are shown in FIGS. 10A to 10L. It is seen that a well-balanced aberration correction state is achieved in the present embodiment.

Figure 6A:
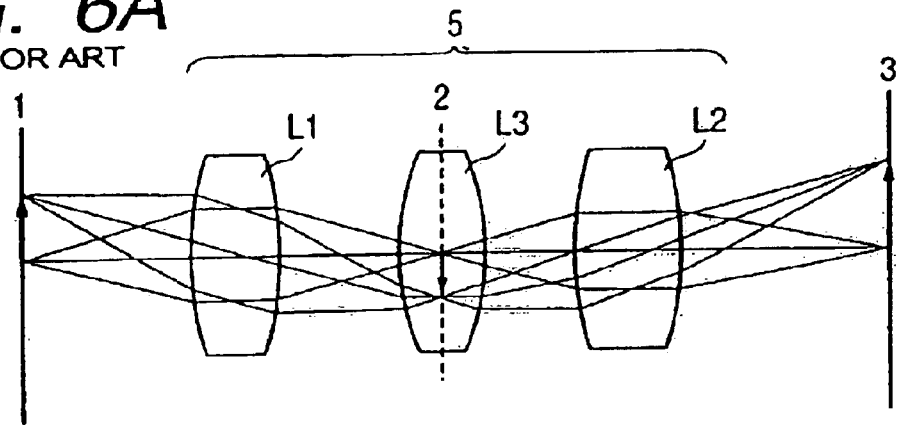
FIG. 6A, FIG. 6B, and FIG. 6C are conceptual drawings of the conventional imaging systems involving intermediate imaging.
Figure 6B:
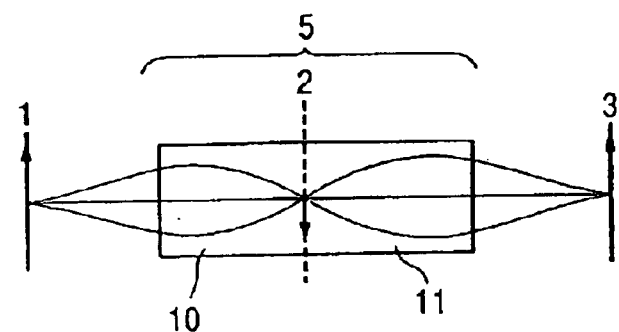
Figure 6C:
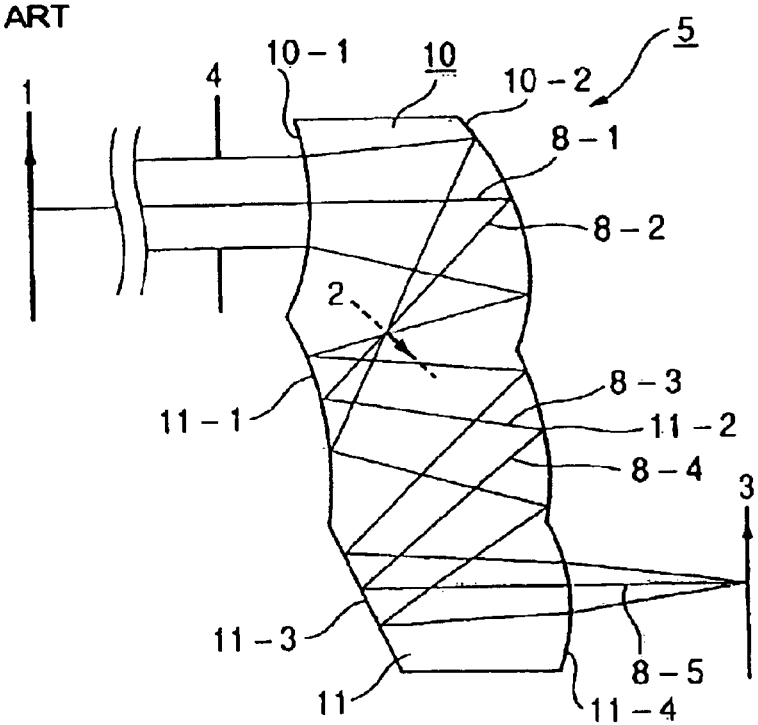

The effect of the present embodiment will be described below. FIG. 24 illustrates on-axis and off-axis smallest spots near the intermediate image plane of the conventional reflecting optical system (optical element) shown in FIG. 6C. In this case, if a bubble or a particle having the size of 35 $\mu$m exists at the position of the smallest spot, the area of the on-axis smallest spot will be about 3535 $\mu$m$^2$. Since the area of the bubble or particle having the size of 35 $\mu$m is about 962 $\mu$m$^2$, the light quantity of about 27.2% will be lost. On the other hand, the area of the off-axis smallest spot is about 9210 $\mu$m$^2$, and it is thus understood that the light quantity of about 10.4% is lost. The decrease in light quantity due to the bubble or particle is smaller off the axis because of occurrence of greater aberration in the off-axis region.

FIG. 25 illustrates the on-axis and off-axis smallest spots near the intermediate image plane in Embodiment 4. If the bubble or particle having the size of 35 μm exists at the position of the smallest spot, judging from the figure, the area of the on-axis smallest spot is about 11094 μm² and the decrease in light quantity is about 8.7%; while the area of the off-axis smallest spot is about 35487 μm² and the decrease in light quantity is only about 2.7%.

When the size of the bubble or particle posing the problem is defined to be $5b/|\beta|$, $5b/|\beta|=5\times6/0.98=30.6$ μm, and the area is about 735 μm². Therefore, the decrease in light quantity is about 6.6% on the axis and about 2.1% off the axis.

Figure 11:
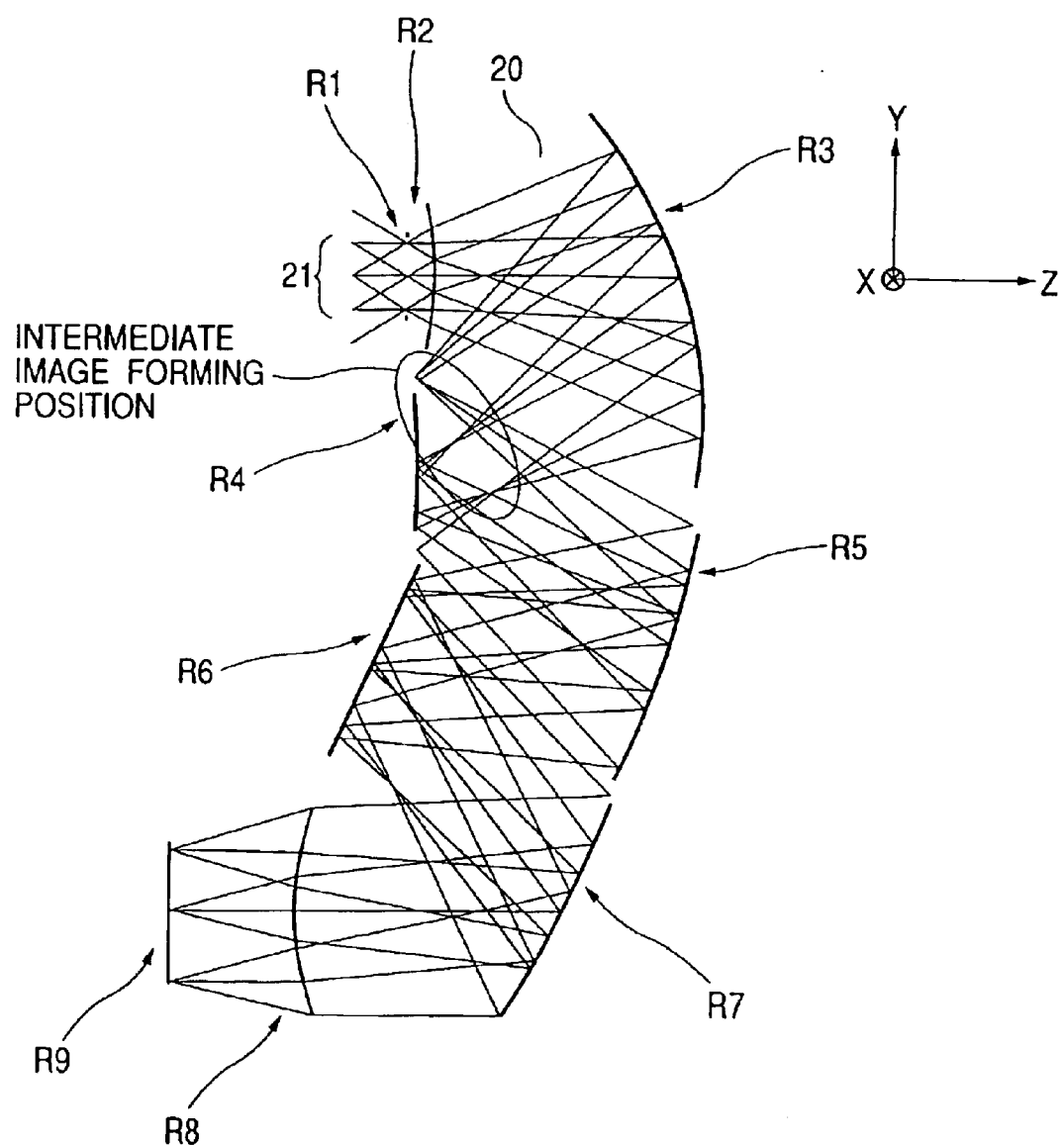
FIG. 11 is an optical, sectional view in the YZ plane of Embodiment 5 of the present invention.
Figure 12:
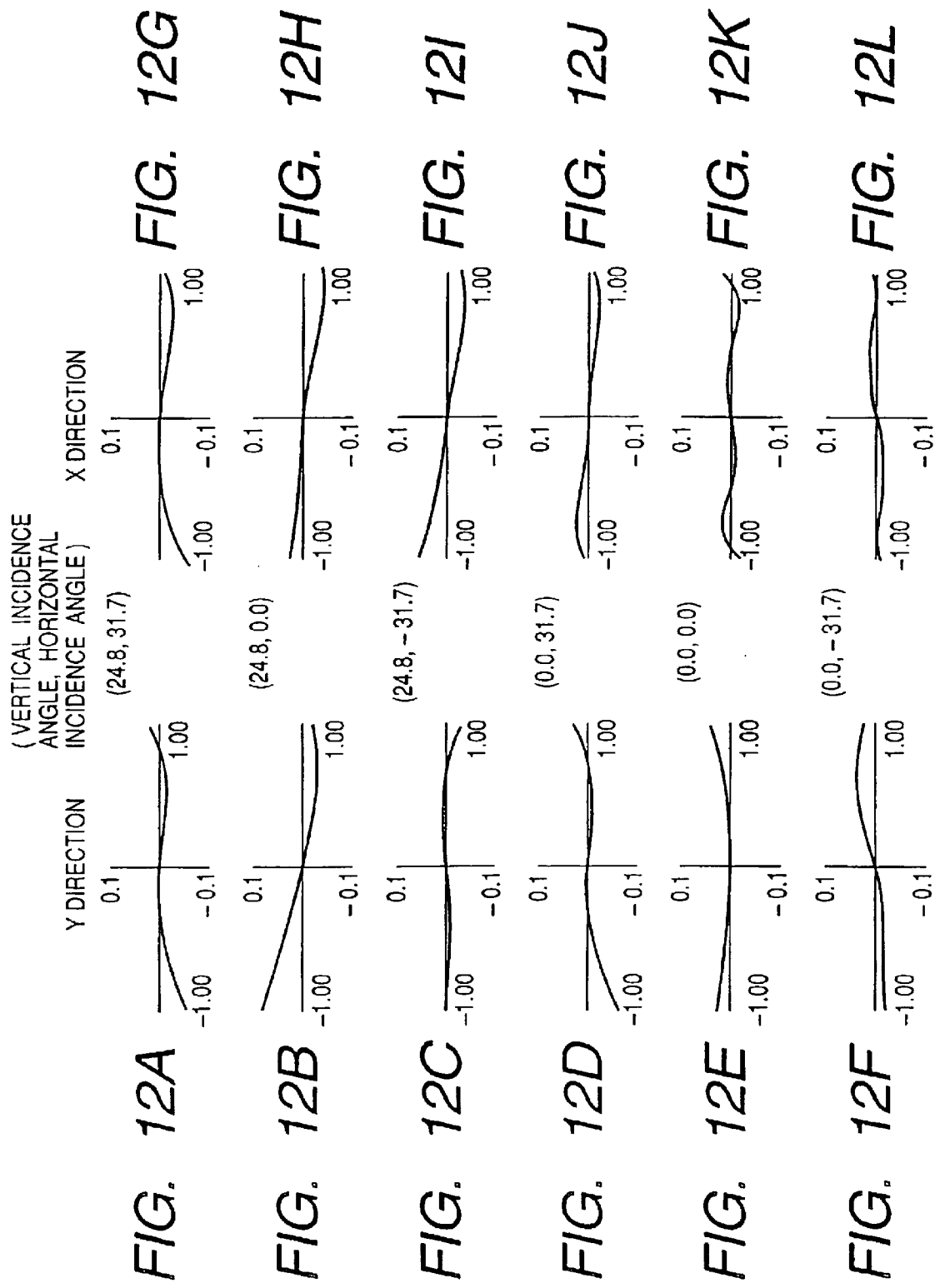
FIGS. 12A, 12B, 12C, 12D, 12E, 12F, 12G, 12H, 12I, 12J, 12K and 12L are lateral aberration diagrams of Embodiment 5.

FIG. 11 is a sectional view in the YZ plane of the optical system of Embodiment 5 of the present invention. The present embodiment is a photographing optical system having the horizontal view angle of 63.4° and the vertical view angle of 49.6°. FIG. 11 also illustrates optical paths.

In the present embodiment the astigmatism independent of the field angle is generated at the intermediate image position. The present embodiment takes account of the effect of the bubble or particle on the image at small apertures of the stop. In the present embodiment the F number at a small aperture is set to 8.

The left sides of Conditions (2a), (4a) are calculated as follows.

$$\left|\frac{D \cdot f1}{S \cdot AR2}\right| = \frac{0.035 \times 4.06}{1.35 \times 0.405} = 0.26 < 0.3$$

$$\left|\frac{5b \cdot f1}{|\beta| \cdot S \cdot AR2}\right| = \frac{0.03 \times 4.06}{0.96 \times 1.35 \times 0.405} = 0.23 < 0.3$$

Thus the present embodiment satisfies Conditions (2a), (4a).

Further, the left sides of Conditions (1a), (3a) are calculated as follows.

$$\left|\frac{D \cdot f1}{S \cdot AR1}\right| = \frac{0.035 \times 4.06}{1.35 \times 2} = 0.053 < 0.1$$

$$\left|\frac{5b \cdot f1}{|\beta| \cdot S \cdot AR1}\right| = \frac{0.030 \times 4.06}{0.96 \times 1.35 \times 2} = 0.047 < 0.1$$

The present embodiment also satisfies Conditions (1a), (3a) at the full aperture.

The component data of the present embodiment is as follows.

| | | | | | | |
|---|---|---|---|---|---|---|
| Half horizontal field angle | | | | 31.7 | | |
| Half vertical field angle | | | | 24.8 | | |
| Aperture diameter | | | | 2.00 | | |
| Image size | | | | 4 mm horizontal × 3 mm vertical | | |

| i | Yi | Zi | θi | Di | Ndi | vdi | |
|---|---|---|---|---|---|---|---|
| 1 | 0.00 | 0.00 | 0.00 | 0.84 | 1 | | aperture stop |
| 2 | 0.00 | 0.84 | 0.00 | 7.49 | 1.62191 | 45.07 | refractive surface |
| 3 | 0.00 | 8.33 | 18.49 | 9.86 | 1.62191 | 45.07 | reflective surface |
| 4 | −5.93 | 0.45 | 0.58 | 9.30 | 1.62191 | 45.07 | reflective surface |
| 5 | −11.38 | 8.00 | −16.00 | 8.90 | 1.62191 | 45.07 | reflective surface |
| 6 | −11.97 | −0.89 | −24.51 | 9.39 | 1.62191 | 45.07 | reflective surface |
| 7 | −19.45 | 4.78 | −26.42 | 8.02 | 1.62191 | 45.07 | reflective surface |
| 8 | −19.45 | −3.24 | 0.00 | 3.73 | 1 | | refractive surface |
| 9 | −19.45 | −6.96 | −0.00 | | 1 | | image plane |

| Spherical shapes |
|---|
| R2 surface r2 = −9.401 |
| R8 surface r8 = 10.100 |

| Aspherical shapes | | | |
|---|---|---|---|
| R3 surface | a = −1.14746e+01 | b = −1.26394e+01 | t = 3.26910e+01 |
| | C03 = 4.07416e−04 | C21 = −6.56910e−05 | |
| | C04 = −2.83800e−05 | C22 = 2.03793e−04 | C40 = 2.56598e−04 |
| R4 surface | a = −2.64358e+00 | b = 4.22672e+00 | t = −4.50100e+01 |
| | C03 = −4.16081e−03 | C21 = −8.82585e−03 | |
| | C04 = 1.45602e−03 | C22 = 1.84420e−03 | C40 = 1.08907e−03 |
| R5 surface | a = −6.18502e+00 | b = 1.68729e+01 | t = −3.02355e+01 |
| | C03 = −7.11179e−04 | C21 = −1.41368e−03 | |
| | C04 = 5.16166e−05 | C22 = −1.42863e−04 | C40 = −1.46709e−04 |
| R6 surface | a = −7.85347e+02 | b = −7.93496e+02 | t = 8.37924e+01 |
| | C03 = 8.07938e−04 | C21 = 1.69711e−04 | |
| | C04 = −8.35098e−06 | C22 = −4.44966e−04 | C40 = −5.08840e−04 |
| R7 surface | a = −1.90604e+01 | b = −1.73227e+02 | t = −7.44028e−01 |
| | C03 = 3.37625e−04 | C21 = −5.13706e−04 | |
| | C04 = 4.72892e−05 | C22 = −9.63384e−05 | C40 = −2.04003e−04 |

In FIG. 11 reference numeral 20 designates an optical element having a plurality of curved, reflective surfaces, which is made of a transparent body such as glass. In the surface of the optical element 20 there are a concave, refractive surface (entrance surface) R2 having a negative refractive power, five reflective surfaces of concave mirror R3, convex mirror R4, concave mirror R5, reflective surface R6, and concave mirror R7, and a convex, refractive surface (exit surface) R8 having a positive refractive power, formed in the order of passage of rays from the object. R1 represents the stop located on the object side of the optical element 20 and R9 the final image plane, on which the image pickup surface of the image pickup device such as CCD is located. The two refractive surfaces are rotationally symmetric, spherical surfaces, and all reflective surfaces are surfaces symmetric only with respect to the YZ plane.

The imaging action in the present embodiment will be described below. The light 21 from the object is regulated in the quantity of incident light by the stop (entrance pupil) R1 and thereafter it is incident to the entrance surface R2 of the optical element 20. Then the light is reflected by the surface R3 and thereafter is once focused between the surfaces R3 and R4. Then the light is reflected in order at the surfaces R4, R5, R6, R7 to emerge from the exit surface R8 and be again focused on the final image plane R9.

As described, the optical element 20 functions as a lens unit having desired optical performance and having a positive refractive power as a whole by the refractive powers of the entrance and exit surfaces and the refractive powers of the plurality of curved, reflective mirrors therein.

In the present embodiment, focusing to a near object is achieved by moving the whole of the optical system (optical element) relative to the image pickup surface R9 of the image pickup device. Particularly, since the present embodiment is arranged so that the direction of the reference axis at the entrance of the optical element 20 is parallel to the direction of the reference axis at the exit of the optical element 20, the focusing operation can be performed by moving the whole optical system in parallel to the direction of the reference axis at the exit thereof (i.e., in the direction of the Z-axis), in the same manner as in the conventional lens systems. The lateral aberration diagrams of the optical element of the present embodiment are shown in FIGS. 12A to 12L.

Figure 26:
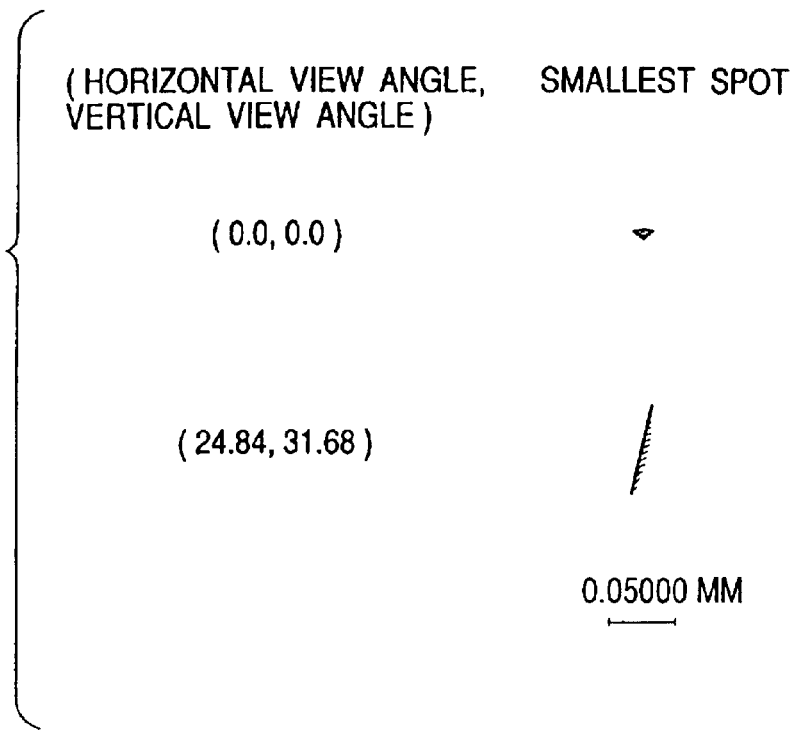
FIG. 26 is a diagram of smallest spots at the intermediate image position on the occasion of a small aperture in the conventional example.
Figure 27:
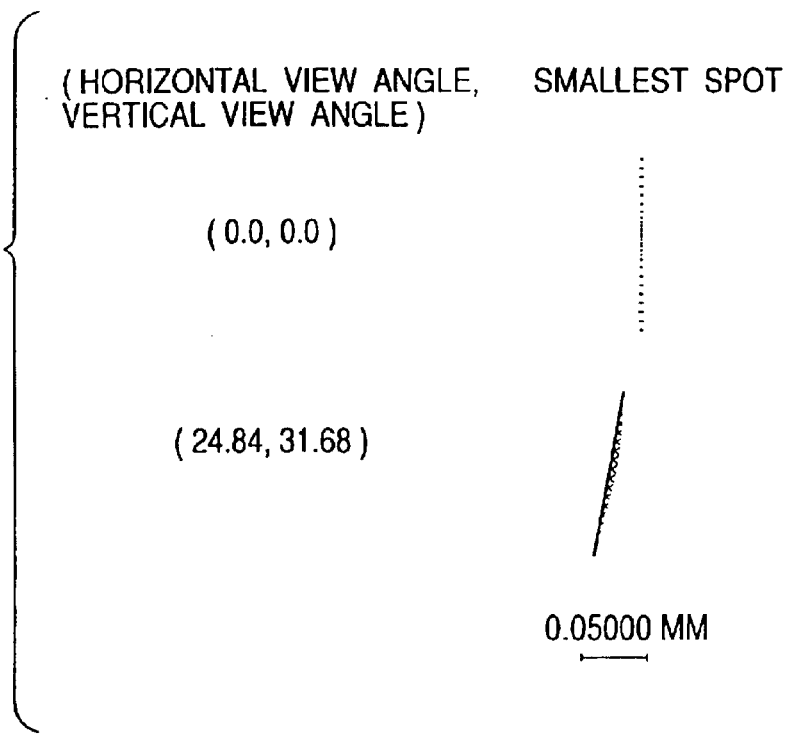
FIG. 27 is a diagram of smallest spots at the intermediate image position on the occasion of a small aperture in Embodiment 5.

The effect of the present embodiment will be described below. FIG. 26 shows the on-axis and off-axis smallest spots near the intermediate image plane at the aperture of F/8 in the conventional reflecting optical system shown in FIG. 6C. In this case, if the bubble or particle having the size of 35 μm exists at the position of the smallest spot, almost all light quantity is lost on the axis and about 50% of light quantity is lost off the axis when the length of the smallest spot is about 70 μm, as seen from the figure. FIG. 27 shows the on-axis and off-axis smallest spots near the intermediate image plane at the aperture of F/8 in the present embodiment. When the bubble or particle having the size of 35 μm exists at the position of the smallest spot, judging from the figure, the length of the on-axis smallest spot becomes about 125 μm and the decrease in light quantity is about 28%; the length of the off-axis smallest spot is about 125 μm and the decrease in light quantity is only about 28%.

When the size of the bubble or particle posing the problem is defined to be $5b/|\beta|$, $5b/|\beta|=5\times 6/0.96=31.3$ μm, and the decreases in light quantity on the axis and off the axis both are about 25%.

At a small aperture, it is difficult to decrease the left sides of Conditions (3a), (4a) as at the full aperture, and it is not preferred in terms of aberration correction. It is, however, possible to effect electrical correction for the decrease in light quantity of about 30%, and the effect on the image can be reduced by the combinational use of the electrical correction.

Figure 13:
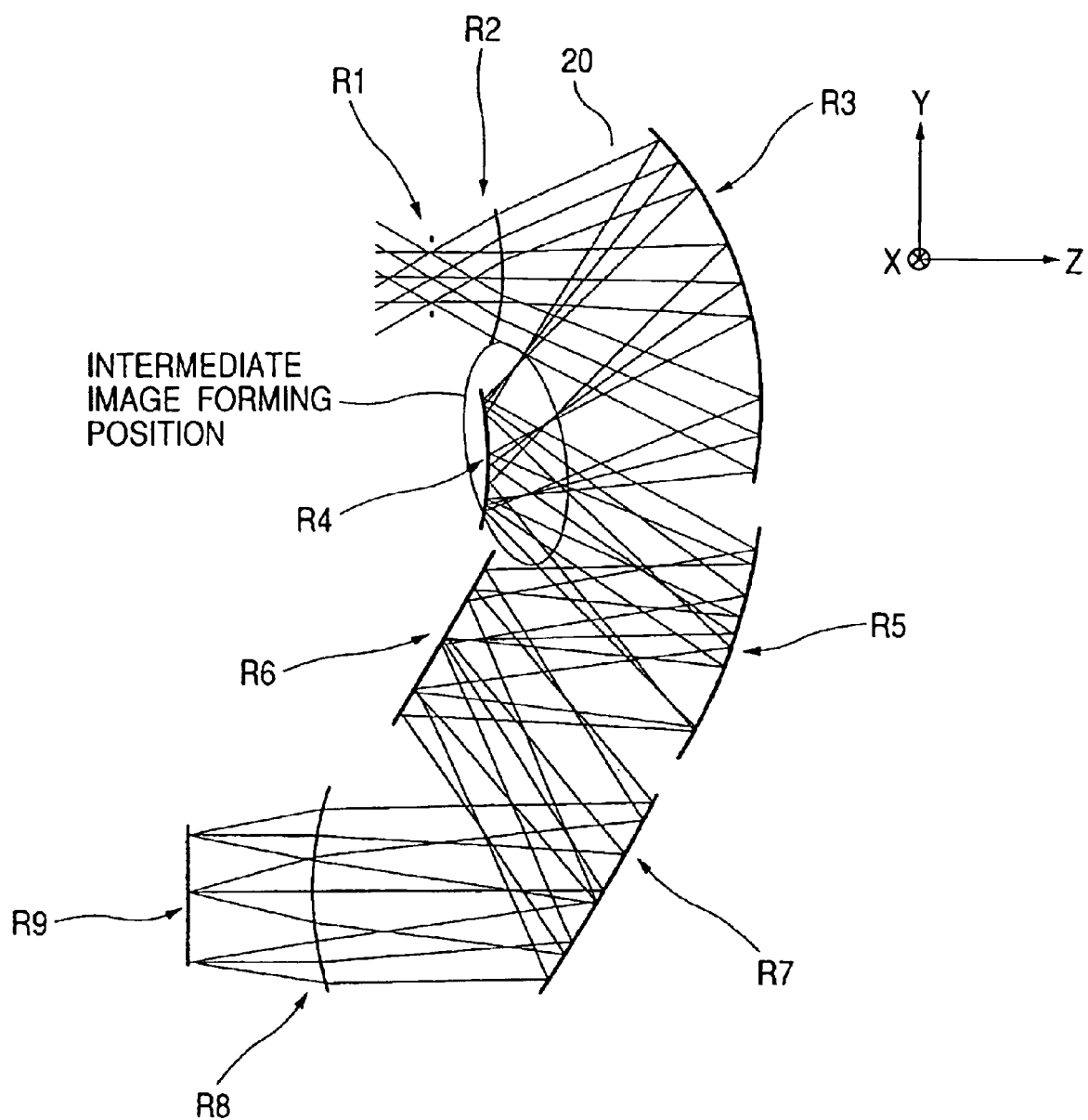
FIG. 13 is an optical, sectional view in the YZ plane of Embodiment 6 of the present invention.
Figure 14:
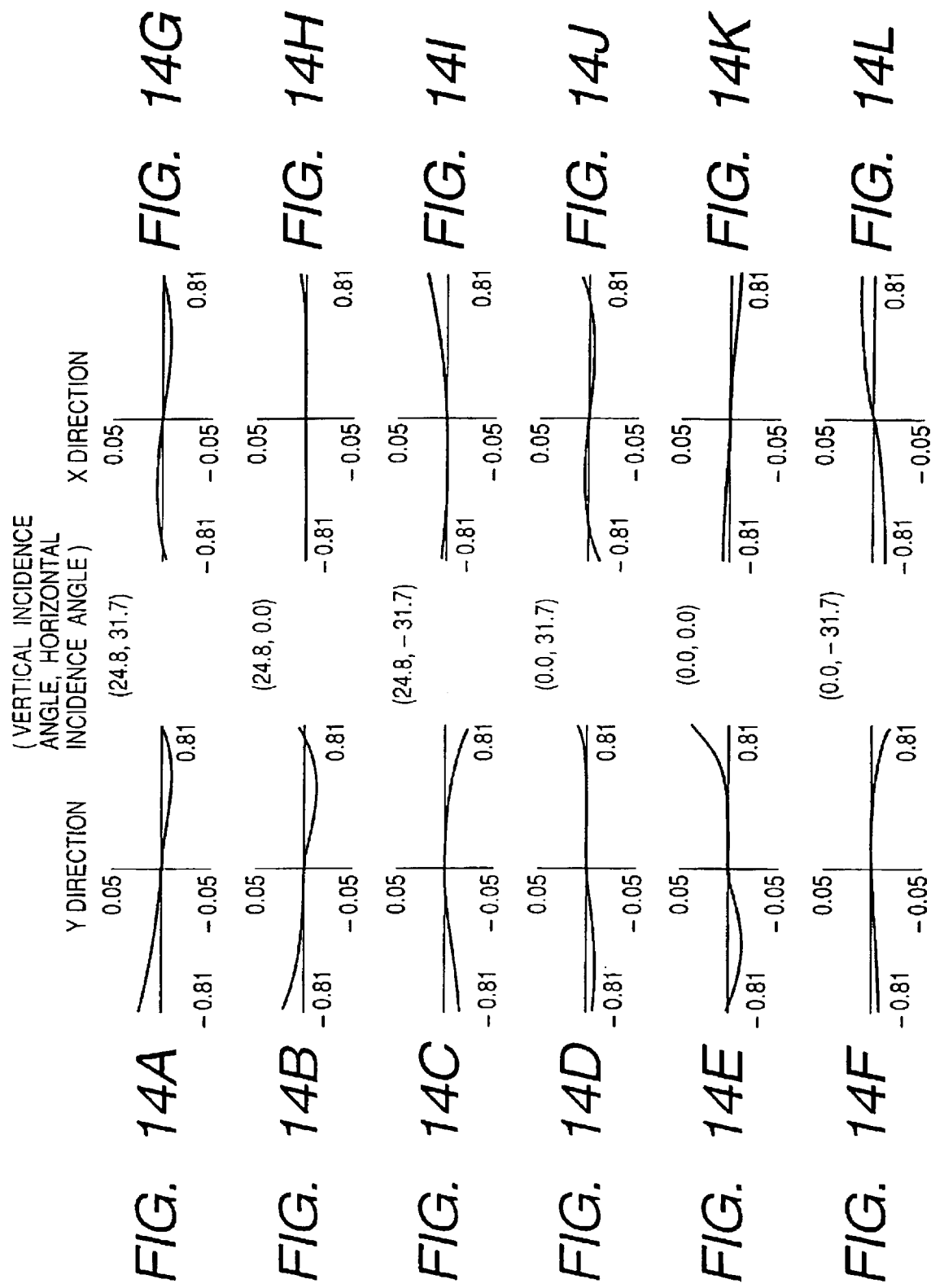
FIGS. 14A, 14B, 14C, 14D, 14E, 14F, 14G, 14H, 14I, 14J, 14K and 14L are lateral aberration diagrams of Embodiment 6.

FIG. 13 is a sectional view in the YZ plane of the optical system of Embodiment 6 of the present invention. The present embodiment is a photographing optical system having the horizontal field angle of 63.4° and the vertical field angle of 49.6°. FIG. 13 also illustrates optical paths.

In the present embodiment the on-axis astigmatism, which is astigmatism independent of the field angle, is generated at the intermediate image position, and values of the conditions are calculated as follows.

$$\left|\frac{D \cdot f1}{S \cdot AR1}\right| = \frac{0.035 \times 3.34}{0.99 \times 1.62} = 0.073 < 0.1$$

$$\left|\frac{5b \cdot f1}{|\beta| \cdot S \cdot AR1}\right| = \frac{0.030 \times 3.34}{0.97 \times 0.99 \times 1.62} = 0.064 < 0.1$$

The present embodiment thus satisfies Conditions (1a), (3a).

The component data of the present embodiment is as follows. In the present embodiment the entrance surface is of a rotationally asymmetric surface shape.

| | Half horizontal field angle | | | 31.7 | | |
|---|---|---|---|---|---|---|
| | Half vertical field angle | | | 24.8 | | |
| | Aperture diameter | | | 1.62 | | |
| | Image size | | | 4 mm horizontal × 3 mm vertical | | |

| i | Yi | Zi | θi | Di | Ndi | vdi | |
|---|---|---|---|---|---|---|---|
| 1 | 0.00 | 0.00 | 0.00 | 2.25 | 1 | | aperture stop |
| 2 | 0.00 | 2.25 | 0.00 | 7.49 | 1.58310 | 30.20 | refractive surface |
| 3 | 0.00 | 9.74 | 18.75 | 9.86 | 1.58310 | 30.20 | reflective surface |
| 4 | −6.00 | 1.92 | 1.04 | 9.27 | 1.58310 | 30.20 | reflective surface |
| 5 | −11.37 | 9.47 | −16.80 | 8.94 | 1.58310 | 30.20 | reflective surface |
| 6 | −11.65 | 0.53 | −28.33 | 9.41 | 1.58310 | 30.20 | reflective surface |
| 7 | −19.67 | 5.45 | −29.24 | 8.95 | 1.58310 | 30.20 | reflective surface |

-continued

| | | | | | | |
|---|---|---|---|---|---|---|
| 8 | −19.67 | −3.51 | 0.00 | 4.10 | 1 | refractive surface |
| 9 | −19.67 | −7.61 | 0.00 | | 1 | image plane |

Spherical shape

R8 surface r8 = 11.178

Aspherical shapes

| | | | |
|---|---|---|---|
| R2 surface | a = ∞ | b = ∞ | t = 0 |
| | C02 = −8.40171e−02 | C20 = −5.56507e−03 | |
| | C03 = 0.00000e+00 | C21 = 0.00000e+00 | |
| | C04 = 8.39926e−04 | C22 = −1.25469e−03 | C40 = 2.31772e−04 |
| R3 surface | a = −1.13143e+01 | b = −1.24404e+01 | t = 1.58590e+01 |
| | C03 = 7.85133e−05 | C21 = 6.09238e−05 | |
| | C04 = 2.73849e−05 | C22 = 8.98778e−05 | C40 = 9.20652e−05 |
| R4 surface | a = −2.26845e+00 | b = 5.04617e+00 | t = −2.74808e+01 |
| | C03 = 8.07790e−04 | C21 = −2.78687e−03 | |
| | C04 = 5.10033e−05 | C22 = 7.62339e−04 | C40 = −7.53257e−04 |
| R5 surface | a = −6.11825e+00 | b = 1.71331e+01 | t = −2.13714+01 |
| | C03 = −4.59621e−04 | C21 = −7.81713e−04 | |
| | C04 = −5.79810e−05 | C22 = −1.68453e−04 | C40 = −1.05899e−04 |
| R6 surface | a = −7.93207e+02 | b = −7.93752e+02 | t = 8.03054e+01 |
| | C03 = 7.05489e−04 | C21 = 2.447661e−04 | |
| | C04 = −1.48850e−04 | C22 = −3.20082e−04 | C40 = −1.41576e−04 |
| R7 surface | a = −2.11107e+01 | b = −1.23419e+03 | t = −2.87104e+01 |
| | C03 = −2.90841e−04 | C21 = −8.50288e−04 | |
| | C04 = −2.04956e−06 | C22 = −4.18670e−05 | C40 = −1.79566e−05 |

In FIG. 13 reference numeral 20 designates an optical element having a plurality of curved, reflective surfaces, which is made of a transparent body such as glass. In the surface of the optical element 20 there are a concave, refractive surface (entrance surface) R2 having a negative refractive power, five reflective surfaces of concave mirror R3, convex mirror R4, concave mirror R5, reflective surface R6, and concave mirror R7, and a convex, refractive surface (exit surface) R8 having a positive refractive power, formed in the order of passage of rays from the object. R1 represents the stop located on the object side of the optical element 20 and R9 the final image plane, on which the image pickup surface of the image pickup device such as CCD is located. The exit surface is a rotationally symmetric, spherical surface, and all reflective surfaces are surfaces symmetric only with respect to the YZ plane.

The imaging action in the present embodiment will be described below. The light 1 from the object is regulated in the quantity of incident light by the stop (entrance pupil) R1 and thereafter it is incident to the entrance surface R2 of the optical element 20. Then the light is reflected by the surface R3 and thereafter is once focused between the surfaces R3 and R4. Then the light is reflected in order at the surfaces R4, R5, R6, R7 to emerge from the exit surface R8 and be again focused on the final image plane R9.

As described, the optical element 20 functions as a lens unit having desired optical performance and having a positive refractive power as a whole by the refractive powers of the entrance and exit surfaces and the refractive powers of the plurality of curved, reflective mirrors therein.

In the present embodiment, focusing to a near object is achieved by moving the whole of the optical system relative to the image pickup surface R9 of the image pickup device. Particularly, since the present embodiment is arranged so that the direction of the reference axis at the entrance of the optical element 20 is parallel to the direction of the reference axis at the exit of the optical system, the focusing operation can be performed by moving the whole optical system in parallel to the direction of the reference axis at the exit thereof (i.e., in the direction of the Z-axis), in the same manner as in the conventional lens systems. The lateral aberration diagrams of the optical element of the present embodiment are shown in FIGS. 14A to 14L.

The effect of the present embodiment will be described. Although the on-axis and off-axis smallest spots near the intermediate image plane are not illustrated especially, if the bubble or particle having the size 35 μm is present at the smallest spot position, the length of the smallest spot on the axis is about 470 μm and the decrease in light quantity is about 7.4%; the length of the smallest spot off the axis is about 460 μm and the decrease in light quantity is only about 7.6%.

When the size of the bubble or particle posing the problem is defined to be 5b/|β|, 5b/|β|=5×6/0.97=30.9 μm; thus, the decrease in light quantity on the axis is about 6.6% and the decrease off the axis is about 6.7%.

Further, since the entrance surface is of the rotationally asymmetric surface shape, the present embodiment is more likely to generate the on-axis astigmatism, which is the astigmatism independent of the field angle, at the intermediate image position than in the case where the entrance surface is a rotationally symmetric surface. Since the entrance surface is arranged close to the entrance pupil, the astigmatism can be generated almost uniformly against the field angles.

Figure 15:
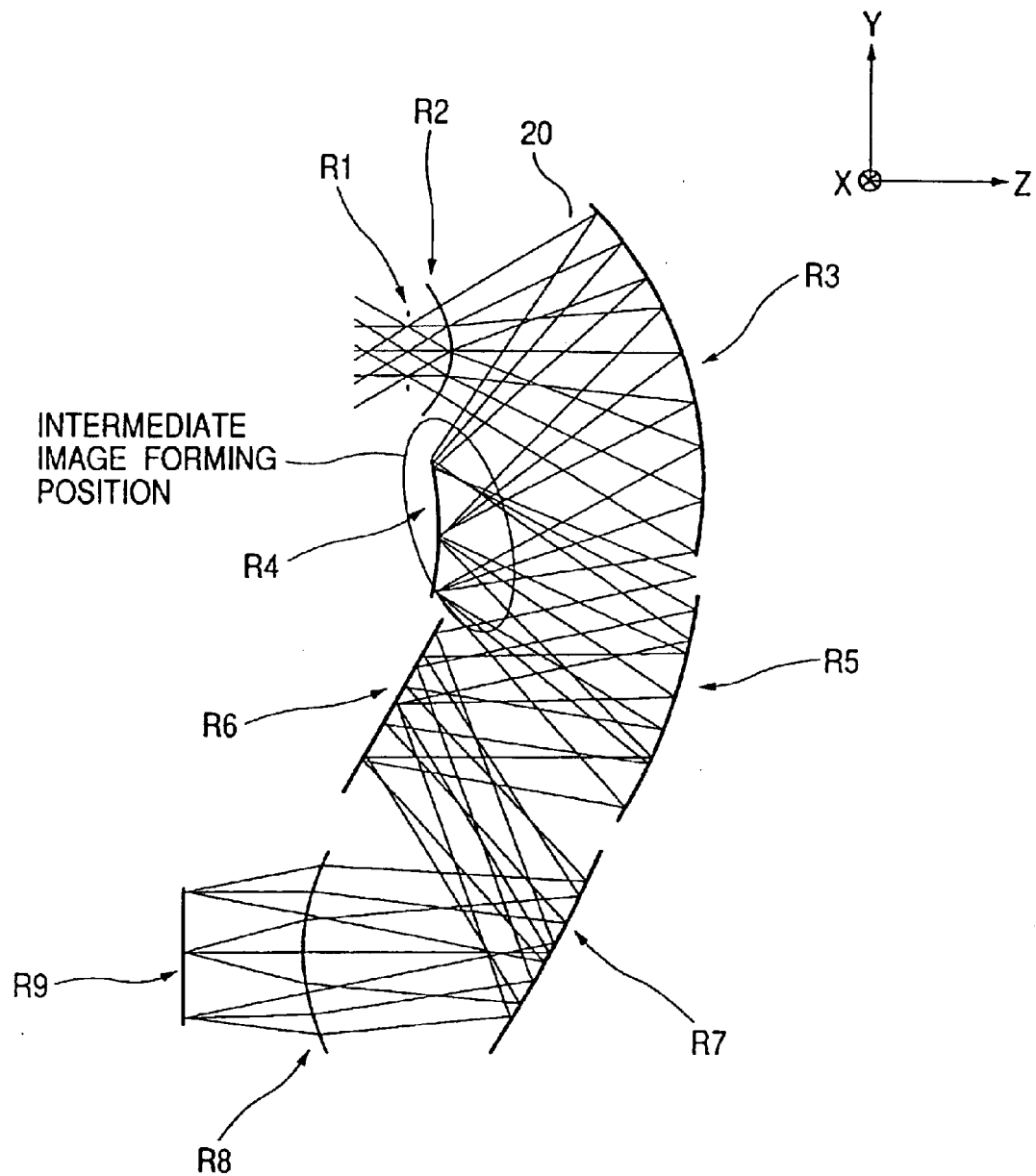
FIG. 15 is an optical, sectional view in the YZ plane of Embodiment 7 of the present invention.

FIG. 15 is a sectional view in the YZ plane of the optical system of Embodiment 7 of the present invention. The present embodiment is a photographing optical system having the horizontal field angle of 63.4° and the vertical field angle of 49.6°. FIG. 15 also illustrates optical paths.

In the present embodiment the on-axis astigmatism, which is astigmatism independent of the field angle, is generated at the intermediate image position, and values of the conditions are calculated as follows.

$$\left|\frac{D \cdot f1}{S \cdot AR1}\right| = \frac{0.035 \times 3.19}{1.21 \times 1.62} = 0.057 < 0.1$$

$$\left|\frac{5b \cdot f1}{|\beta| \cdot S \cdot AR1}\right| = \frac{0.030 \times 3.19}{1.01 \times 1.21 \times 1.62} = 0.048 < 0.1$$

The present embodiment thus satisfies Conditions (1a), (3a).

The component data of the present embodiment is as follows. In the present embodiment each of the entrance surface and the exit surface is of a rotationally asymmetric surface shape.

| | Half horizontal field angle | | | 31.7 | | |
|---|---|---|---|---|---|---|
| | Half vertical field angle | | | 24.8 | | |
| | Aperture diameter | | | 1.62 | | |
| | Image size | | | 4 mm horizontal × 3 mm vertical | | |

| i | Yi | Zi | θi | Di | Ndi | νdi | |
|---|---|---|---|---|---|---|---|
| 1 | 0.00 | 0.00 | 0.00 | 1.34 | 1 | | aperture stop |
| 2 | 0.00 | 1.34 | 0.00 | 7.49 | 1.58310 | 30.20 | refractive surface |
| 3 | 0.00 | 8.82 | 18.75 | 9.86 | 1.58310 | 30.20 | reflective surface |
| 4 | −6.00 | 1.00 | 1.04 | 9.27 | 1.58310 | 30.20 | reflective surface |
| 5 | −11.37 | 8.55 | −16.80 | 8.94 | 1.58310 | 30.20 | reflective surface |
| 6 | −11.65 | −0.39 | −28.33 | 9.41 | 1.58310 | 30.20 | reflective surface |
| 7 | −19.67 | 4.53 | −29.24 | 8.00 | 1.58310 | 30.20 | reflective surface |
| 8 | −19.67 | −3.47 | 0.00 | 3.76 | 1 | | refractive surface |
| 9 | −19.67 | −7.22 | 0.00 | | 1 | | image plane |

| Aspherical shapes | | | |
|---|---|---|---|
| R2 surface | a = ∞ | b = ∞ | t = 0 |
| | C02 = −1.72863e−01 | C20 = −3.43785e−02 | |
| | C03 = 0.00000e+00 | C21 = 0.00000e+00 | |
| | C04 = −1.14063e−02 | C22 = −2.25445e−02 | C40 = −6.18574e−03 |
| R3 surface | a = −1.16716e+01 | b = −1.32422e+01 | t = 3.13484e+00 |
| | C03 = −1.43087e−04 | C21 = 2.64110e−05 | |
| | C04 = 7.52835e−06 | C22 = −2.92736e−05 | C40 = −3.03489e−05 |
| R4 surface | a = −2.40442e+00 | b = 4.33821e+00 | t = 1.33231e+01 |
| | C03 = 4.85362e−03 | C21 = 6.99637e−03 | |
| | C04 = −2.90654e−04 | C22 = −1.09311e−03 | C40 = −6.71405e−04 |
| R5 surface | a = −6.08378e+00 | b = 1.77655e+01 | t = −2.39551+01 |
| | C03 = −7.75363e−04 | C21 = −5.50043e−04 | |
| | C04 = −1.00179e−04 | C22 = −2.64182e−04 | C40 = −1.49464e−04 |
| R6 surface | a = −4.05845e+02 | b = −4.05368e+02 | t = 8.32433e+01 |
| | C03 = 6.14312e−04 | C21 = 2.18334e−03 | |
| | C04 = −2.16629e−04 | C22 = −8.99316e−04 | C40 = −5.26979e−04 |
| R7 surface | a = −1.84127e+01 | b = −1.30993e+02 | t = 3.36693e+01 |
| | C03 = −8.02648e−05 | C21 = 3.23663e−04 | |
| | C04 = 1.45200e−05 | C22 = −3.16738e−04 | C40 = −1.89870e−04 |
| R8 surface | a = ∞ | b = ∞ | t = 0 |
| | C02 = 8.68816e−02 | C20 = 9.42024e−02 | |
| | C03 = 0.00000e+00 | C21 = 0.00000e+00 | |
| | C04 = −9.26017e−05 | C22 = −3.95347e−03 | C40 = −2.63504e−03 |

In FIG. 15 reference numeral 20 designates an optical element having a plurality of curved, reflective surfaces, which is made of a transparent body such as glass. In the surface of the optical element 20 there are a concave, refractive surface (entrance surface) R2 having a negative refractive power, five reflective surfaces of concave mirror R3, convex mirror R4, concave mirror R5, reflective surface R6, and concave mirror R7, and a convex, refractive surface (exit surface) R8 having a positive refractive power, formed in the order of passage of rays from the object. R1 represents the stop located on the object side of the optical element 20 and R9 the final image plane, on which the image pickup surface of the image pickup device such as CCD is located. All reflective surfaces are surfaces symmetric only with respect to the YZ plane.

The imaging action in the present embodiment will be described below. The light 1 from the object is regulated in the quantity of incident light by the stop (entrance pupil) R1 and thereafter it is incident to the entrance surface R2 of the optical element 20. Then the light is reflected by the surface R3 and thereafter is once focused between the surfaces R3 and R4. Then the light is reflected in order at the surfaces R4, R5, R6, R7 to emerge from the exit surface R8 and be again focused on the final image plane R9.

As described, the optical element 20 functions as a lens unit having desired optical performance and having a positive refractive power as a whole by the refractive powers of the entrance and exit surfaces and the refractive powers of the plurality of curved, reflective mirrors therein.

In the present embodiment, focusing to a near object is achieved by moving the whole of the optical system relative to the image pickup surface R9 of the image pickup device. Particularly, since the present embodiment is arranged so that the direction of the reference axis at the entrance of the optical element 20 is parallel to the direction of the reference axis at the exit of the optical system, the focusing operation can be performed by moving the whole optical system in parallel to the direction of the reference axis at the exit thereof (i.e., in the direction of the Z-axis), in the same manner as in the conventional lens systems. The lateral aberration diagrams of the optical element of the present embodiment are shown in FIGS. 16A to 16L.

The effect of the present embodiment will be described. Although the on-axis and off-axis smallest spots near the intermediate image plane are not illustrated especially, if the bubble or particle having the size 35 μm is present at the smallest spot position, the area of the on-axis smallest spot is about 18600 μm² and the decrease in light quantity is about 5.2%; the area of the off-axis smallest spot is about 30800 μm² and the decrease in light quantity is only about 3.1%.

When the size of the bubble or particle posing the problem is defined to be $5b/|\beta|$, $5b/|\beta|=5\times6/1.01=29.7$ μm; thus, the area is about 693 μm², the decrease in light quantity on the axis is about 3.7%, and the decrease off the axis is about 2.3%.

Further, since the entrance surface is of the rotationally asymmetric surface shape, the present embodiment is more likely to generate the on-axis astigmatism, which is the astigmatism independent of the field angle, at the intermediate image position than in the case where the entrance surface is a rotationally symmetric surface. Since the entrance surface is arranged close to the entrance pupil, the astigmatism can be generated almost uniformly against the field angles. Further, since the exit surface is of the rotationally asymmetric surface shape, the present embodiment can reduce occurrence of asymmetric aberration, such as distortion, produced at the entrance surface.

Figure 17A:
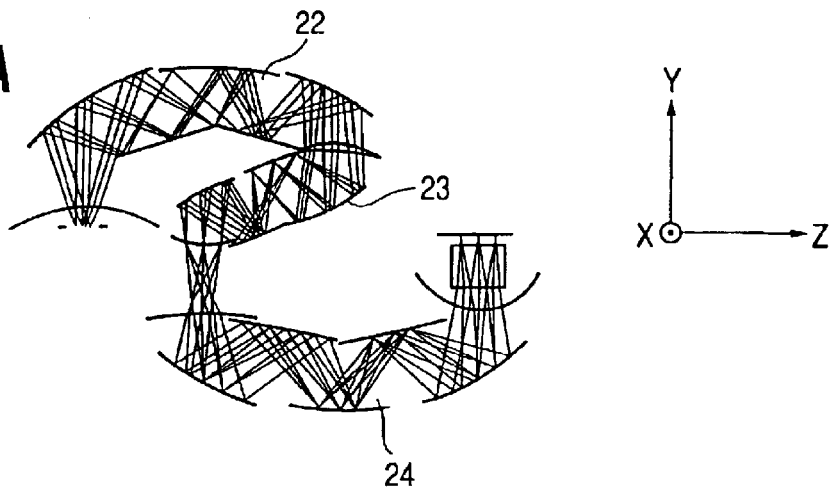
FIGS. 17A, 17B and 17C are optical, sectional views in the YZ plane of Embodiment 8 of the present invention.
Figure 17B:
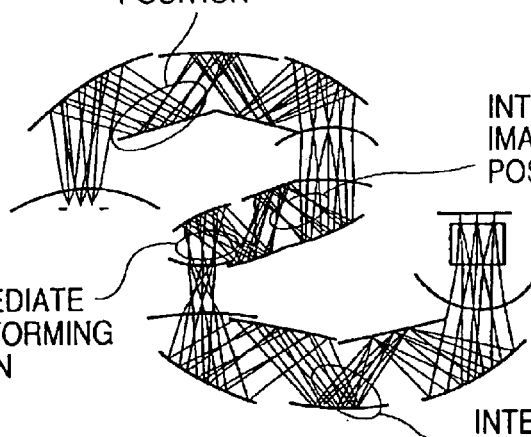
Figure 17C:
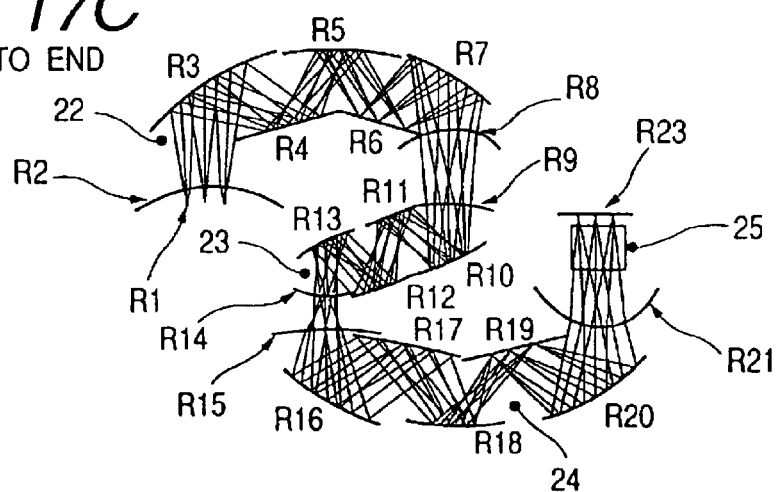

FIGS. 17A to 17C are optical, sectional views in the YZ plane of Embodiment 8 of the present invention. FIG. 17A is a sectional view at the wide-angle extreme, FIG. 17B one at the middle position, and FIG. 17C one at the telephoto extreme. The present embodiment is a photographing optical system of a three-unit zoom lens comprised of three optical elements 22, 23, 24 and having the zoom ratio of about 3. The component data thereof is listed below.

In the present embodiment the astigmatism independent of the field angle is generated at the intermediate image position.

|   |   |   | wide-angle extreme | middle point | telephoto extreme |   |   |
|---|---|---|---|---|---|---|---|
| Half horizontal field angle |   |   | 26.3 | 13.9 | 9.3 |   |   |
| Half vertical field angle |   |   | 20.3 | 10.5 | 7.0 |   |   |
| Aperture diameter |   |   | 1.30 | 2.60 | 3.86 |   |   |

| i | Yi | Zi | θi | Di | Ndi | νdi |   |
|---|---|---|---|---|---|---|---|
| 1 | 0.00 | 0.00 | 0.00 | 2.00 | 1 |  | aperture stop |
| 2 | 0.00 | 2.00 | 0.00 | 10.82 | 1.57250 | 57.76 | refractive surface |
| 3 | 0.00 | 12.82 | 32.01 | 10.00 | 1.57250 | 57.76 | reflective surface |
| 4 | −8.99 | 8.43 | 15.57 | 9.00 | 1.57250 | 57.76 | reflective surface |
| 5 | −13.87 | 15.99 | −2.17 | 8.20 | 1.57250 | 57.76 | reflective surface |
| 6 | −17.79 | 8.79 | −14.41 | 8.70 | 1.57250 | 57.76 | reflective surface |
| 7 | −25.11 | 13.48 | −28.67 | 5.50 | 1.57250 | 57.76 | reflective surface |
| 8 | −25.11 | 7.98 | 0.00 | variable | 1 |  | refractive surface |
| 9 | −25.11 | 7.10 | 0.00 | 5.70 | 1.57250 | 57.76 | refractive surface |
| 10 | −25.11 | 1.40 | 25.00 | 7.50 | 1.57250 | 57.76 | reflective surface |
| 11 | −19.37 | 6.22 | 20.00 | 7.60 | 1.57250 | 57.76 | reflective surface |
| 12 | −18.05 | −1.27 | 20.00 | 7.50 | 1.57250 | 57.76 | reflective surface |
| 13 | −12.30 | 3.55 | 25.00 | 5.50 | 1.57250 | 57.76 | reflective surface |
| 14 | −12.30 | −1.95 | 0.00 | variable | 1 |  | refractive surface |
| 15 | −12.30 | −8.76 | 0.00 | 7.00 | 1.57250 | 57.76 | refractive surface |
| 16 | −12.30 | −15.76 | −28.09 | 9.80 | 1.57250 | 57.76 | reflective surface |
| 17 | −20.44 | −10.31 | −11.24 | 10.00 | 1.57250 | 57.76 | reflective surface |
| 18 | −25.99 | −18.63 | −0.30 | 9.50 | 1.57250 | 57.76 | reflective surface |
| 19 | −31.35 | −10.78 | 13.51 | 10.00 | 1.57250 | 57.76 | reflective surface |

-continued

| | | | | | | | |
|---|---|---|---|---|---|---|---|
| 20 | −40.12 | −15.58 | 30.67 | 7.00 | 1.57250 | 57.76 | reflective surface |
| 21 | −40.12 | −8.58 | 0.02 | variable | 1 | | refractive surface |
| 22 | −40.12 | −6.29 | 0.00 | 4.00 | 1.51633 | 64.15 | refractive surface |
| 23 | −40.12 | −2.29 | 0.00 | 1.00 | 1 | | refractive surface |
| 24 | −40.12 | −1.29 | 0.00 | | 1 | | image plane |

| | wide-angle extreme | middle point | telephoto extreme |
|---|---|---|---|
| D8 | 0.89 | 5.36 | 7.69 |
| D14 | 6.81 | 4.55 | 3.37 |
| D21 | 2.29 | 4.49 | 5.65 |

| | | |
|---|---|---|
| D1–8 surfaces | $Zi(M) = Zi(W) + 0.00$ | $Zi(T) = Zi(W) + 0.00$ |
| D9–14 surfaces | $Zi(M) = Zi(W) - 4.47$ | $Zi(T) = Zi(W) - 6.81$ |
| D15–21 surfaces | $Zi(M) = Zi(W) - 2.20$ | $Zi(T) = Zi(W) - 3.36$ |
| D22 surface | $Zi(M) = Zi(W)$ | $Zi(T) = Zi(W)$ |

Spherical shapes

R2 surface r2 = −14.727
R8 surface r8 = −7.999
R9 surface r9 = −15.217
R14 surface r14 = 8.191
R15 surface r15 = −51.658
R21 surface r21 = 6.898
R22 surface r22 = ∞
R23 surface r23 = ∞

Aspherical shapes

| | | | |
|---|---|---|---|
| R3 surface | C02 = −1.94302e−02 | C20 = −3.52403e−02 | |
| | C03 = −6.05005e−05 | C21 = 3.34313e−04 | |
| | C04 = −2.64740e−05 | C22 = −5.50680e−05 | C40 = −6.85730e−05 |
| R4 surface | C02 = 9.17779e−05 | C20 = −6.18233e−02 | |
| | C03 = −6.22285e−05 | C21 = 1.56326e−03 | |
| | C04 = −1.20412e−04 | C22 = −5.94589e−04 | C40 = 3.43423e−04 |
| R5 surface | C02 = −1.79880e−02 | C20 = −4.47169e−02 | |
| | C03 = −2.19676e−04 | C21 = −3.43409e−05 | |
| | C04 = −4.20166e−05 | C22 = −1.02203e−04 | C40 = −1.42044e−04 |
| R6 surface | C02 = −8.01208e−03 | C20 = −3.52443e−02 | |
| | C03 = −7.49991e−04 | C21 = 3.10102e−03 | |
| | C04 = −1.17900e−04 | C22 = −1.05389e−03 | C40 = −1.33235e−03 |
| R7 surface | C02 = −2.51729e−02 | C20 = −3.30317e−02 | |
| | C03 = −2.07597e−04 | C21 = 1.88406e−04 | |
| | C04 = −2.43897e−05 | C22 = −8.46174e−05 | C40 = −2.65298e−05 |
| R10 surface | C02 = 1.93480e−02 | C20 = 6.98052e−04 | |
| | C03 = −4.46652e−04 | C21 = −1.76685e−03 | |
| | C04 = 1.41004e−06 | C22 = −2.87544e−04 | C40 = −1.02043e−04 |
| R11 surface | C02 = −1.77224e−02 | C20 = −2.86382e−02 | |
| | C03 = −8.52261e−04 | C21 = −1.67811e−03 | |
| | C04 = −1.40330e−04 | C22 = −1.73460e−05 | C40 = −8.74184e−07 |
| R12 surface | C02 = 2.78627e−02 | C20 = 1.30724e−02 | |
| | C03 = 1.48986e−05 | C21 = 2.35448e−03 | |
| | C04 = 1.13038e−04 | C22 = 1.41561e−03 | C40 = 4.99584e−04 |
| R13 surface | C02 = −3.52058e−02 | C20 = −9.12630e−02 | |
| | C03 = 2.06469e−03 | C21 = 4.97992e−03 | |
| | C04 = 9.30915e−05 | C22 = −5.25179e−04 | C40 = −1.07144e−04 |
| R16 surface | C02 = 1.89481e−02 | C20 = 5.89085e−02 | |
| | C03 = 3.76913e−04 | C21 = 7.92483e−04 | |
| | C04 = 2.95432e−05 | C22 = 1.71436e−04 | C40 = 1.60251e−04 |
| R17 surface | C02 = −8.27640e−03 | C20 = −2.90095e−02 | |
| | C03 = 4.98465e−04 | C21 = −8.54262e−03 | |
| | C04 = 4.17911e−05 | C22 = −8.35501e−04 | C40 = −2.96432e−04 |
| R18 surface | C02 = 1.49383e−02 | C20 = 2.79447e−02 | |
| | C03 = 3.45413e−04 | C21 = −6.67856e−04 | |
| | C04 = 7.14602e−05 | C22 = 9.57676e−05 | C40 = −1.09444e−05 |
| R19 surface | C02 = −2.78032e−03 | C20 = 3.47409e−03 | |
| | C03 = 3.05230e−04 | C21 = −1.29009e−03 | |
| | C04 = 1.34108e−04 | C22 = 6.74071e−05 | C40 = −1.81113e−05 |
| R20 surface | C02 = 2.64689e−02 | C20 = 1.1119e−02 | |
| | C03 = 9.29169e−05 | C21 = −7.42810e−04 | |
| | C04 = 1.94555e−05 | C22 = 3.83296e−05 | C40 = −4.37073e−05 |

In FIGS. 17A to 17C, the first surface R1 is the stop surface of the entrance pupil, the second surface R2 to the eighth surface R8 are the first optical element 22, the ninth surface R9 to the fourteenth surface R14 are the second optical element 23, and the fifteenth surface R15 to the twenty first surface R21 are the third optical element 24.

Numeral 25 designates an optical compensator comprised of a plane-parallel plate, which is a low-pass filter, an infrared-cut filter, or the like made of quartz. The twenty third surface R23 is a surface of an image pickup device being the final image plane, which is, for example, an image pickup surface of CCD (image pickup medium) or the like.

The imaging action will be described with the object at the infinity.

First, the light passing the first surface R1 is incident to the first optical element 22. In the first optical element 22 the light is refracted by the second surface R2, reflected by the third surface R3, the fourth surface R4, the fifth surface R5, the sixth surface R6, and the seventh surface R7, and refracted by the eighth surface R8, then leaving the first optical element 22. Here, intermediate imaging takes place near the fourth surface R4.

Then the light is incident to the second optical element 23. In the second optical element 23 the light is refracted by the ninth surface R9, reflected by the tenth surface R10, the eleventh surface R11, the twelfth surface R12, and the thirteenth surface R13, and refracted by the fourteenth surface R14, then leaving the second optical element 23. Here, the light has an intermediate image plane between the tenth surface R10 and the eleventh surface R11 and another intermediate image plane near the fourteenth surface R14.

Then the light emerging from the second optical element 23 is incident to the third optical element 24. In the third optical element 24 the light is refracted by the fifteenth surface R15, reflected by the sixteenth surface R16, the seventeenth surface R17, the eighteenth surface R18, the nineteenth surface Rl9, and the twentieth surface R20, and refracted by the twenty first surface R21, then leaving the third optical element 24. Here, intermediate imaging takes place near the eighteenth surface R18.

The light emerging from the third optical element 24 finally passes through the optical compensator 25 to be focused on the twenty third surface R23 being the final image plane.

Next described is movement of each optical element with the zooming operation. During the zooming operation the first optical element 22 is fixed, so as to be at a standstill. Zooming is achieved from the wide-angle extreme to the telephoto extreme by moving the second optical element 23 in the negative Z-direction. By moving the third optical element 23, variation of the image plane with zooming is corrected for and focusing is achieved. The twenty third surface R23 being the image plane is stationary during zooming. The first optical element 22 corresponds to a so-called front lens of photographing optical system, the second optical element 23 to a so-called variator, and the third optical element 24 to a compensator.

For the intermediate image positions near the fourth surface R4, near the tenth surface R10, near the fourteenth surface R14, and near the eighteenth surface R18, values of Conditions (1a), (3a) are calculated as follows at the wide-angle extreme, at the middle position, and at the telephoto extreme. For the intermediate image position near the fourth surface R4, values of the conditions are calculated as follows.

At the wide-angle extreme, the values are as follows.

$$\left|\frac{D \cdot f1}{S \cdot AR1}\right| = \frac{0.035 \times 6.95}{2.46 \times 1.3} = 0.076 < 0.1$$

$$\left|\frac{5b \cdot f1}{|\beta| \cdot S \cdot AR1}\right| = \frac{0.030 \times 6.95}{0.73 \times 2.46 \times 1.3} = 0.089 < 0.1$$

At the middle position, the values are as follows.

$$\left|\frac{D \cdot f1}{S \cdot AR1}\right| = \frac{0.035 \times 6.95}{2.46 \times 2.6} = 0.038 < 0.1$$

$$\left|\frac{5b \cdot f1}{|\beta| \cdot S \cdot AR1}\right| = \frac{0.030 \times 6.95}{1.45 \times 2.46 \times 2.6} = 0.022 < 0.1$$

At the telephoto extreme, the values are as follows.
For the intermediate image position near the tenth $$\left|\frac{D \cdot f1}{S \cdot AR1}\right| = \frac{0.035 \times 6.95}{2.46 \times 3.84} = 0.026 < 0.1$$

$$\left|\frac{5b \cdot f1}{|\beta| \cdot S \cdot AR1}\right| = \frac{0.030 \times 6.95}{2.18 \times 2.46 \times 3.84} = 0.01 < 0.1$$

surface R10, the values of the conditions are calculated as follows.

At the wide-angle extreme, the values are as follows.

$$\left|\frac{D \cdot f1}{S \cdot AR1}\right| = \frac{0.035 \times 8.7}{2.99 \times 1.3} = 0.078 < 0.1$$

$$\left|\frac{5b \cdot f1}{|\beta| \cdot S \cdot AR1}\right| = \frac{0.030 \times 8.7}{0.74 \times 2.99 \times 1.3} = 0.091 < 0.1$$

At the middle position, the values are as follows.

$$\left|\frac{D \cdot f1}{S \cdot AR1}\right| = \frac{0.035 \times 10.33}{5.96 \times 2.6} = 0.023 < 0.1$$

$$\left|\frac{5b \cdot f1}{|\beta| \cdot S \cdot AR1}\right| = \frac{0.030 \times 10.33}{1.08 \times 5.96 \times 2.6} = 0.019 < 0.1$$

At the telephoto extreme, the values are as follows.

$$\left|\frac{D \cdot f1}{S \cdot AR1}\right| = \frac{0.035 \times 11.45}{7.8 \times 3.84} = 0.013 < 0.1$$

$$\left|\frac{5b \cdot f1}{|\beta| \cdot S \cdot AR1}\right| = \frac{0.030 \times 11.45}{1.3 \times 7.8 \times 3.84} = 0.048 < 0.1$$

For the intermediate image position near the fourteenth surface R14, the values of the conditions are calculated as follows.

At the wide-angle extreme, the values are as follows.
At the middle position, the values are as follows.

$$\left|\frac{D \cdot f1}{S \cdot AR1}\right| = \frac{0.035 \times 3.81}{1.21 \times 1.3} = 0.085 < 0.1$$

$$\left|\frac{5b \cdot f1}{|\beta| \cdot S \cdot AR1}\right| = \frac{0.030 \times 3.81}{1.2 \times 1.21 \times 1.3} = 0.061 < 0.1$$

$$\left|\frac{D \cdot f1}{S \cdot AR1}\right| = \frac{0.035 \times 5.02}{1.23 \times 2.6} = 0.055 < 0.1$$

$$\left|\frac{5b \cdot f1}{|\beta| \cdot S \cdot AR1}\right| = \frac{0.030 \times 5.02}{1.67 \times 1.23 \times 2.6} = 0.028 < 0.1$$

At the telephoto extreme, the values are as follows.

$$\left|\frac{D \cdot f1}{S \cdot AR1}\right| = \frac{0.035 \times 6.02}{1.33 \times 3.84} = 0.041 < 0.1$$

$$\left|\frac{5b \cdot f1}{|\beta| \cdot S \cdot AR1}\right| = \frac{0.030 \times 6.02}{1.92 \times 1.33 \times 3.84} = 0.018 < 0.1$$

For the intermediate image position near the eighteenth surface R18, the values of the conditions are calculated as follows.

At the wide-angle extreme, the values are as follows.

$$\left|\frac{D \cdot f1}{S \cdot AR1}\right| = \frac{0.035 \times 3.56}{23.5 \times 1.3} = 0.004 < 0.1$$

$$\left|\frac{5b \cdot f1}{|\beta| \cdot S \cdot AR1}\right| = \frac{0.030 \times 3.65}{1.09 \times 23.5 \times 1.3} = 0.003 < 0.1$$

At the middle position, the values are as follows.

$$\left|\frac{D \cdot f1}{S \cdot AR1}\right| = \frac{0.035 \times 7.1}{24.4 \times 2.6} = 0.004 < 0.1$$

$$\left|\frac{5b \cdot f1}{|\beta| \cdot S \cdot AR1}\right| = \frac{0.030 \times 7.1}{1.48 \times 24.4 \times 2.6} = 0.002 < 0.1$$

At the telephoto extreme, the values are as follows.

$$\left|\frac{D \cdot f1}{S \cdot AR1}\right| = \frac{0.035 \times 10.36}{24.55 \times 2.84} = 0.004 < 0.1$$

$$\left|\frac{5b \cdot f1}{|\beta| \cdot S \cdot AR1}\right| = \frac{0.030 \times 10.36}{1.73 \times 24.55 \times 3.84} = 0.002 < 0.1$$

The present embodiment thus satisfies Conditions (1a), (3a) under each of the above circumstances. In the present embodiment the aperture diameter decreases with zooming from the telephoto extreme to the wide-angle extreme. It thus becomes harder to satisfy the conditions at the wide-angle extreme.

FIGS. 18A to 18L, FIGS. 19A to 19L, and FIGS. 20A to 20L are lateral aberration diagrams at the wide-angle extreme, at the middle position, and the telephoto extreme, respectively, of the present embodiment.

The effect of the present invention will be described. In order to avoid complexity, the decrease in light quantity due to the bubble or particle will be described only about on-axis rays at the wide-angle extreme.

Although the smallest spots are not illustrated especially, the lengths of the on-axis smallest spots are about 450 μm, about 440 μm, about 450 μm, and about 8.04 mm at the intermediate image positions near the fourth surface R4, near the tenth surface R10, near the fourteenth surface R14, and the eighteenth surface R18, respectively.

When the bubble or particle having the size of 35 μm exists at the respective smallest spot positions, the decrease in light quantity is only about 7.8%, about 8%, about 7.8%, and about 0.4% at the respective positions. Supposing the size of the bubble or particle posing the problem is $5b/|\beta|$, the sizes of the bubble or particle become 41.1 μm, 40.5 μm, 25 μm, and 27.5 μm at the respective intermediate image positions. When the bubble or particle is present at the smallest spot positions, the decrease in light quantity is only about 9.1%, about 9.2%, about 5.6%, and about 0.3% at the respective positions. The decrease in light quantity is further decreased with zooming from the wide-angle extreme to the telephoto extreme.

Figure 21:
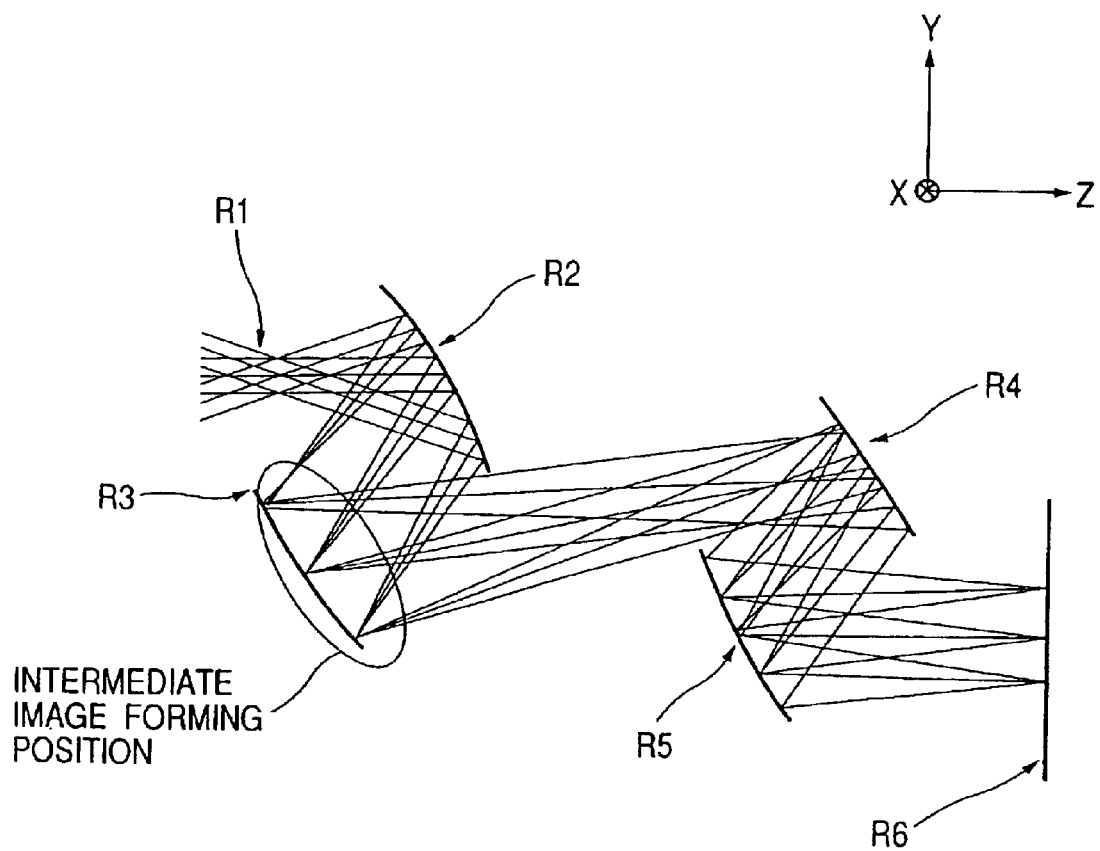
FIG. 21 is an optical, sectional view in the YZ plane of Embodiment 9 of the present invention.
Figure 22:
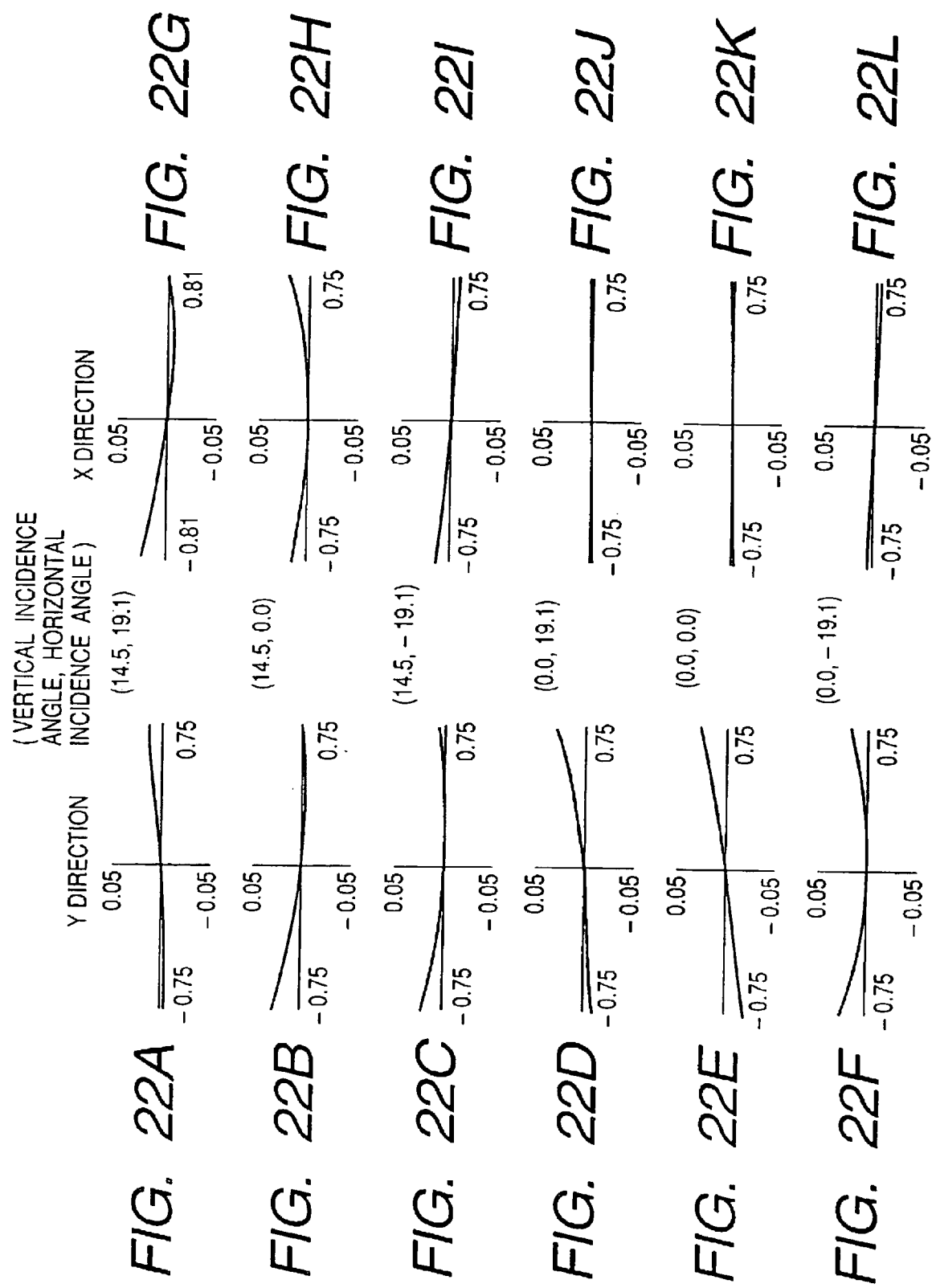
FIGS. 22A, 22B, 22C, 22D, 22E, 22F, 22G, 22H, 22I, 22J, 22K and 22L are lateral aberration diagrams of Embodiment 9.

FIG. 21 is an optical, sectional view in the YZ plane of Embodiment 9 of the present invention. The present embodiment is a photographing optical system having the horizontal field angle of 38.2° and the vertical field angle of 29°. FIG. 21 also illustrates optical paths. The present embodiment employs a reflecting optical system comprised of a plurality of surface reflecting mirrors, instead of use of the optical element in which the refractive surfaces and reflective surfaces are formed in the surface of the transparent body.

In the present embodiment the astigmatism independent of the field angle is generated at the intermediate image position, and values of Conditions (1a), (3a) are calculated as follows.

$$\left|\frac{D \cdot f1}{S \cdot AR1}\right| = \frac{0.035 \times 9.49}{2.76 \times 1.5} = 0.08 < 0.1$$

$$\left|\frac{5b \cdot f1}{|\beta| \cdot S \cdot AR1}\right| = \frac{0.030 \times 9.49}{0.89 \times 2.76 \times 1.5} = 0.077 < 0.1$$

The present embodiment thus satisfies Conditions (1a), (3a).

The component data of the present embodiment is as follows.

|   |   | Half horizontal field angle |   |   | 19.1 |   |
|---|---|---|---|---|---|---|
|   |   | Half vertical field angle |   |   | 14.5 |   |
|   |   | Aperture diameter |   |   | 1.50 |   |
| i | Yi | Zi | θi | Di | Ndi | νdi |
| 1 | 0.00 | 0.00 | 0.00 | 6.91 | 1 | aperture stop |
| 2 | 0.00 | 6.91 | 28.00 | 10.05 | 1 | reflective surface |
| 3 | −8.33 | 1.29 | 33.47 | 23.67 | 1 | reflective surface |
| 4 | −3.84 | 24.53 | 33.00 | 8.85 | 1 | reflective surface |
| 5 | −11.10 | 19.46 | 27.54 | 12.59 | 1 | reflective surface |
| 6 | −11.10 | 32.05 | 0.00 |  | 1 | image plane |

Aspherical shapes

| R2 surface | a = −1.46039e+03 | b = −8.02682e+00 | t = −4.20029e+01 |
|---|---|---|---|
|  | C03 = 3.67405e−04 | C21 = −2.46091e−03 |  |
|  | C04 = 7.60473e−06 | C22 = −5.65605e−04 | C40 = −1.12101e−04 |

-continued

| | | |
|---|---|---|
| R3 surface | a = 1.26931e+01 | b = 4.20864e+01 | t = 3.49006e+01 |
| | C03 = 3.62552e−04 | C21 = 4.25104e−03 | |
| | C04 = −1.54719e−04 | C22 = −4.16202e−04 | C40 = −1.06713e−04 |
| R4 surface | a = −2.61453e+02 | b = −1.81578e+01 | t = 2.33060e+01 |
| | C03 = 2.43935e−04 | C21 = 6.87008e−05 | |
| | C04 = 1.49521e−05 | C22 = −9.34036e−07 | C40 = 1.30674e−05 |
| R5 surface | a = −2.21549e+01 | b = 1.01587e+01 | t = −2.84332e+00 |
| | C03 = 5.07372e−04 | C21 = 8.89793e−04 | |
| | C04 = −2.95123e−06 | C22 = −6.31390e−05 | C40 = 2.86129e−05 |

The present embodiment is composed of the stop surface R1 as the entrance pupil, and four reflective surfaces including a concave mirror R2, a concave mirror R3, a concave mirror R4, and a concave mirror R5, in the order of passage of rays from the object. R6 denotes the final image plane, at which the image pickup surface (photoreceptive surface) of the image pickup device such as CCD is located. The all reflective surfaces are surfaces symmetric only with respect to the YZ plane.

The imaging action of the present embodiment will be described below. The light 1 from the object is regulated in the quantity of incident light by the stop (entrance pupil) R1 and thereafter reflected by the reflective surface R2 to be focused once near the reflective surface R3. Then the light is reflected in order by the surfaces R3, R4, and R5 and thereafter is again focused on the final image plane R6. Lateral aberration diagrams of the optical system of the present embodiment are shown in FIGS. 22A to 22L.

The effect of the present embodiment will be described below. In the present embodiment a problem in the optical performance will be raised by the width of the flaw, the deposit, or the like on the reflective surface near the intermediate image position.

Figure 28:
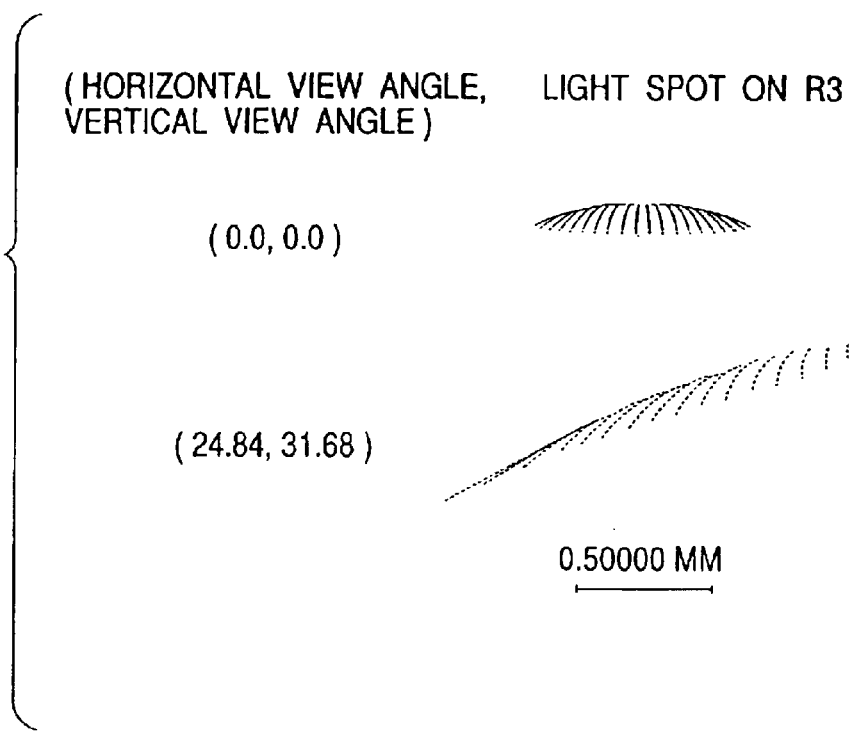
FIG. 28 is a diagram of light spots on a reflective surface near the intermediate image plane in Embodiment 9.

FIG. 28 shows the on-axis and off-axis light spots on the reflective surface near the intermediate image plane, i.e., on the third surface R3. In this case, if the deposit or the like having the size 35 $\mu$m is present on the third surface R3, the area of the on-axis light spot on the third surface R3 is about 72000 $\mu$m$^2$ and the decrease in light quantity is about 1.3%; the area of the off-axis light spot on the third surface R3 is about 118800 $\mu$m$^2$ and the decrease in light quantity is only about 0.8%.

Supposing the size of the bubble or particle posing the problem is 5b/|$\beta$|, 5b/|$\beta$|=5×6/0.89=33.7 $\mu$m, and the area is about 892 $\mu$m$^2$; thus, the decrease in light quantity is about 1.2% on the axis and the decrease is about 0.75% off the axis. As described, the present embodiment can suppress the influence on the image from the width of the flaw, deposit, or the like on the reflective surface near the intermediate image plane.

A reflection type zoom optical system can also be constructed by using a plurality of optical elements including the optical element(s) composed of plural reflective surfaces of the reflective mirrors as in Embodiment 9 and the optical element(s) in which two refractive surfaces and plural reflective surfaces are formed in the surface of the transparent body as in Embodiments 4 to 7, and changing the relative positions of at least two optical elements thereof to achieve zooming. In that case, the influence on the image can also be reduced from the bubble or particle present in the optical elements or from the flaw, deposit, etc. on the reflective surface near the intermediate image plane.

Another reflection type zoom optical system can also be constructed by using a plurality of optical elements including the optical element(s) in Embodiments 4 to 8 and coaxial, refracting optical element(s) composed of only refractive surfaces, and changing the relative positions of at least two optical elements thereof to achieve zooming. In that case, the influence on the image can also be reduced from the bubble or particle present in the optical elements or from the flaw, deposit, or the like on the reflective surface near the intermediate image plane.

As described above, in the optical apparatus in which intermediate imaging takes place at least once in the optical path from the object to the final image plane, the lens system of the object-side imaging element and the lens system of the image-side imaging element for reimaging the intermediate image on the final image plane are properly set so as to flatten the disturbance of light intensity distribution due to the noise source on the final image plane even if the noise source is present at and near the intermediate image position, whereby the disturbance due to the noise becomes inoffensive on the image on the final image plane, thus achieving the optical element capable of obtaining a good image on the final image plane and the optical apparatus using it.

Particularly, in the optical apparatus having the optical element for forming the object image on the final image plane, which includes the object-side imaging element for forming the object image on the intermediate image plane at least once in the optical path before the final image plane and the image-side imaging element for reimaging the intermediate image on the final image plane, when the noise source is present at the position of the intermediate image plane, the disturbance of light intensity distribution due to the noise source is optically flattened on the final image plane, thereby achieving the effect of making the disturbance due to noise inoffensive on the image on the final image plane.

Particularly, when the means for flattening the disturbance of light intensity distribution due to the noise source is optical means for degrading the imaging performance at the intermediate image position, so as to flatten the disturbance of light intensity distribution on the image plane due to the noise source, the effect of making the disturbance due to noise inoffensive on the image on the final image plane can be achieved readily without increase in the number of components in particular.

Further, when the optical system is an off-axial, optical system wherein at least either of the object-side imaging element and the image-side imaging element includes an off-axial curved surface, the degrees of freedom increase on the optical arrangement of the off-axial, optical system (the off-axial, reflective surface is particularly ready for compact arrangement); and, in addition to the foregoing effect, the on-axis astigmatism or the "aberration of torsion," which was difficult to produce in the conventional, coaxial, rotationally symmetric, optical systems, can be generated easily, so that the effect of making the disturbance due to noise inoffensive on the image on the final image plane can be achieved more easily.

Generally speaking, the increase in the spot diameter on the intermediate image plane also brings about the effect that the defective rate of the optical element due to the noise source can be quickly decreased.

As described above, in the optical element wherein the light from the object is made incident to the entrance surface formed in the surface of the transparent body, is reflected by at least one reflective surface of internal reflection comprised of a curved surface provided in a part of the transparent body, experiences intermediate imaging in the transparent body, and thereafter emerges from the exit surface of the transparent body to form the image or in the optical element wherein the light from the object is repetitively reflected by the plural reflective surfaces comprised of surface reflectors, experiences intermediate imaging, and thereafter emerges, at least either one surface includes an off-axial, reflective surface and the on-axis astigmatism or "aberration of torsion," which is the aberration independent of the field angle from on the axis to off the axis, is generated, so as to deliberately degrade the imaging performance at the intermediate image position relative to the imaging performance on the final image plane, thereby achieving the optical element having the effect of decreasing the influence on the image from the bubble or particle present in the optical element or from the flaw, deposit, etc. on the reflective surface near the intermediate image plane, and the image pickup apparatus using it.

Particularly, by generating the on-axis astigmatism being the astigmatism independent of the field angle, the size of the light spot near the intermediate image plane can be relatively readily made extremely larger than the size of bubble, particle, deposit, or the like posing the problem, thereby achieving the optical element having the effect of reducing the decrease in light quantity due to the bubble or particle present inside or due to the flaw, deposit, etc. on the reflective surface, and the image pickup apparatus using it.

Further, when the entrance surface near the pupil has the rotationally asymmetric surface shape, the astigmatism can be generated almost uniformly against the field angles, thereby achieving the optical element having the effect of reducing the influence on the image from the bubble or particle present in the optical element, almost uniformly against the field angles, and the image pickup apparatus using it.

Further, when the exit surface also has the rotationally asymmetric surface shape, the optical element can be achieved with the effect of reducing occurrence of asymmetric aberration such as distortion generated in the entrance surface, and the image pickup apparatus using it can also be achieved.

The first, curved, reflective surface, counted from the object side, is provided with converging action, and this contributes to downsizing of the optical system. This is for making the optical system further thinner by intermediate imaging of pupil rays (principal rays) in the stage near the entrance surface, so that the off-axial, principal rays outgoing from the stop are converged before expanding large, thereby suppressing increase in the effective diameter of each surface after the first reflective surface due to wide-angle arrangement of the optical system.

The stop is located on the object side of the photographing optical system (or on the light incidence side of the optical system), and this suppresses increase in the size of the photographing optical system, which could result from wide-angle arrangement of the optical system.

What is claimed is:

1. An optical system comprising:

an optical element including (a) a first optical component for forming an intermediate image of an object and having a refractive surface of rotationally asymmetric shape and at least one reflective surface, and (b) a second optical component for forming a final image with light from the intermediate image and having a refractive surface of rotationally asymmetric shape and at least one reflective surface; and an aperture stop, wherein the following relation is satisfied:

$$\left|\frac{D \cdot f1}{S \cdot AR1}\right| < 0.1$$

where D is a size of a noise source near the intermediate image, f1 is a maximum focal length of said first optical component out of those dependent upon azimuths, an azimuth at the maximum focal length of said first optical component being defined as ξ, S is an on-axis astigmatic difference at the intermediate image position, and AR1 is a diameter of an exit pupil by said first optical component in correspondence to the azimuth ξ, at the time an aperture of said aperture stop is maximized.

2. An optical apparatus according to claim 1, wherein the following relation is satisfied:

$$D=35 \, \mu m.$$

3. An optical system comprising:

an optical system according to claim 1; and an image pickup device, wherein the final image is formed on a light receiving surface of said image pickup device by said optical system.

4. An optical system comprising:

an optical element including (a) a first optical component for forming an intermediate image of an object and having a refractive surface of rotationally asymmetric shape and at least one reflective surface, and (b) a second optical component for forming a final image with light from the intermediate image and having a refractive surface of rotationally asymmetric shape and at least one reflective surface; and an aperture stop, wherein the following relation is satisfied:

$$\left|\frac{D \cdot f1}{S \cdot AR2}\right| < 0.3$$

where D is a size of a noise source near the intermediate image, f1 is a maximum focal length of said first optical component out of those dependent upon azimuths, an azimuth at the maximum focal length of said first optical component being defined as ξ, S is an on-axis astigmatic difference at the intermediate image position, and AR2 is a diameter of an exit pupil by said first optical component in correspondence to the azimuth ξ, at the time an aperture of said aperture stop is minimized.

5. An optical apparatus according to claim 4, wherein the following relation is satisfied:

$$D=35 \, \mu m.$$

6. An image pickup apparatus comprising:
an optical system according to claim 4; and
an image pickup device,
wherein the final image is formed on a light receiving surface of said image pickup device by said optical system.

7. An image pickup apparatus comprising:
an optical system including (a) a first optical component for forming an intermediate image of an object, (b) a second optical component for forming a final image with light from the intermediate image, and (c) an aperture stop,
wherein at least one of said first optical component and said second optical component comprises an off-axial curved surface, and wherein the final image is formed on a light receiving surface of an image pickup device by said optical system, and wherein the following relation is satisfied:

$$\left| \frac{5b \cdot f1}{|\beta| \cdot S \cdot AR1} \right| < 0.1$$

where b is a minimum resolution settled by the image pickup device, f1 is a maximum focal length of said first optical component out of those dependent upon azimuths, an azimuth at the maximum focal length of said first optical component being defined as $\xi$, S is an on-axis astigmatic difference at the intermediate image position, $\beta$ is an image magnification of said second optical component to the azimuth $\xi$ in the vertical direction, and AR1 is a diameter of an exit pupil by said first optical component in correspondence to the azimuth $\xi$ at the time an aperture of said aperture stop is maximized.

8. An image pickup apparatus comprising:
an optical system including (a) a first optical component for forming an intermediate image of an object, (b) a second optical component for forming a final image with light from the intermediate image, and (c) an aperture stop,
wherein at least one of said first optical component and said second optical component comprises an off-axial curved surface, wherein the final image is formed on a light receiving surface of an image pickup device by said optical system, and wherein the following relation is satisfied:

$$\left| \frac{5b \cdot f1}{|\beta| \cdot S \cdot AR2} \right| < 0.3$$

where b is a minimum resolution settled by the image pickup device, f1 is a maximum focal length of said first optical component out of those dependent upon azimuths, an azimuth at the maximum focal length of said first optical component being defined as $\xi$, S is an on-axis astigmatic difference at the intermediate image position, $\beta$ is an image magnification of said second optical component to the azimuth $\xi$ in the vertical direction, and AR2 is a diameter of an exit pupil by said first optical component in correspondence to the azimuth $\xi$ at the time an aperture of said aperture stop is minimized.

* * * * *

UNITED STATES PATENT AND TRADEMARK OFFICE
CERTIFICATE OF CORRECTION

PATENT NO. : 6,842,280 B2
DATED : January 11, 2005
INVENTOR(S) : Keisuke Araki et al.

It is certified that error appears in the above-identified patent and that said Letters Patent is hereby corrected as shown below:

Column 3,
Line 42, "↑11" should read -- β11 --.

Column 13,
Line 66, "The" should begin a new paragraph.

Column 25,
Line 27, "preset" should read -- present --.
Line 63, "has" should read -- have --.

Column 28,
Line 43, "valves" should read -- values --.

Column 40,
Line 34, "Zi" should read -- Zi(W) --.

Column 44,
Line 55, "At the middle position, the values are as follows." should be deleted in its entirety.
Line 61, -- At the middle position, the values are as follows. -- should be inserted.

Column 45,
Line 14, "3.56" should read -- 3.65 --.

Column 50,
Lines 25 and 64, "apparatus" should read -- system --.

Signed and Sealed this

Fourth Day of October , 2005

JON W. DUDAS
*Director of the United States Patent and Trademark Office*